United States Patent
Yokota et al.

(10) Patent No.: US 12,129,201 B2
(45) Date of Patent: Oct. 29, 2024

(54) Li2O—Al2O3—SiO2-BASED CRYSTALLIZED GLASS

(71) Applicant: NIPPON ELECTRIC GLASS CO., LTD., Otsu (JP)

(72) Inventors: Yuki Yokota, Otsu (JP); Takahiro Matano, Otsu (JP); Takahiro Takahashi, Otsu (JP); Shin Tojo, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 131 days.

(21) Appl. No.: 17/297,507

(22) PCT Filed: Mar. 18, 2020

(86) PCT No.: PCT/JP2020/012037
§ 371 (c)(1),
(2) Date: May 27, 2021

(87) PCT Pub. No.: WO2020/196171
PCT Pub. Date: Oct. 1, 2020

(65) Prior Publication Data
US 2022/0033298 A1 Feb. 3, 2022

(30) Foreign Application Priority Data
Mar. 22, 2019 (JP) ................ 2019-054662

(51) Int. Cl.
*C03C 10/12* (2006.01)
*C03C 4/08* (2006.01)
*C03C 10/00* (2006.01)

(52) U.S. Cl.
CPC .......... *C03C 10/0027* (2013.01); *C03C 4/085* (2013.01); *C03C 10/0054* (2013.01); *C03C 2204/00* (2013.01)

(58) Field of Classification Search
CPC ................................................ C03C 10/0027
See application file for complete search history.

(56) References Cited

U.S. PATENT DOCUMENTS

| | | | |
|---|---|---|---|
| 9,458,053 B2 | 10/2016 | Nakane et al. | |
| 2007/0197366 A1 | 8/2007 | Aoki et al. | |
| 2008/0269038 A1* | 10/2008 | Schneider | C03C 10/0027 501/63 |
| 2010/0167903 A1* | 7/2010 | Comte | C03C 10/0027 501/27 |
| 2011/0256409 A1 | 10/2011 | Ritzberger et al. | |
| 2011/0257000 A1 | 10/2011 | Ritzberger et al. | |
| 2012/0248642 A1 | 10/2012 | Ritzberger et al. | |
| 2013/0323404 A1 | 12/2013 | Ritzberger et al. | |
| 2014/0000314 A1 | 1/2014 | Ritzberger et al. | |
| 2014/0335473 A1 | 11/2014 | Ritzberger et al. | |
| 2015/0266773 A1 | 9/2015 | Ogawa et al. | |
| 2015/0353413 A1 | 12/2015 | Mushiake et al. | |
| 2016/0106632 A1 | 4/2016 | Ritzberger et al. | |
| 2017/0158552 A1 | 6/2017 | Ritzberger et al. | |
| 2017/0260086 A1* | 9/2017 | Plevacova | C03C 8/14 |
| 2020/0131080 A1* | 4/2020 | Yuan | C03C 10/0027 |
| 2020/0156989 A1 | 5/2020 | Ritzberger et al. | |

FOREIGN PATENT DOCUMENTS

| | | | | |
|---|---|---|---|---|
| CN | 1863739 | A | 11/2006 | |
| CN | 109320091 | A * | 2/2019 | ............ C03C 10/00 |
| JP | 63-303831 | A | 12/1988 | |
| JP | 01052631 | A * | 2/1989 | |
| JP | 01-308845 | A | 12/1989 | |
| JP | 03-023237 | A | 1/1991 | |
| JP | 04-285029 | A | 10/1992 | |
| JP | 06-329439 | A | 11/1994 | |
| JP | 11-100231 | A | 4/1999 | |
| JP | 11-228180 | A | 8/1999 | |
| JP | 11-228181 | A | 8/1999 | |
| JP | 2001-019488 | A | 1/2001 | |
| JP | 2001-342038 | A | 12/2001 | |
| JP | 2001348250 | A * | 12/2001 | |
| JP | 2002-154840 | A | 5/2002 | |
| JP | 2005-053711 | A | 3/2005 | |
| JP | 2006-001828 | A | 1/2006 | |
| JP | 2008-007398 | A | 1/2008 | |
| JP | 2010-018512 | A | 1/2010 | |
| JP | 2011-225441 | A | 11/2011 | |
| JP | 2012-046413 | A | 3/2012 | |
| JP | 2013-063870 | A | 4/2013 | |
| JP | 2014-136668 | A | 7/2014 | |
| JP | 2015-020944 | A | 2/2015 | |
| JP | 2015-074596 | A | 4/2015 | |
| JP | 2016-005995 | A | 1/2016 | |
| JP | 2016-108201 | A | 6/2016 | |
| JP | 2016-141607 | A | 8/2016 | |
| KR | 2006-0117308 | A * | 11/2006 | |
| KR | 10-1110138 | B1 | 1/2012 | |
| TW | 200517352 | A | 6/2005 | |
| TW | 201615584 | A | 5/2016 | |
| WO | 2005/037721 | A1 | 4/2005 | |

OTHER PUBLICATIONS

Official Communication issued in corresponding European Patent Application No. 20778565.0, mailed on Jan. 10, 2023.
Official Communication issued in International Patent Application No. PCT/JP2020/012037, mailed on Jun. 16, 2020.

* cited by examiner

*Primary Examiner* — Elizabeth A. Bolden
(74) *Attorney, Agent, or Firm* — Keating & Bennett, LLP

(57) ABSTRACT

Provided is a $Li_2O$—$Al_2O_3$—$SiO_2$-based crystallized glass in which a yellowish tint due to $TiO_2$, $Fe_2O_3$ or so on is reduced. The $Li_2O$—$Al_2O_3$—$SiO_2$-based crystallized glass contains, in terms of % by mass, 40 to 90% $SiO_2$, 5 to 30% $Al_2O_3$, 1 to 10% $Li_2O$, 0 to 20% $SnO_2$, 1 to 20% $ZrO_2$, 0 to 10% MgO, 0 to 10% $P_2O_5$, and 0 to below 2% $TiO_2$.

20 Claims, 1 Drawing Sheet

[FIG. 1.]
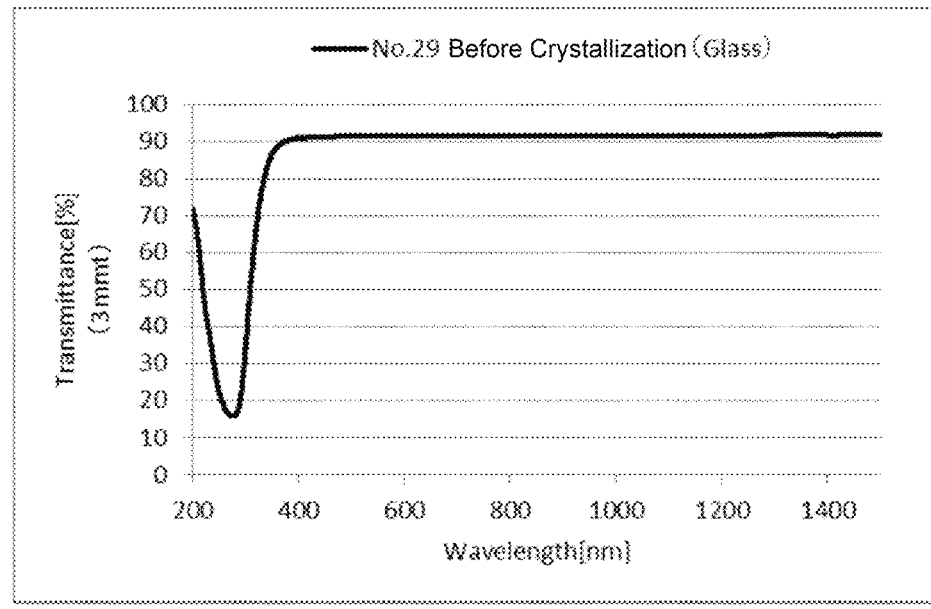
[FIG. 2.]
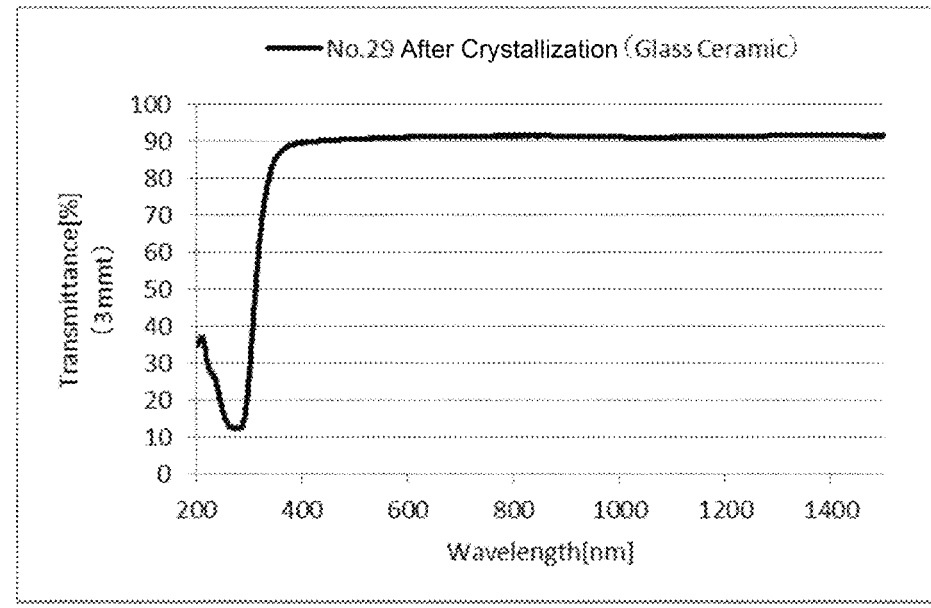

Li2O—Al2O3—SiO2-BASED CRYSTALLIZED GLASS

TECHNICAL FIELD

The present invention relates to $Li_2O$—$Al_2O_3$—$SiO_2$-based crystallized glasses. More specifically, the present invention relates to a $Li_2O$—$Al_2O_3$—$SiO_2$-based crystallized glass suitable as a material for front windows of oil stoves, wood stoves and the like, substrates for high-technology products, such as color filter substrates and image sensor substrates, setters for firing electronic components, light diffuser plates, furnace core tubes for producing semiconductors, masks for producing semiconductors, optical lenses, dimension measurement members, communication members, construction members, chemical reaction containers, electromagnetic cooker top plates, heat-resistant plates and utensils, heat-resistant covers, fire door windows, members for astrometric telescopes, and members for space optics.

BACKGROUND ART

Conventionally, a $Li_2O$—$Al_2O_3$—$SiO_2$-based crystallized glass is used as a material for front windows of oil stoves, wood stoves and the like, substrates for high-technology products, such as color filter substrates and image sensor substrates, setters for firing electronic components, light diffuser plates, furnace core tubes for producing semiconductors, masks for producing semiconductors, optical lenses, dimension measurement members, communication members, construction members, chemical reaction containers, electromagnetic cooker top plates, heat-resistant plates and utensils, heat-resistant covers, fire door windows, members for astrometric telescopes, and members for space optics. For example, Patent Literatures 1 to 3 disclose $Li_2O$—$Al_2O_3$—$SiO_2$-based crystallized glasses in which $Li_2O$—$Al_2O_3$—$SiO_2$-based crystals, such as a β-quartz solid solution ($Li_2O \cdot Al_2O_3 \cdot nSiO_2$ [where 2≤n≤4]) or a β-spodumene solid solution ($Li_2O \cdot Al_2O_3 \cdot nSiO_2$ [where n≥4]), are precipitated as a major crystalline phase.

$Li_2O$—$Al_2O_3$—$SiO_2$-based crystallized glasses have low coefficients of thermal expansion and high mechanical strength and therefore have excellent thermal properties. Furthermore, by appropriately controlling the heat treatment condition in a crystallization process, the type of crystals to be precipitated in a $Li_2O$—$Al_2O_3$—$SiO_2$-based crystallized glass can be controlled and, thus, a transparent crystallized glass (with a β-quartz solid solution precipitated therein) can be easily produced.

In producing this type of crystallized glass, it is necessary to melt a glass batch at high temperatures above 1400° C. Therefore, as a fining agent to be added to the glass batch, $As_2O_3$ or $Sb_2O_3$ is used which is capable of producing a large amount of fining gas during melting at high temperatures. However, $As_2O_3$ and $Sb_2O_3$ are highly toxic and therefore may contaminate the environment during the production process of glass and during treatment of waste glass.

To cope with this, $SnO_2$ or Cl has been proposed as an alternative fining agent to $As_2O_3$ or $Sb_2O_3$ (see, for example, Patent Literatures 4 and 5). However, Cl easily corrodes a mold and metallic rolls during glass forming and, as a result, may degrade the surface quality of the glass.

CITATION LIST

Patent Literature

[PTL 1]
JP-B-S39-21049
[PTL 2]
JP-B-S40-20182
[PTL 3]
JP-A-H01-308845
[PTL 4]
JP-A-H11-228180
[PTL 5]
JP-A-H11-228181

SUMMARY OF INVENTION

Technical Problem

As described above, $Li_2O$—$Al_2O_3$—$SiO_2$-based crystallized glasses are tinted owing to $TiO_2$, $Fe_2O_3$ or so on and thus take on a yellowish tint, which presents a problem of unfavorable appearance.

An object of the present invention is to provide a $Li_2O$—$Al_2O_3$—$SiO_2$-based crystallized glass in which a yellowish tint due to $TiO_2$, $Fe_2O_3$ or so on is reduced.

Solution to Problem

In order to improve a yellowish tint of a transparent crystallized glass, the content of $TiO_2$ may be reduced. However, a reduction in the content of $TiO_2$ narrows the optimal firing temperature range in the crystallization process and is likely to cause a reduction in the amount of crystal nuclei produced. As a result, the amount of coarse crystals increases, so that the crystallized glass is likely to be cloudy and have impaired transparency. The inventors have found that, however, a shortage in the amount of production of crystal nuclei due to a reduced content of $TiO_2$ can be made up for by containing $ZrO_2$ as much as 1% by mass or more in the glass.

A $Li_2O$—$Al_2O_3$—$SiO_2$-based crystallized glass according to the present invention contains, in terms of % by mass, 40 to 90% $SiO_2$, 5 to 30% $Al_2O_3$, 1 to 10% $Li_2O$, 0 to 20% $SnO_2$, 1 to 20% $ZrO_2$, 0 to 10% MgO, 0 to 10% $P_2O_5$, and 0 to below 2% $TiO_2$.

The $Li_2O$—$Al_2O_3$—$SiO_2$-based crystallized glass according to the present invention preferably further contains, in terms of % by mass, 0 to 10% $Na_2O$, 0 to 10% $K_2O$, 0 to 10% CaO, 0 to 10% SrO, 0 to 10% BaO, 0 to 10% ZnO, and 0 to 10% $B_2O_3$.

The $Li_2O$—$Al_2O_3$—$SiO_2$-based crystallized glass according to the present invention preferably further contains, in terms of % by mass, 0.10 or less $Fe_2O_3$.

In the $Li_2O$—$Al_2O_3$—$SiO_2$-based crystallized glass according to the present invention, a mass ratio of $SnO_2/(SnO_2+ZrO_2+P_2O_5+TiO_2+B_2O_3)$ is preferably 0.06 or more. The term "$SnO_2/(SnO_2+ZrO_2+P_2O_5+TiO_2+B_2O_3)$" used herein refers to the value of the content of $SnO_2$ divided by the total content of $SnO_2$, $ZrO_2$, $P_2O_5$, $TiO_2$, and $B_2O_3$.

In the $Li_2O$—$Al_2O_3$—$SiO_2$-based crystallized glass according to the present invention, a mass ratio of $Al_2O_3/(SnO_2+ZrO_2)$ is preferably 7.1 or less. The term "$Al_2O_3/(SnO_2+ZrO_2)$" used herein refers to the value of the content of $Al_2O_3$ divided by the total content of $SnO_2$ and $ZrO_2$.

In the $Li_2O$—$Al_2O_3$—$SiO_2$-based crystallized glass according to the present invention, a mass ratio of $SnO_2/$ ($SnO_2$+$ZrO_2$) is preferably 0.01 to 0.99. The term "$SnO_2$/($SnO_2$+$ZrO_2$)" used herein refers to the value of the content of $SnO_2$ divided by the total content of $SnO_2$ and $ZrO_2$.

The $Li_2O$—$Al_2O_3$—$SiO_2$-based crystallized glass according to the present invention preferably contains, in terms of % by mass, 8% or less $Na_2O$+$K_2O$+$CaO$+$SrO$+$BaO$. The term "$Na_2O$+$K_2O$+$CaO$+$SrO$+$BaO$)" used herein refers to the total content of $Na_2O$, $K_2O$, $CaO$, $SrO$, and $BaO$.

In the $Li_2O$—$Al_2O_3$—$SiO_2$-based crystallized glass according to the present invention, a mass ratio of ($SiO_2$+$Al_2O_3$)/$Li_2O$ is preferably 20 or more. The term "($SiO_2$+$Al_2O_3$)/$Li_2O$" used herein refers to the value of the total content of $SiO_2$ and $Al_2O_3$ divided by the content of $Li_2O$.

In the $Li_2O$—$Al_2O_3$—$SiO_2$-based crystallized glass according to the present invention, a mass ratio of ($SiO_2$+$Al_2O_3$)/$SnO_2$ is preferably 44 or more. The term "($SiO_2$+$Al_2O_3$)/$SnO_2$" used herein refers to the value of the total content of $SiO_2$ and $Al_2O_3$ divided by the content of $SnO_2$.

In the $Li_2O$—$Al_2O_3$—$SiO_2$-based crystallized glass according to the present invention, a mass ratio of ($MgO$+$ZnO$)/$Li_2O$ is preferably less than 0.395 or more than 0.754. The term "($MgO$+$ZnO$)/$Li_2O$" used herein refers to the value of the total content of $MgO$ and $ZnO$ divided by the content of $Li_2O$.

In the $Li_2O$—$Al_2O_3$—$SiO_2$-based crystallized glass according to the present invention, a mass ratio of ($Li_2O$+$Na_2O$+$K_2O$)/$ZrO_2$ is preferably 2.0 or less. The term "($Li_2O$+$Na_2O$+$K_2O$)/$ZrO_2$" used herein refers to the value of the total content of $Li_2O$, $Na_2O$, and $K_2O$ divided by the content of $ZrO_2$.

In the $Li_2O$—$Al_2O_3$—$SiO_2$-based crystallized glass according to the present invention, a mass ratio of $TiO_2$/$ZrO_2$ is preferably 0.0001 to 5.0. The term "$TiO_2$/$ZrO_2$" used herein refers to the value of the content of $TiO_2$ divided by the content of $ZrO_2$.

In the $Li_2O$—$Al_2O_3$—$SiO_2$-based crystallized glass according to the present invention, a mass ratio of $TiO_2$/($TiO_2$+$Fe_2O_3$) is preferably 0.001 to 0.999. The term "$TiO_2$/($TiO_2$+$Fe_2O_3$)" used herein refers to the value of the content of $TiO_2$ divided by the content of $TiO_2$ and $Fe_2O_3$.

The $Li_2O$—$Al_2O_3$—$SiO_2$-based crystallized glass according to the present invention preferably contains, in terms of % by mass, less than 0.05% $HfO_2$+$Ta_2O_5$. The term "$HfO_2$+$Ta_2O_5$" used herein refers to the total content of $HfO_2$ and $Ta_2O_5$.

The $Li_2O$—$Al_2O_3$—$SiO_2$-based crystallized glass according to the present invention preferably contains, in terms of % by mass, 7 ppm or less Pt.

The $Li_2O$—$Al_2O_3$—$SiO_2$-based crystallized glass according to the present invention preferably contains, in terms of % by mass, 7 ppm or less Rh.

The $Li_2O$—$Al_2O_3$—$SiO_2$-based crystallized glass according to the present invention preferably contains, in terms of % by mass, 9 ppm or less Pt+Rh. The term "Pt+Rh" used herein refers to the total content of Pt and Rh.

The $Li_2O$—$Al_2O_3$—$SiO_2$-based crystallized glass according to the present invention preferably has a clear and colorless appearance.

The $Li_2O$—$Al_2O_3$—$SiO_2$-based crystallized glass according to the present invention preferably has a transmittance of 10% or more at a thickness of 3 mm and a wavelength of 300 nm. Thus, the crystallized glass can be suitably used for various applications requiring permeability to ultraviolet rays.

In the $Li_2O$—$Al_2O_3$—$SiO_2$-based crystallized glass according to the present invention, a β-quartz solid solution is preferably precipitated as a major crystalline phase. Thus, a crystallized glass having a low coefficient of thermal expansion can be easily obtained.

The $Li_2O$—$Al_2O_3$—$SiO_2$-based crystallized glass according to the present invention preferably has a coefficient of thermal expansion of $30 \times 10^{-7}$/° C. or less at 30 to 380° C. Thus, the crystallized glass can be suitably used for various applications requiring low expansibility.

The $Li_2O$—$Al_2O_3$—$SiO_2$-based crystallized glass according to the present invention preferably has a coefficient of thermal expansion of $30 \times 10^{-7}$/° C. or less at 30 to 750° C. Thus, the crystallized glass can be suitably used for various applications requiring low expansibility over a wide temperature range.

The $Li_2O$—$Al_2O_3$—$SiO_2$-based crystallized glass according to the present invention preferably has a transmittance of 10% or more at a thickness of 3 mm and a wavelength of 300 nm and has a coefficient of thermal expansion of $30 \times 10^{-7}$/° C. or less at 30 to 380° C.

The $Li_2O$—$Al_2O_3$—$SiO_2$-based crystallized glass according to the present invention preferably has, at a thickness of 3 mm and a wavelength of 300 nm, a rate of transmittance change of 50% or less between before and after crystallization. The term "rate of transmittance change between before and after crystallization" means {((transmittance (%) before crystallization) (transmittance (%) after crystallization))/(transmittance (%) before crystallization)}×100(%).

Advantageous Effects of Invention

The present invention enables provision of a $Li_2O$—$Al_2O_3$—$SiO_2$-based crystallized glass in which a yellowish tint due to $TiO_2$, $Fe_2O_3$ or so on is reduced.

BRIEF DESCRIPTION OF DRAWINGS

FIG. 1 is a transmittance curve before crystallization of Sample No. 29.

FIG. 2 is a transmittance curve after crystallization of Sample No. 29.

DESCRIPTION OF EMBODIMENTS

A $Li_2O$—$Al_2O_3$—$SiO_2$-based crystallized glass according to the present invention contains, in terms of % by mass, 40 to 90% $SiO_2$, 5 to 30% $Al_2O_3$, 1 to 10% $Li_2O$, 0 to 20% $SnO_2$, 1 to 20% $ZrO_2$, 0 to 10% $MgO$, 0 to 10% $P_2O_5$, and 0 to below 2% $TiO_2$. Reasons why the glass composition is limited as just described will be described below. In the following description of the respective contents of components, "%" refers to "% by mass" unless otherwise stated.

$SiO_2$ is a component that forms part of a glass network and also constitutes part of a $Li_2O$—$Al_2O_3$—$SiO_2$-based crystal. The content of $SiO_2$ is preferably 40 to 90%, 52 to 80%, 55 to 75%, 56 to 70%, 59 to 70%, 60 to 70%, 60 to 69.5%, 60.5 to 69.5%, 61 to 69.5%, 61.5 to 69.5%, 62 to 69.5%, 62.5 to 69.5%, or 63 to 69.5%, and particularly preferably 63.5 to 69.5%. If the content of $SiO_2$ is too small, the coefficient of thermal expansion tends to increase, so that a crystallized glass having excellent thermal shock resistance is less likely to be obtained. In addition, the chemical durability tends to decrease. On the other hand, if the content of $SiO_2$ is too large, the meltability of glass decreases and the viscosity of glass melt increases, so that the glass becomes difficult to clarify and difficult to form into shape, which makes the productivity likely to decrease. In addition, the time required for crystallization becomes long, so that the productivity is likely to decrease.

$Al_2O_3$ is a component that forms part of a glass network and also constitutes part of a $Li_2O$—$Al_2O_3$—$SiO_2$-based crystal. In addition, $Al_2O_3$ is a component that is located around a crystal nucleus and forms a core-shell structure. Because of the presence of a core-shell structure, a crystal nucleus component is less likely to be supplied from the outside of the shell, so that the crystal nuclei are less likely to become enlarged and a large number of fine crystal nuclei are likely to be formed. The content of $Al_2O_3$ is preferably 5 to 30%, 8 to 30%, 9 to 28%, 10 to 27%, 12 to 27%, 14 to 27%, 16 to 27%, 17 to 27%, 18 to 27%, 18 to 26.5%, 18.1 to 26.5%, 19 to 26.5%, 19.5 to 26.5%, 20 to 26.5%, or 20.5 to 26.5%, and particularly preferably 20.8 to 25.8%. If the content of $Al_2O_3$ is too small, the coefficient of thermal expansion tends to increase, so that a crystallized glass having excellent thermal shock resistance is less likely to be obtained. In addition, the chemical durability tends to decrease. Furthermore, the crystal nuclei become large, so that the crystallized glass is likely to be cloudy. On the other hand, if the content of $Al_2O_3$ is too large, the meltability of glass decreases and the viscosity of glass melt increases, so that the glass becomes difficult to clarify and difficult to form into shape, which makes the productivity likely to decrease. Furthermore, mullite crystals tend to be precipitated to devitrify the glass and the crystallized glass becomes susceptible to breakage.

$Li_2O$ is a constituent of a $Li_2O$—$Al_2O_3$—$SiO_2$-based crystal, and a component that largely influences the crystallinity and reduces the viscosity of glass to increase the meltability and formability of the glass. The content of $Li_2O$ is preferably 1 to 10%, 2 to 10%, 2 to 8%, 2.5 to 6%, 2.8 to 5.5%, 2.8 to 5%, 3 to 5%, 3 to 4.5%, or 3 to 4.2%, and particularly preferably 3.2 to 4%. If the content of $Li_2O$ is too small, mullite crystals tend to be precipitated to devitrify the glass. In addition, in crystallizing the glass, $Li_2O$—$Al_2O_3$—$SiO_2$-based crystals are less likely to be precipitated, so that a crystallized glass having excellent thermal shock resistance is difficult to obtain. Furthermore, the meltability of glass decreases and the viscosity of glass melt increases, so that the glass becomes difficult to clarify and difficult to form into shape, which makes the productivity likely to decrease. On the other hand, if the content of $Li_2O$ is too large, the crystallinity is excessively high, so that the glass tends to devitrify and the crystallized glass becomes susceptible to breakage.

$SiO_2$, $Al_2O_3$, and $Li_2O$ are main constituents of a β-quartz solid solution serving as a major crystalline phase and $Li_2O$ and $Al_2O_3$ compensate each other for their charges and thus are incorporated into a $SiO_2$ skeleton to form a solid solution. When these three components are contained at a suitable ratio in the glass, crystallization efficiently progresses, so that a crystallized glass can be produced at low cost. The ratio $(SiO_2+Al_2O_3)/Li_2O$ is preferably 20 or more, more preferably 20.2 or more, still more preferably 20.4 or more, even still more preferably 20.6 or more, even yet still more preferably 20.8 or more, and particularly preferably 21 or more.

$SnO_2$ is a component acting as a fining agent. Furthermore, $SnO_2$ is a component necessary for efficiently precipitating crystals in the crystallization process. On the other hand, $SnO_2$ is also a component that, if it is contained much, significantly increases the tinting of the glass. The content of $SnO_2$ is preferably 0 to 20%, over 0 to 20%, 0.05 to 20%, 0.1 to 10%, 0.1 to 5%, 0.1 to 4%, 0.1 to 3%, 0.15 to 3%, 0.2 to 3%, 0.2 to 2.7%, 0.2 to 2.4%, 0.25 to 2.4%, 0.3 to 2.4%, 0.35 to 2.4%, 0.4 to 2.4%, 0.45 to 2.4%, 0.5 to 2.4%, 0.5 to 2.35%, 0.5 to 2.3%, 0.5 to 2.2%, 0.5 to 2.1%, 0.5 to 2.05%, 0.5 to 2%, 0.5 to 1.95%, 0.5 to 1.93%, 0.5 to 1.91%, 0.5 to 1.9%, 0.5 to 1.88%, 0.5 to 1.85%, 0.5 to 1.83% or 0.5 to 1.81%, and particularly preferably 0.5 to 1.8%. If the content of $SnO_2$ is too small, the glass is difficult to clarify, which makes the productivity likely to decrease. Furthermore, the crystal nuclei may not be formed well, so that coarse crystals may precipitate to make the glass cloudy and subject to breakage. On the other hand, if the content of $SnO_2$ is too large, the tinting of the crystallized glass may be increased. Furthermore, the amount of $SnO_2$ evaporated during production tends to increase to increase the environmental burden.

$ZrO_2$ is a nucleating component for precipitating crystals in the crystallization process. The content of $ZrO_2$ is preferably 1 to 20%, 1 to 15%, 1 to 10%, 1 to 5%, 1.5 to 5%, 1.75 to 4.5%, 1.75 to 4.4%, 1.75 to 4.3%, 1.75 to 4.2%, 1.75 to 4.1%, 1.75 to 4%, 1.8 to 4%, 1.85 to 4%, 1.9 to 4%, 1.95 to 4%, 2 to 4%, 2.05 to 4%, 2.1 to 4%, 2.15 to 4%, 2.2 to 4%, 2.25 to 4%, 2.3 to 4%, 2.3 to 3.95%, 2.3 to 3.9%, 2.3 to 3.95%, 2.3 to 3.9%, 2.3 to 3.85%, 2.3 to 3.8%, over 2.7 to 3.8%, 2.8 to 3.8%, or 2.9 to 3.8%, and particularly preferably 3 to 3.8%. If the content of $ZrO_2$ is too small, the crystal nuclei may not be formed well, so that coarse crystals may precipitate to make the glass cloudy and subject to breakage. On the other hand, if the content of $ZrO_2$ is too large, coarse $ZrO_2$ crystals precipitate to make the glass devitrifiable and make the crystallized glass susceptible to breakage.

$SnO_2+ZrO_2$ is preferably 1 to 30%, 1.1 to 30%, 1.1 to 27%, 1.1 to 24%, 1.1 to 21%, 1.1 to 20%, 1.1 to 17%, 1.1 to 14%, 1.1 to 11%, 1.1 to 9%, 1.1 to 7.5%, 1.4 to 7.5%, 1.8 to 7.5%, 2.0 to 7.5%, 2.2 to 7%, 2.2 to 6.4%, 2.2 to 6.2%, 2.2 to 6%, 2.3 to 6%, 2.4 to 6%, or 2.5 to 6%, and particularly preferably 2.8 to 6%. If $SnO_2+ZrO_2$ is too small, the crystal nuclei are less likely to be precipitated and the glass is less likely to be crystallized. On the other hand, if $SnO_2+ZrO_2$ is too large, the crystal nuclei become large, so that the crystallized glass is likely to be cloudy.

$SnO_2$ has the effect of facilitating phase separation of $ZrO_2$. In order to efficiently cause phase separation to expedite nucleation and crystal growth in later processes while keeping the liquidus temperature low (reducing the risk of devitrification due to precipitation of a primary phase), the ratio $SnO_2/(SnO_2+ZrO_2)$ is, in terms of mass ratio, preferably 0.01 to 0.99, 0.01 to 0.98, 0.01 to 0.94, 0.01 to 0.90, 0.01 to 0.86, 0.01 to 0.82, 0.01 to 0.78, 0.01 to 0.74, 0.01 to 0.70, or 0.03 to 0.70, and particularly preferably 0.05 to 0.70.

Furthermore, $SnO_2$ causes a reaction of $SnO_2 \rightarrow SnO + \frac{1}{2}O_2$ at high temperatures to emit $O_2$ gas into the glass melt. This reaction is known as a clarification mechanism of $SnO_2$ and the $O_2$ gas emitted during reaction has not only a "defoaming action" to expand fine bubbles present in the glass melt and release them to the outside of the glass system, but also a "stirring action" to mix the glass melt. In the $Li_2O$—$Al_2O_3$—$SiO_2$-based crystallized glass according to the present invention, the contents of $SiO_2$ and $Al_2O_3$ account for over half of the composition and these components are hardly soluble. Therefore, in order to efficiently form a homogeneous glass melt, the three components need to be contained at a suitable ratio in the glass. The ratio $(SiO_2+Al_2O_3)/SnO_2$ is preferably 44 or more, 44.3 or more, 44.7 or more, 45 or more, 45.2 or more, 45.4 or more, 45.6 or more, or 45.8 or more, and particularly preferably 46 or more.

The ratio $Al_2O_3/(SnO_2+ZrO_2)$ is preferably 7.1 or less, 7.05 or less, 7.0 or less, 6.95 or less, 66.9 or less, 6.85 or less, 6.8 or less, 6.75 or less, 6.7 or less, 6.65 or less, 6.6 or less, 6.55 or less, 6.5 or less, 6.45 or less, 6.4 or less, 6.35 or less, 6.3 or less, 6.25 or less, 6.2 or less, 6.15 or less, 6.1 or less, 6.05 or less, 6.0 or less, 5.98 or less, 5.95 or less, 5.92 or less, 5.9 or less, 5.8 or less, 5.7 or less, or 5.6 or less, and particularly preferably 5.5 or less. If the ratio $Al_2O_3/(SnO_2+ZrO_2)$ is too large, nucleation does not efficiently progress, which makes efficient crystallization difficult. This tendency is likely to emerge when the glass contains less than 0.2% $TiO_2$. On the other hand, the ratio $Al_2O_3/(SnO_2+ZrO_2)$ is too small, the crystal nuclei become large, so that the crystallized glass is likely to be cloudy. Therefore, the lower limit of $Al_2O_3/(SnO_2+ZrO_2)$ is preferably 0.01 or more.

MgO is a component that can be incorporated into $Li_2O$—$Al_2O_3$—$SiO_2$-based crystals to form a solid solution together and increases the coefficient of thermal expansion of the $Li_2O$—$Al_2O_3$—$SiO_2$-based crystals. The content of MgO is preferably 0 to 10%, 0 to 8%, 0 to 6%, 0 to 5%, 0 to 4.5%, 0 to 4%, 0 to 3.5%, 0.02 to 3.5%, 0.05 to 3.5%, 0.08 to 3.5%, 0.1 to 3.5%, 0.1 to 3.3%, 0.1 to 3%, 0.13 to 3%, 0.15 to 3%, 0.17 to 3%, 0.19 to 3%, 0.2 to 2.9%, 0.2 to 2.7%, 0.2 to 2.5%, 0.2 to 2.3%, 0.2 to 2.2%, or 0.2 to 2.1%, and particularly preferably 0.2 to 2%. If the content of MgO is too small, the coefficient of thermal expansion tends to be excessively low. Furthermore, the amount of volume contraction, which occurs during crystal precipitation, may be excessively large. In addition, the difference in coefficient of thermal expansion between the crystalline phase and the remaining glass phase after crystallization becomes large, so that the crystallized glass may be susceptible to breakage. If the content of MgO is too large, the crystallinity becomes excessively high to make the glass devitrifiable and make the crystallized glass susceptible to breakage. Furthermore, the coefficient of thermal expansion tends to be excessively high.

$P_2O_5$ is a component that suppresses the precipitation of coarse $ZrO_2$ crystals. The content of $P_2O_5$ is preferably 0 to 10%, 0 to 8%, 0 to 6%, 0 to 5%, 0 to 4%, 0 to 3.5%, 0.02 to 3.5%, 0.05 to 3.5%, 0.08 to 3.5%, 0.1 to 3.5%, 0.1 to 3.3%, 0.1 to 3%, 0.13 to 3%, 0.15 to 3%, 0.17 to 3%, 0.19 to 3%, 0.2 to 2.9%, 0.2 to 2.7%, 0.2 to 2.5%, 0.2 to 2.3%, 0.2 to 2.2%, 0.2 to 2.1%, or 0.2 to 2%, and particularly preferably 0.3 to 1.8%. If the content of $P_2O_5$ is too small, coarse $ZrO_2$ crystals precipitate to make the glass devitrifiable and make the crystallized glass susceptible to breakage. On the other hand, if the content of $P_2O_5$ is too large, the amount of $Li_2O$—$Al_2O_3$—$SiO_2$-based crystals precipitated becomes small, so that the coefficient of thermal expansion tends to increase.

$TiO_2$ is a nucleating component for precipitating crystals in the crystallization process. On the other hand, if $TiO_2$ is contained much in the glass, it significantly increases the tinting of the glass. Particularly, zirconia titanate-based crystals containing $ZrO_2$ and $TiO_2$ act as crystal nuclei, but electrons transition from the valence band of oxygen serving as a ligand to the conduction bands of zirconia and titanium serving as central metals (LMCT transition), which involves the tinting of the crystallized glass. Furthermore, if titanium remains in the remaining glass phase, LMCT transition may occur from the valence band of the $SiO_2$ skeleton to the conduction band of tetravalent titanium in the remaining glass phase. In addition, d-d transition occurs in trivalent titanium in the remaining glass phase, which involves the tinting of the crystallized glass. In the case where titanium and iron coexist, the tinting like ilmenite ($FeTiO_3$) develops.

In another case, it is known that the coexistence of titanium and tin intensifies the yellowish tint of the glass. Therefore, the content of $TiO_2$ is preferably 0 to 4%, 0 to 3.5%, 0 to 3%, 0 to 2.5%, 0 to 2.2%, 0 to 2.1%, 0 to 2%, 0 to 1.95%, 0 to 1.9%, 0 to 1.8%, 0 to 1.7%, 0 to 1.6%, 0 to 1.5%, 0 to 1.4%, 0 to 1.3%, 0 to 1.2%, 0 to 1.1%, 0 to 1.05%, 0 to 1%, 0 to 0.95%, 0 to 0.9%, 0 to 0.85%, 0 to 0.8%, 0 to 0.75%, 0 to 0.7%, 0 to 0.65%, 0 to 0.6%, 0 to 0.55%, 0 to 0.5%, 0 to 0.48%, 0 to 0.46%, 0 to 0.44%, 0 to 0.42%, 0 to 0.4%, 0 to 0.38%, 0 to 0.36%, 0 to 0.34%, 0 to 0.32%, 0 to 0.3%, 0 to 0.28%, 0 to 0.26%, 0 to 0.24%, 0 to 0.22%, 0 to 0.2%, 0 to 0.18%, 0 to 0.16%, 0 to 0.14%, or 0 to 0.12%, and particularly preferably 0 to 0.1%. However, $TiO_2$ is likely to be mixed as impurities into the glass. Therefore, if complete removal of $TiO_2$ is pursued, the raw material batch tends to be expensive to increase the production cost. In order to reduce the increase in production cost, the lower limit of the content of $TiO_2$ is preferably 0.0003% or more, 0.0005% or more, 0.001% or more, 0.005% or more, or 0.01% or more, and particularly preferably 0.02% or more.

Each of $TiO_2$ and $ZrO_2$ is a component that can function as a crystal nucleus. Ti and Zr are congeners and are similar in electronegativity and ionic radius. Therefore, these elements are likely to take similar molecular conformations as oxides and the coexistence of $TiO_2$ and $ZrO_2$ is known to facilitate the occurrence of phase separation in the initial stage of crystallization. Hence, within a permissible range of tinting, the ratio $TiO_2/ZrO_2$ is preferably 0.0001 to 5.0, 0.0001 to 4.0, 0.0001 to 3.0, 0.0001 to 2.5, 0.0001 to 2.0, 0.0001 to 1.5, 0.0001 to 1.0, 0.0001 to 0.5, or 0.0001 to 0.4, and particularly preferably 0.0001 to 0.3. If $TiO_2/ZrO_2$ is too small, the raw material batch tends to be expensive to increase the production cost. On the other hand, if $TiO_2/ZrO_2$ is too large, the rate of crystal nucleation becomes low, so that the production cost may increase.

The $Li_2O$—$Al_2O_3$—$SiO_2$-based crystallized glass according to the present invention may contain, in addition to the above components, the following components in its glass composition.

$Na_2O$ is a component that can be incorporated into $Li_2O$—$Al_2O_3$—$SiO_2$-based crystals to forma solid solution together, and a component that largely influences the crystallinity and reduces the viscosity of glass to increase the meltability and formability of the glass. Furthermore, $Na_2O$ is also a component for controlling the coefficient of thermal expansion and refractive index of the crystallized glass. The content of $Na_2O$ is preferably 0 to 10%, 0 to 8%, 0 to 6%, 0 to 5%, 0 to 4.5%, 0 to 4%, 0 to 3.5%, 0 to 3%, 0 to 2.7%, 0 to 2.4%, 0 to 2.1%, or 0 to 1.8%, and particularly preferably 0 to 1.5%. If the content of $Na_2O$ is too large, the crystallinity is excessively high, so that the glass is likely to devitrify and the crystallized glass becomes susceptible to breakage.

Furthermore, the ionic radius of a Na cation is greater than those of a Li cation, a Mg cation, and so on being constituents of the major crystalline phase, and, therefore, the Na cation is less likely to be incorporated into the crystal, so that Na cations after crystallization are likely to remain in the remaining glass (glass matrix). For this reason, if the content of $Na_2O$ is too large, a difference in refractive index between the crystalline phase and the remaining glass phase is likely to occur, so that the crystallized glass tends to be likely to be cloudy. However, $Na_2O$ is likely to be mixed as impurities into the glass. Therefore, if complete removal of $Na_2O$ is pursued, the raw material batch tends to be expensive to increase the production cost. In order to reduce the increase in production cost, the lower limit of the content of $Na_2O$ is preferably 0.0003% or more, more preferably 0.00050 or more, and particularly preferably 0.001% or more.

$K_2O$ is a component that can be incorporated into $Li_2O$—$Al_2O_3$—$SiO_2$-based crystals to form a solid solution together, and a component that largely influences the crystallinity and reduces the viscosity of glass to increase the meltability and formability of the glass. Furthermore, $K_2O$ is also a component for controlling the coefficient of thermal expansion and refractive index of the crystallized glass. The content of $K_2O$ is preferably 0 to 10%, 0 to 8%, 0 to 6%, 0 to 5%, 0 to 4.5%, 0 to 4%, 0 to 3.5%, 0 to 3%, 0 to 2.7%, 0 to 2.4%, 0 to 2.1%, 0 to 1.8%, 0 to 1.5%, 0 to 1.4%, 0 to 1.3%, 0 to 1.2%, 0 to 1.1%, 0 to 1%, or 0 to 0.9%, and particularly preferably 0.1 to 0.8%. If the content of $K_2O$ is too large, the crystallinity is excessively high, so that the glass is likely to devitrify and the crystallized glass becomes susceptible to breakage. Furthermore, the ionic radius of a K cation is greater than those of a Li cation, a Mg cation, and so on being constituents of the major crystalline phase, and, therefore, the K cation is less likely to be incorporated into the crystal, so that K cations after crystallization are likely to remain in the remaining glass. For this reason, if the content of $K_2O$ is too large, a difference in refractive index between the crystalline phase and the remaining glass phase is likely to occur, so that the crystallized glass tends to be likely to be cloudy. However, $K_2O$ is likely to be mixed as impurities into the glass. Therefore, if complete removal of $K_2O$ is pursued, the raw material batch tends to be expensive to increase the production cost. In order to reduce the increase in production cost, the lower limit of the content of $K_2O$ is preferably 0.0003% or more, more preferably 0.0005% or more, and particularly preferably 0.001% or more.

Although $Li_2O$, $Na_2O$, and $K_2O$ are components that increase the meltability and formability of the glass, if the contents of these components are too large, the low-temperature viscosity excessively decreases, so that the glass may excessively flow during crystallization. Furthermore, $Li_2O$, $Na_2O$, and $K_2O$ are components that may deteriorate the weather resistance, water resistance, chemical resistance, and so on of the glass before crystallization. If the glass before crystallization is deteriorated by moisture or so on, a desired crystallization behavior and, as a result, desired properties may not be obtained. On the other hand, $ZrO_2$ is a component that functions as a nucleating agent and has the effect of preferentially crystallizing in an initial stage of crystallization to reduce the flow of the remaining glass. Furthermore, $ZrO_2$ has the effect of efficiently filling the voids of the glass network principally involving a $SiO_2$ skeleton to block the diffusion of protons, various chemical components, and so on in the glass network, thus increasing the weather resistance, water resistance, chemical resistance, and so on of the glass before crystallization. In order to obtain a crystallized glass having a desired shape and desired properties, the ratio $(Li_2O+Na_2O+K_2O)/ZrO_2$ should be suitably controlled. The ratio $(Li_2O+Na_2O+K_2O)/ZrO_2$ is preferably 2.0 or less, more preferably 1.98 or less, still more preferably 1.96 or less, yet still more preferably 1.94 or less, even yet still more preferably 1.92 or less, and particularly preferably 1.90 or less.

CaO is a component that reduces the viscosity of glass to increase the meltability and formability of the glass. Furthermore, CaO is also a component for controlling the coefficient of thermal expansion and refractive index of the crystallized glass. The content of CaO is preferably 0 to 10%, 0 to 8%, 0 to 6%, 0 to 5%, 0 to 4.5%, 0 to 4%, 0 to 3.5%, 0 to 3%, 0 to 2.7%, 0 to 2.4%, 0 to 2.1%, or 0 to 1.8%, and particularly preferably 0 to 1.5%. If the content of CaO is too large, the glass is likely to devitrify and the crystallized glass becomes susceptible to breakage. Furthermore, the ionic radius of a Ca cation is greater than those of a Li cation, a Mg cation, and so on being constituents of the major crystalline phase, and, therefore, the Ca cation is less likely to be incorporated into the crystal, so that Ca cations after crystallization are likely to remain in the remaining glass. For this reason, if the content of CaO is too large, a difference in refractive index between the crystalline phase and the remaining glass phase is likely to occur, so that the crystallized glass tends to be likely to be cloudy. However, CaO is likely to be mixed as impurities into the glass. Therefore, if complete removal of CaO is pursued, the raw material batch tends to be expensive to increase the production cost. In order to reduce the increase in production cost, the lower limit of the content of CaO is preferably 0.0001% or more, more preferably 0.0003% or more, and particularly preferably 0.0005% or more.

SrO is a component that reduces the viscosity of glass to increase the meltability and formability of the glass. Furthermore, SrO is also a component for controlling the coefficient of thermal expansion and refractive index of the crystallized glass. The content of SrO is preferably 0 to 10%, 0 to 8%, 0 to 6%, 0 to 5%, 0 to 4.5%, 0 to 4%, 0 to 3.5%, 0 to 3%, 0 to 2.7%, 0 to 2.4%, 0 to 2.1%, 0 to 1.8%, or 0 to 1.5%, and particularly preferably 0 to 1%. If the content of SrO is too large, the glass is likely to devitrify and the crystallized glass becomes susceptible to breakage. Furthermore, the ionic radius of a Sr cation is greater than those of a Li cation, a Mg cation, and so on being constituents of the major crystalline phase, and, therefore, the Sr cation is less likely to be incorporated into the crystal, so that Sr cations after crystallization are likely to remain in the remaining glass. For this reason, if the content of SrO is too large, a difference in refractive index between the crystalline phase and the remaining glass phase is likely to occur, so that the crystallized glass tends to be likely to be cloudy. However, SrO is likely to be mixed as impurities into the glass. Therefore, if complete removal of SrO is pursued, the raw material batch tends to be expensive to increase the production cost. In order to reduce the increase in production cost, the lower limit of the content of SrO is preferably 0.0001% or more, more preferably 0.0003% or more, and particularly preferably 0.0005% or more.

BaO is a component that reduces the viscosity of glass to increase the meltability and formability of the glass. Furthermore, BaO is also a component for controlling the coefficient of thermal expansion and refractive index of the crystallized glass. The content of BaO is preferably 0 to 10%, 0 to 8%, 0 to 6%, 0 to 5%, 0 to 4.5%, 0 to 4%, 0 to 3.5%, 0 to 3%, 0 to 2.7%, 0 to 2.4%, 0 to 2.1%, 0 to 1.8%, or 0 to 1.5%, and particularly preferably 0 to 1%. If the content of BaO is too large, crystals containing Ba precipitate to make the glass devitrifiable and make the crystallized glass susceptible to breakage. Furthermore, the ionic radius of a Ba cation is greater than those of a Li cation, a Mg cation, and so on being constituents of the major crystalline phase, and, therefore, the Ba cation is less likely to be incorporated into the crystal, so that Ba cations after crystallization are likely to remain in the remaining glass. For this reason, if the content of BaO is too large, a difference in refractive index between the crystalline phase and the remaining glass phase is likely to occur, so that the crystallized glass tends to be likely to be cloudy. However, BaO is likely to be mixed as impurities into the glass.

Therefore, if complete removal of BaO is pursued, the raw material batch tends to be expensive to increase the production cost. In order to reduce the increase in production cost, the lower limit of the content of BaO is preferably 0.0001% or more, more preferably 0.0003% or more, and particularly preferably 0.0005% or more.

Although MgO, CaO, SrO, and BaO are components that increase the meltability and formability of the glass, if the contents of these components are too large, the low-temperature viscosity excessively decreases, so that the glass may excessively flow during crystallization. On the other hand, $ZrO_2$ is a component that functions as a nucleating agent and has the effect of preferentially crystallizing in an initial stage of crystallization to reduce the flow of the remaining glass. In order to obtain a crystallized glass having a desired shape and desired properties, the ratio (MgO+CaO+SrO+BaO)/$ZrO_2$ should be suitably controlled. The ratio (MgO+CaO+SrO+BaO)/$ZrO_2$ is preferably 0 to 3, 0 to 2.8, 0 to 2.6, 0 to 2.4, 0 to 2.2, 0 to 2.1, 0 to 2, 0 to 1.8, 0 to 1.7, or 0 to 1.6, and particularly preferably 0 to 1.5.

$Na_2O$, $K_2O$, CaO, SrO, and BaO are likely to remain in the remaining glass after crystallization. Therefore, if the total amount of these components are too large, a difference in refractive index between the crystalline phase and the remaining glass phase is likely to occur, so that the crystallized glass tends to be likely to be cloudy. Therefore, $Na_2O$+$K_2O$+CaO+SrO+BaO is preferably 8% or less, 7% or less, 6% or less, 5% or less, 4.5% or less, 4% or less, 3.5% or less, 3% or less, 2.7% or less, 2.42% or less, 2.415% or less, 2.410% or less, or 2.405% or less, and particularly preferably 2.4% or less.

$Li_2O$, $Na_2O$, $K_2O$, MgO, CaO, SrO, and BaO are components that increase the meltability and formability of the glass. Furthermore, a glass melt containing MgO, CaO, SrO, and BaO much is likely to have a gentle change in viscosity (viscosity curve) with respect to temperature, while a glass melt containing $Li_2O$, $Na_2O$, and $K_2O$ much is likely to have a steep change in viscosity with respect to temperature. If the change in viscosity curve is too gentle, the glass may flow even after it has been formed into a predetermined shape and, therefore, a desired shape is difficult to obtain. On the other hand, if the change in viscosity curve is too steep, the glass melt may solidify in the middle of forming into shape and, therefore, a desired shape is difficult to obtain. Therefore, the ratio (MgO+CaO+SrO+BaO)/($Li_2O$+$Na_2O$+$K_2O$) should be suitably controlled. The ratio (MgO+CaO+SrO+BaO)/($Li_2O$+$Na_2O$+$K_2O$) is preferably 0 to 2, 0 to 1.8, 0 to 1.5, 0 to 1.2, 0 to 1, 0 to 0.9, 0 to 0.8, 0 to 0.7, 0 to 0.6, or 0 to 0.5, and particularly preferably 0 to 0.45.

ZnO is a component that can be incorporated into $Li_2O$—$Al_2O_3$—$SiO_2$-based crystals to form a solid solution together and largely influences the crystallinity. Furthermore, ZnO is also a component for controlling the coefficient of thermal expansion and refractive index of the crystallized glass. The content of ZnO is preferably 0 to 10%, 0 to 8%, 0 to 6%, 0 to 5%, 0 to 4.5%, 0 to 4%, 0 to 3.5%, 0 to 3%, 0 to 2.7%, 0 to 2.4%, 0 to 2.1%, 0 to 1.8%, or 0 to 1.5%, and particularly preferably 0 to 1%. If the content of ZnO is too large, the crystallinity becomes excessively high to make the glass devitrifiable and susceptible to breakage. However, ZnO is likely to be mixed as impurities into the glass. Therefore, if complete removal of ZnO is pursued, the raw material batch tends to be expensive to increase the production cost. In order to reduce the increase in production cost, the lower limit of the content of ZnO is preferably 0.0001% or more, more preferably 0.0003% or more, and particularly preferably 0.0005% or more.

It can be assumed that, in the $Li_2O$—$Al_2O_3$—$SiO_2$-based crystallized glass, Li cations, Mg cations, and Zn cations are components soluble in a β-quartz solid solution and components less contributing to the increase in the refractive index of the remaining glass after crystallization than Ba cations and so on. Furthermore, $Li_2O$, MgO, and ZnO function as a flux in vitrifying a raw material and, therefore, can be said to be important components to the production of a clear and colorless crystallized glass at low temperatures. $Li_2O$ is an essential component to achieve low expansion and needs to be contained in an amount of 1% or more in the glass. Although the glass needs to contain a necessary amount of $Li_2O$ in order to achieve a desired coefficient of thermal expansion and so on, if MgO and ZnO are also increased in content, the viscosity of the glass may excessively decrease. If the low-temperature viscosity excessively decreases, the softening and flowing properties of the glass become excessively high during firing, so that the glass may be difficult to crystallize into a desired shape. On the other hand, if the high-temperature viscosity excessively decreases, the thermal load on production facilities decreases, but the convection velocity during heating increases, so that the glass may be likely to physically erode refractory or the like. Therefore, the content ratio among $Li_2O$, MgO, and ZnO is preferably controlled and, particularly, the total amount of MgO and ZnO with respect to the amount of $Li_2O$ having a high function as a flux is preferably controlled. Specifically, the ratio (MgO+ZnO)/$Li_2O$ is, in terms of mass ratio, preferably as small as 0.394 or less, 0.393 or less, 0.392 or less, or 0.391 or less, and particularly preferably as small as 0.390 or less, or preferably as large as 0.755 or more, 0.756 or more, 0.757 or more, or 0.758 or more, and particularly preferably as large as 0.759 or more.

$B_2O_3$ is a component that reduces the viscosity of glass to increase the meltability and formability of the glass. Furthermore, $B_2O_3$ is a component that can be involved in the likelihood of phase separation during crystal nucleation. The content of $B_2O_3$ is preferably 0 to 10%, 0 to 8%, 0 to 6%, 0 to 5%, 0 to 4.5%, 0 to 4%, 0 to 3.5%, 0 to 3%, 0 to 2.7%, 0 to 2.4%, 0 to 2.1%, or 0 to 1.8%, and particularly preferably 0 to 1.5%. If the content of $B_2O_3$ is too large, the amount of $B_2O_3$ evaporated during melting becomes large, so that the environmental burden increases. However, $B_2O_3$ is likely to be mixed as impurities into the glass. Therefore, if complete removal of $B_2O_3$ is pursued, the raw material batch tends to be expensive to increase the production cost. In order to reduce the increase in production cost, the content of $B_2O_3$ is preferably 0.0001% or more, more preferably 0.0003% or more, and particularly preferably 0.0005% or more.

It is known that, in $Li_2O$—$Al_2O_3$—$SiO_2$-based crystallized glasses, phase separated regions are formed in the glass before crystal nucleation and, then, crystal nuclei made of $TiO_2$, $ZrO_2$ and so on are formed in the phase separated regions. Because $SnO_2$, $ZrO_2$, $P_2O_5$, $TiO_2$, and $B_2O_3$ are strongly involved in the formation of phase separation, $SnO_2$+$ZrO_2$+$P_2O_5$+$TiO_2$+$B_2O_3$ is preferably 1.5 to 30%, 1.5 to 26%, 1.5 to 22%, 1.5 to 20%, 1.5 to 18%, 1.5 to 16%, 1.5 to 15%, 1.8 to 15%, 2.1 to 15%, 2.4 to 15%, 2.5 to 15%, 2.8 to 15%, 2.8 to 13%, 2.8 to 12%, 2.8 to 11%, 2.8 to 10%, 3 to 9.5%, or 3 to 9.2%, and particularly preferably to 9%, and the ratio $SnO_2$/($SnO_2$+$ZrO_2$+$P_2O_5$+$TiO_2$+$B_2O_3$) is preferably 0.06 or more, 0.07 or more, 0.08 or more, 0.09 or more, 0.1 or more, 0.103 or more, 0.106 or more, 0.11 or more, 0.112 or more, 0.115 or more, 0.118 or more, 0.121 or more, 0.124 or more, 0.127 or more, or 0.128 or more, and particularly preferably 0.13 or more. If $P_2O_5+B_2O_3+SnO_2+TiO_2+ZrO_2$ is too small, phase separated regions are less likely to be formed and, therefore, the glass is less likely to be crystallized. On the other hand, if $P_2O_5+B_2O_3+SnO_2+TiO_2+ZrO_2$ is too large and/or $SnO_2/(SnO_2+ZrO_2+P_2O_5+TiO_2+B_2O_3)$ is too small, phase separated regions become large, so that the crystallized glass is likely to be cloudy. There is no particular limitation as to the upper limit of $SnO_2/(SnO_2+ZrO_2+P_2O_5+TiO_2+B_2O_3)$, but it is actually not more than 0.9.

$Fe_2O_3$ is a component that increases the tinting of the glass and, particularly, a component that significantly increases the tinting by interactions with $TiO_2$ and $SnO_2$. The content of $Fe_2O_3$ is preferably 0.10% or less, 0.08% or less, 0.06% or less, 0.05% or less, 0.04% or less, 0.035% or less, 0.03% or less, 0.02% or less, 0.015% or less, 0.013% or less, 0.012% or less, 0.011% or less, 0.01% or less, 0.009% or less, 0.008% or less, 0.007% or less, 0.006% or less, 0.005% or less, 0.004% or less, or 0.003% or less, and particularly preferably 0.002% or less. However, $Fe_2O_3$ is likely to be mixed as impurities into the glass. Therefore, if complete removal of $Fe_2O_3$ is pursued, the raw material batch tends to be expensive to increase the production cost. In order to reduce the increase in production cost, the lower limit of the content of $Fe_2O_3$ is preferably 0.0001% or more, 0.0002% or more, 0.0003% or more, or 0.0005% or more, and particularly preferably 0.001% or more.

In the case of coexistence of titanium and iron, the tinting like ilmenite ($FeTiO_3$) may develop. Particularly, in $Li_2O$—$Al_2O_3$—$SiO_2$-based crystallized glasses, titanium and iron components not precipitated as crystal nuclei or major crystals may remain in the remaining glass after crystallization to facilitate the development of the tinting. These components may be able to be reduced in amount in terms of design. However, because $TiO_2$ and $Fe_2O_3$ are likely to be mixed as impurities into the glass, if complete removal of them is pursued, the raw material batch tends to be expensive to increase the production cost. Therefore, in order to reduce the production cost, the glass may contain $TiO_2$ and $Fe_2O_3$ within the above-described ranges. In order to further reduce the production cost, the glass may contain both the components within a permissible range of tinting. In this case, the ratio $TiO_2/(TiO_2+Fe_2O_3)$ is preferably 0.001 to 0.999, 0.003 to 0.997, 0.005 to 0.995, 0.007 to 0.993, 0.009 to 0.991, 0.01 to 0.99, 0.1 to 0.9, 0.15 to 0.85, 0.2 to 0.8, 0.25 to 0.25, 0.3 to 0.7, or 0.35 to 0.65, and particularly preferably 0.4 to 0.6. Thus, a crystallized glass having a high degree of clearness and colorlessness can be easily obtained inexpensively.

Pt is a component that can be incorporated in a state of ions, colloid, metal or so on into the glass and causes the glass to develop a yellowish to ginger tint. Furthermore, this tendency is significant after crystallization. In addition, intensive studies have shown that the incorporation of Pt may cause the crystallized glass to be influenced in nucleation and crystallizing behavior, so that the crystallized glass may be likely to be cloudy. Therefore, the content of Pt is preferably 7 ppm or less, 6 ppm or less, 5 ppm or less, 4 ppm or less, 3 ppm or less, 2 ppm or less, 1.6 ppm or less, 1.4 ppm or less, 1.2 ppm or less, 1 ppm or less, 0.9 ppm or less, 0.8 ppm or less, 0.7 ppm or less, 0.6 ppm or less, 0.5 ppm or less, 0.45 ppm or less, 0.40 ppm or less, or 0.35 ppm or less, and particularly preferably 0.30 ppm or less. Although the incorporation of Pt should be avoided as much as possible, there may be a case where, with the use of general melting facilities, Pt members need to be used in order to obtain a homogeneous glass. Therefore, if complete removal of Pt is pursued, the production cost tends to increase. In the absence of any adverse effect in terms of tinting, in order to reduce the increase in production cost, the lower limit of the content of Pt is preferably 0.0001 ppm or more, 0.001 ppm or more, 0.005 ppm or more, 0.01 ppm or more, 0.02 ppm or more, 0.03 ppm or more, 0.04 ppm or more, 0.05 ppm or more, or 0.06 ppm or more, and particularly preferably 0.07 ppm or more. Furthermore, so long as the tinting is permitted, Pt may be used as a nucleating agent for promoting the precipitation of the major crystalline phase, as with $ZrO_2$ or $TiO_2$. In doing so, Pt may be used alone as a nucleating agent or used as a nucleating agent in combination with other components. In using Pt as a nucleating agent, its form (colloid, metallic crystals or so on) is not particularly limited.

Rh is a component that can be incorporated in a state of ions, colloid, or metal or so on into the glass and tends to cause the glass to develop a yellowish to ginger tint and make the crystallized glass cloudy, like Pt. Therefore, the content of Rh is preferably 7 ppm or less, 6 ppm or less, 5 ppm or less, 4 ppm or less, 3 ppm or less, 2 ppm or less, 1.6 ppm or less, 1.4 ppm or less, 1.2 ppm or less, 1 ppm or less, 0.9 ppm or less, 0.8 ppm or less, 0.7 ppm or less, 0.6 ppm or less, 0.5 ppm or less, 0.45 ppm or less, 0.40 ppm or less, or 0.35 ppm or less, and particularly preferably 0.30 ppm or less. Although the incorporation of Rh should be avoided as much as possible, there may be a case where, with the use of general melting facilities, Rh members need to be used in order to obtain a homogeneous glass. Therefore, if complete removal of Rh is pursued, the production cost tends to increase. In the absence of any adverse effect in terms of tinting, in order to reduce the increase in production cost, the lower limit of the content of Rh is preferably 0.0001 ppm or more, 0.001 ppm or more, 0.005 ppm or more, 0.01 ppm or more, 0.02 ppm or more, 0.03 ppm or more, 0.04 ppm or more, 0.05 ppm or more, or 0.06 ppm or more, and particularly preferably 0.07 ppm or more. Furthermore, so long as the tinting is permitted, Rh may be used as a nucleating agent, as with $ZrO_2$ or $TiO_2$. In doing so, Rh may be used alone as a nucleating agent or used as a nucleating agent in combination with other components. In using Rh as a nucleating agent, its form (colloid, metallic crystals or so on) is not particularly limited.

In addition, Pt+Rh is preferably 9 ppm or less, 8 ppm or less, 7 ppm or less, 6 ppm or less, 5 ppm or less, 4.75 ppm or less, 4.5 ppm or less, 4.25 ppm or less, 4 ppm or less, 3.75 ppm or less, 3.5 ppm or less, 3.25 ppm or less, 3 ppm or less, 2.75 ppm or less, 2.5 ppm or less, 2.25 ppm or less, 2 ppm or less, 1.75 ppm or less, 1.5 ppm or less, 1.25 ppm or less, 1 ppm or less, 0.95 ppm or less, 0.9 ppm or less, 0.85 ppm or less, 0.8 ppm or less, 0.75 ppm or less, 0.7 ppm or less, 0.65 ppm or less, 0.60 ppm or less, 0.55 ppm or less, 0.50 ppm or less, 0.45 ppm or less, 0.40 ppm or less, or 0.35 ppm or less, and particularly preferably 0.30 ppm or less. Although the incorporation of Pt and Rh should be avoided as much as possible, there may be a case where, with the use of general melting facilities, Pt members and Rh members need to be used in order to obtain a homogeneous glass. Therefore, if complete removal of Pt and Rh is pursued, the production cost tends to increase. In the absence of any adverse effect in terms of tinting, in order to reduce the increase in production cost, the lower limit of Pt+Rh is preferably 0.0001 ppm or more, 0.001 ppm or more, 0.005 ppm or more, 0.01 ppm or more, 0.02 ppm or more, 0.03 ppm or more, 0.04 ppm or more, 0.05 ppm or more, or 0.06 ppm or more, and particularly preferably 0.07 ppm or more.

In developing a glass material, it is general to produce glasses having various compositions using various crucibles. Therefore, platinum and rhodium evaporated from crucibles are often present in the interior of an electric furnace for use in melting. It has been confirmed that Pt and Rh present in the interior of an electric furnace is incorporated into glass. In order to control the amount of Pt and Rh incorporated, not only the raw materials for use and the material for the crucible may be selected, but also a lid made of quartz may be fitted on the crucible or the melting temperature or melting time may be reduced. Thus, it is possible to control the content of Pt and Rh in the glass.

$As_2O_3$ and $Sb_2O_3$ are highly toxic and may contaminate the environment during the production process of glass and during treatment of waste glass. Therefore, the $Li_2O$—$Al_2O_3$—$SiO_2$-based crystallized glass according to the present invention is preferably substantially free of these components (specifically, the content of them is less than 0.1% by mass).

In the absence of any adverse effect in terms of tinting, the $Li_2O$—$Al_2O_3$—$SiO_2$-based crystallized glass according to the present invention may contain, in addition to the above components, minor components, including $H_2$, $CO_2$, CO, $H_2O$, He, Ne, Ar, and $N_2$, each up to 0.1%. Furthermore, when Ag, Au, Pd, Ir, V, Cr, Sc, Ce, Pr, Pm, Sm, Eu, Gd, Tb, Dy, Ho, Er, Tm, Yb, Lu, Ac, Th, Pa, U, and so on are deliberately incorporated into the glass, the raw material cost increases, so that the production cost tends to increase. Meanwhile, when a glass containing Ag or Au is subjected to light irradiation or heat treatment, agglomerates of these components are formed and crystallization can be promoted based on these agglomerates. Moreover, Pd and so on have various catalytic actions. When the glass contains these components, the glass and the crystallized glass can be given specific functions. In view of the above circumstances, when being aimed at giving the function of promoting crystallization or other functions, the glass may contain each of the above components in an amount of 1% or less, 0.5% or less, 0.3% or less, or 0.1% or less. Otherwise, the content of each of the above components is preferably 500 ppm or less, 300 ppm or less, or 100 ppm or less, and particularly preferably 10 ppm or less.

Furthermore, in the absence of any adverse effect in terms of tinting, the $Li_2O$—$Al_2O_3$—$SiO_2$-based crystallized glass according to the present invention may contain $SO_3$, MnO, $Cl_2$, $Y_2O_3$, $MoO_3$, $La_2O_3$, $WO_3$, $HfO_2$, $Ta_2O_5$, $Nd_2O_3$, $Nb_2O_5$, $RfO_2$, and so on up to 10% in total. However, the raw material batch of the above components is expensive, so that the production cost tends to increase. Therefore, these components may not be incorporated into the glass unless the circumstances are exceptional. Particularly, $HfO_2$ involves a high raw material cost and $Ta_2O_5$ may become a conflict mineral. Therefore, the total content of these components is, in terms of % by mass, preferably 5% or less, 4% or less, 3% or less, 2% or less, 1% or less, 0.5% or less, 0.4% or less, 0.3% or less, 0.2% or less, 0.1% or less, 0.05% or less, less than 0.05%, 0.049% or less, 0.048% or less, 0.047% or less, or 0.046% or less, and particularly preferably 0.045% or less.

Taken together, a preferred composition range in implementing the $Li_2O$—$Al_2O_3$—$SiO_2$-based crystallized glass according to the present invention is 50 to 75% $SiO_2$, 10 to 30% $Al_2O_3$, 1 to 8% $Li_2O$, 0 to 5% $SnO_2$, 1 to 5% $ZrO_2$, 0 to 10% MgO, 0 to 5% $P_2O_5$, 0 to below 2% $TiO_2$, 0 to 1.5 $(Li_2O+Na_2O+K_2O)/ZrO_2$, 0.01 to 0.99 $TiO_2/(TiO_2+Fe_2O_3)$, and 0 to 0.8 $(MgO+ZnO)/Li_2O$, preferably, 50 to 75% $SiO_2$, 10 to 30% $Al_2O_3$, 1 to 8% $Li_2O$, over 0 to 5% $SnO_2$, 1 to 5% $ZrO_2$, 0 to 10% MgO, 0 to 5% $P_2O_5$, 0 to below 2% $TiO_2$, 0 to 1.5 $(Li_2O+Na_2O+K_2O)/ZrO_2$, 0.01 to 0.99 $TiO_2/(TiO_2+Fe_2O_3)$, 0 to 0.8 $(MgO+ZnO)/Li_2O$, and 0 to 0.5 $(MgO+CaO+SrO+BaO)/(Li_2O+Na_2O+K_2O)$, more preferably, 50 to 75% $SiO_2$, 10 to 30% $Al_2O_3$, 1 to 8% $Li_2O$, over 0 to 5% $SnO_2$, 1 to 5% $ZrO_2$, 0 to 10% MgO, 0 to 5% $P_2O_5$, 0 to below 2% $TiO_2$, 0 to 1.5 $(Li_2O+Na_2O+K_2O)/ZrO_2$, 0.01 to 0.99 $TiO_2/(TiO_2+Fe_2O_3)$, 0 to 0.8 $(MgO+ZnO)/Li_2O$, 0 to 0.5 $(MgO+CaO+SrO+BaO)/(Li_2O+Na_2O+K_2O)$, and 0 to 2 $(MgO+CaO+SrO+BaO)/ZrO_2$, still more preferably, 50 to 75% $SiO_2$, 10 to 30% $Al_2O_3$, 1 to 8% $Li_2O$, over 0 to 5% $SnO_2$, 1 to 5% $ZrO_2$, 0 to 10% MgO, 0 to 5% $P_2O_5$, 0 to below 2% $TiO_2$, 0 to 1.5 $(Li_2O+Na_2O+K_2O)/ZrO_2$, 0.01 to 0.99 $TiO_2/(TiO_2+Fe_2O_3)$, 0 to 0.8 $(MgO+ZnO)/Li_2O$, 0 to 0.5 $(MgO+CaO+SrO+BaO)/(Li_2O+Na_2O+K_2O)$, 0 to 2 $(MgO+CaO+SrO+BaO)/ZrO_2$, and 0.06 to 0.9 $SnO_2/(SnO_2+ZrO_2+P_2O_5+TiO_2+B_2O_3)$, yet still more preferably, 50 to 75% $SiO_2$, 10 to 30% $Al_2O_3$, 1 to 8% $Li_2O$, over 0 to 5% $SnO_2$, 1 to 5% $ZrO_2$, 0 to 10% MgO, 0 to 5% $P_2O_5$, 0 to below 2% $TiO_2$, 0 to 1.5 $(Li_2O+Na_2O+K_2O)/ZrO_2$, 0.01 to 0.99 $TiO_2/(TiO_2+Fe_2O_3)$, 0 to 0.8 $(MgO+ZnO)/Li_2O$, 0 to 0.5 $(MgO+CaO+SrO+BaO)/(Li_2O+Na_2O+K_2O)$, 0 to 2 $(MgO+CaO+SrO+BaO)/ZrO_2$, 0.06 to 0.9 $SnO_2/(SnO_2+ZrO_2+P_2O_5+TiO_2+B_2O_3)$, and 0 to 5 ppm Pt+Rh, even yet still more preferably, 50 to 75% $SiO_2$, 10 to 30% $Al_2O_3$, 1 to 8% $Li_2O$, over 0 to 5% $SnO_2$, 1 to 5% $ZrO_2$, 0 to 10% MgO, 0 to 5% $P_2O_5$, 0 to below 2% $TiO_2$, 0 to 1.5 $(Li_2O+Na_2O+K_2O)/ZrO_2$, 0.01 to 0.99 $TiO_2/(TiO_2+Fe_2O_3)$, 0 to 0.394 $(MgO+ZnO)/Li_2O$, 0 to 0.5 $(MgO+CaO+SrO+BaO)/(Li_2O+Na_2O+K_2O)$, 0 to 2 $(MgO+CaO+SrO+BaO)/ZrO_2$, 0.06 to 0.9 $SnO_2/(SnO_2+ZrO_2+P_2O_5+TiO_2+B_2O_3)$, and 0 to 5 ppm Pt+Rh, and particularly preferably, 50 to 75% $SiO_2$, 10 to 30% $Al_2O_3$, 1 to 8% $Li_2O$, over 0 to 5% $SnO_2$, 1 to 5% $ZrO_2$, 0 to 10% MgO, 0 to 5% $P_2O_5$, 0 to below 2% $TiO_2$, 0 to 1.5 $(Li_2O+Na_2O+K_2O)/ZrO_2$, 0.01 to 0.99 $TiO_2/(TiO_2+Fe_2O_3)$, 0 to 0.394 $(MgO+ZnO)/Li_2O$, 0 to 0.5 $(MgO+CaO+SrO+BaO)/(Li_2O+Na_2O+K_2O)$, 0 to 2 $(MgO+CaO+SrO+BaO)/ZrO_2$, 0.06 to 0.9 $SnO_2/(SnO_2+ZrO_2+P_2O_5+TiO_2+B_2O_3)$, 0 to 5 ppm Pt+Rh, and 0 to below 0.05% $HfO_2+Ta_2O_5$.

The $Li_2O$—$Al_2O_3$—$SiO_2$-based crystallized glass according to the present invention having the above composition is likely to have a clear and colorless appearance.

In the $Li_2O$—$Al_2O_3$—$SiO_2$-based crystallized glass according to the present invention, the transmittance at a thickness of 3 mm and a wavelength of 200 nm is preferably 0% or more, 2.5% or more, 5% or more, 10% or more, 12% or more, 14% or more, 16% or more, 18% or more, 20% or more, 22% or more, 24% or more, 26% or more, 28% or more, 30% or more, 32% or more, 34% or more, 36% or more, 38% or more, 40% or more, 40.5% or more, 41% or more, 41.5% or more, 42% or more, 42.5% or more, 43% or more, 43.5% or more, 44% or more, or 44.5% or more, and particularly preferably 45% or more. In applications requiring to transmit ultraviolet light, if the transmittance at a wavelength of 200 nm is too low, a desired transmission ability may not be able to be obtained. Particularly, when using in optical cleaning using an ozone lamp, medical treatments using an excimer laser, light exposure, and so on, the transmittance at a wavelength of 200 nm is preferably higher.

In the $Li_2O$—$Al_2O_3$—$SiO_2$-based crystallized glass according to the present invention, the transmittance at a thickness of 3 mm and a wavelength of 250 nm is preferably 0% or more, 1% or more, 2% or more, 3% or more, 4% or more, 5% or more, 6% or more, 7% or more, 8% or more, 9% or more, 10% or more, 10.5% or more, 11% or more, 11.5% or more, 12% or more, 12.5% or more, 13% or more, 13.5% or more, 14% or more, 14.5% or more, 15% or more, or 15.5% or more, and particularly preferably 16% or more. In applications requiring to transmit ultraviolet light, if the transmittance at a wavelength of 250 nm is too low, a desired transmission ability may not be able to be obtained. Particularly, when using in sterilization using a low-pressure mercury lamp, processing using a YAG laser, and so on, the transmittance at a wavelength of 250 nm is preferably higher.

In the $Li_2O$—$Al_2O_3$—$SiO_2$-based crystallized glass according to the present invention, the transmittance at a thickness of 3 mm and a wavelength of 300 nm is preferably 0% or more, 2.5% or more, 5% or more, 10% or more, 12% or more, 14% or more, 16% or more, 18% or more, 20% or more, 22% or more, 24% or more, 26% or more, 28% or more, 30% or more, 32% or more, 34% or more, 36% or more, 38% or more, 40% or more, 40.5% or more, 41% or more, 41.5% or more, 42% or more, 42.5% or more, 43% or more, 43.5% or more, 44% or more, or 44.5% or more, and particularly preferably 45% or more. Particularly, when using in UV hardening, adhesion, and drying (UV curing), fluorescent detection of printed matters, insect attraction, and so on, the transmittance at a wavelength of 300 nm is preferably higher.

In the $Li_2O$—$Al_2O_3$—$SiO_2$-based crystallized glass according to the present invention, the transmittance at a thickness of 3 mm and a wavelength of 325 nm is preferably 0% or more, 2.5% or more, 5% or more, 10% or more, 12% or more, 14% or more, 16% or more, 18% or more, 20% or more, 22% or more, 24% or more, 26% or more, 28% or more, 30% or more, 32% or more, 34% or more, 36% or more, 38% or more, 40% or more, 42% or more, 44% or more, 46% or more, 48% or more, 50% or more, 52% or more, 54% or more, 56% or more, 57% or more, 58% or more, 59% or more, 60% or more, 61% or more, 62% or more, 63% or more, or 64% or more, and particularly preferably 65% or more. Particularly, when using in UV hardening, adhesion, and drying (UV curing), fluorescent detection of printed matters, insect attraction, and so on, the transmittance at a wavelength of 325 nm is preferably higher.

In the $Li_2O$—$Al_2O_3$—$SiO_2$-based crystallized glass according to the present invention, the transmittance at a thickness of 3 mm and a wavelength of 350 nm is preferably 0% or more, 5% or more, 10% or more, 15% or more, 20% or more, 25% or more, 30% or more, 35% or more, 40% or more, 45% or more, 50% or more, 55% or more, 60% or more, 65% or more, 70% or more, 71% or more, 72% or more, 73% or more, 74% or more, 75% or more, 76% or more, 77% or more, 78% or more, 80% or more, 81% or more, 82% or more, or 83% or more, and particularly preferably 84% or more. Particularly, when using in processing using a YAG laser and so on, the transmittance at a wavelength of 350 nm is preferably higher.

In the $Li_2O$—$Al_2O_3$—$SiO_2$-based crystallized glass according to the present invention, the transmittance at a thickness of 3 mm and a wavelength of 380 nm is preferably 50% or more, 55% or more, 60% or more, 65% or more, 70% or more, 75% or more, 78% or more, 80% or more, 81% or more, 82% or more, or 83% or more, and particularly preferably 84% or more. If the transmittance at a wavelength of 380 nm is too low, yellow tinting may be increased, and the transparency of the crystallized glass decreases, so that a desired transmission ability may not be able to be obtained.

In the $Li_2O$—$Al_2O_3$—$SiO_2$-based crystallized glass according to the present invention, the transmittance at a thickness of 3 mm and a wavelength of 800 nm is preferably 50% or more, 55% or more, 60% or more, 65% or more, 70% or more, 75% or more, 78% or more, 80% or more, 81% or more, 82% or more, 83% or more, 84% or more, 85% or more, 86% or more, or 87% or more, and particularly preferably 88% or more. If the transmittance at a wavelength of 800 nm is too low, the glass is likely to become greenish. Particularly, when using in medical applications, such as vein authentication, the transmittance at a wavelength of 800 nm is preferably higher.

In the $Li_2O$—$Al_2O_3$—$SiO_2$-based crystallized glass according to the present invention, the transmittance at a thickness of 3 mm and a wavelength of 1200 nm is preferably 50% or more, 55% or more, 60% or more, 65% or more, 70% or more, 72% or more, 74% or more, 76% or more, 78% or more, 80% or more, 81% or more, 82% or more, 83% or more, 84% or more, 85% or more, 86% or more, 87% or more, or 88% or more, and particularly preferably 89% or more. If the transmittance at a wavelength of 1200 nm is too low, the glass is likely to become greenish. Particularly, when using in infrared cameras, infrared communication, such as a remote controller, and so on, the transmittance at a wavelength of 1200 nm is preferably higher.

In the $Li_2O$—$Al_2O_3$—$SiO_2$-based crystallized glass according to the present invention, the rate of transmittance change at a thickness of 3 mm and a wavelength of 300 nm between before and after crystallization is preferably 50% or less, 48% or less, 46% or less, 44% or less, 42% or less, 40% or less, 38% or less, 37.5% or less, 37% or less, 36.5% or less, 36% or less, or 35.5% or less, and particularly preferably 35% or less. By making the rate of transmittance change between before and after crystallization small, the transmittance after crystallization can be predicted and controlled before crystallization, so that a desired transmission ability can be easy obtained after crystallization. The rate of transmittance change between before and after crystallization is preferably smaller not only at a wavelength of 300 nm, but also over the entire wavelength range.

In the $Li_2O$—$Al_2O_3$—$SiO_2$-based crystallized glass according to the present invention, the lightness $L^*$ at a thickness of 3 mm is preferably 50 or more, 60 or more, 65 or more, 70 or more, 75 or more, 80 or more, 85 or more, 90 or more, 91 or more, 92 or more, 93 or more, 94 or more, 95 or more, 96 or more, 96.1 or more, or 96.3 or more, and particularly preferably 96.5 or more. If the lightness $L^*$ is too small, the glass tend to become grayish and look dark regardless of the magnitude of chromaticity.

In the $Li_2O$—$Al_2O_3$—$SiO_2$-based crystallized glass according to the present invention, the chromaticity $a^*$ at a thickness of 3 mm is preferably within ±5.0, within ±4.5, within ±4, within ±3.6, within ±3.2, within ±2.8, within ±2.4, within ±2, within ±1.8, within ±1.6, within ±1.4, within ±1.2, within ±1, within ±0.9, within ±0.8, within ±0.7, or within ±0.6, and particularly preferably within ±0.5. If the lightness $a^*$ is too negatively large, the glass tends to look greenish. If the lightness $a^*$ is too positively large, the glass tends to look reddish.

In the $Li_2O$—$Al_2O_3$—$SiO_2$-based crystallized glass according to the present invention, the chromaticity $b^*$ at a thickness of 3 mm is preferably within ±5.0, within ±4.5, within ±4, within ±3.6, within ±3.2, within ±2.8, within ±2.4, within ±2, within ±1.8, within ±1.6, within ±1.4, within ±1.2, within ±1, within ±0.9, within ±0.8, within ±0.7, or within ±0.6, and particularly preferably within ±0.5.

If the lightness b* is too negatively large, the glass tends to look blueish. If the lightness b* is too positively large, the glass tends to look yellowish.

In the $Li_2O$—$Al_2O_3$—$SiO_2$-based crystallized glass according to the present invention, the strain point (the glass temperature corresponding to a glass viscosity of approximately $10^{14.5}$ dPa·s) in a glass state before crystallization is preferably 600° C. or above, 605° C. or above, 610° C. or above, 615° C. or above, 620° C. or above, 630° C. or above, 635° C. or above, 640° C. or above, 645° C. or above, or 650° C. or above, and particularly preferably 655° C. or above. If the strain point temperature is too low, the glass before crystallization becomes breakable during forming into shape.

In the $Li_2O$—$Al_2O_3$—$SiO_2$-based crystallized glass according to the present invention, the annealing point (the glass temperature corresponding to a glass viscosity of approximately $10^{13}$ dPa·s) in a glass state before crystallization is preferably 680° C. or above, 685° C. or above, 690° C. or above, 695° C. or above, 700° C. or above, 705° C. or above, 710° C. or above, 715° C. or above, or 720° C. or above, and particularly preferably 725° C. or above. If the annealing point temperature is too low, the glass before crystallization becomes breakable during forming into shape.

Because the $Li_2O$—$Al_2O_3$—$SiO_2$-based crystallized glass according to the present invention is easily crystallized by heat treatment, it is not easy to measure the softening point temperature (the glass temperature corresponding to a glass viscosity of approximately $10^{7.6}$ dPa·s) as in general glass, such as soda-lime glass. To cope with this, in the $Li_2O$—$Al_2O_3$—$SiO_2$-based crystallized glass according to the present invention, the temperature at which the slope of the thermal expansion curve of the glass before crystallization changes is assumed to be the glass transition point temperature and treated as an alternative to the softening point. In the $Li_2O$—$Al_2O_3$—$SiO_2$-based crystallized glass according to the present invention, the glass transition temperature in a glass state before crystallization is preferably 680° C. or above, 685° C. or above, 690° C. or above, 695° C. or above, 700° C. or above, 705° C. or above, 710° C. or above, 715° C. or above, or 720° C. or above, and particularly preferably 725° C. or above. If the glass transition temperature is too low, the glass excessively flows during crystallization, which makes it difficult to form the glass into a desired shape.

In the $Li_2O$—$Al_2O_3$—$SiO_2$-based crystallized glass according to the present invention, the liquidus temperature is preferably 1540° C. or below, 1535° C. or below, 1530° C. or below, 1525° C. or below, 1520° C. or below, 1515° C. or below, 1510° C. or below, 1505° C. or below, 1500° C. or below, 1495° C. or below, 1490° C. or below, 1485° C. or below, 1480° C. or below, 1475° C. or below, 1470° C. or below, 1465° C. or below, 1460° C. or below, 1455° C. or below, 1450° C. or below, 1445° C. or below, 1440° C. or below, 1435° C. or below, 1430° C. or below, 1425° C. or below, 1420° C. or below, or 1415° C. or below, and particularly preferably 1410° C. or below. If the liquidus temperature is too high, devitrification is likely to occur during production. On the other hand, when the liquidus temperature is 1480° C. or below, the glass can be easily produced by a roll process or the like. When the liquidus temperature is 1450° C. or below, the glass can be easily produced by a casting process or the like. When the liquidus temperature is 1410° C. or below, the glass can be easily produced by a fusion process or the like.

In the $Li_2O$—$Al_2O_3$—$SiO_2$-based crystallized glass according to the present invention, the liquidus viscosity (the logarithmic value of the viscosity corresponding to the liquidus temperature) is 2.70 or more, 2.75 or more, 2.80 or more, 2.85 or more, 2.90 or more, 2.95 or more, 3.00 or more, 3.05 or more, 3.10 or more, 3.15 or more, 3.20 or more, 3.25 or more, 3.30 or more, 3.35 or more, 3.40 or more, 3.45 or more, 3.50 or more, 3.55 or more, 3.60 or more, or 3.65 or more, and particularly preferably 3.70 or more. If the liquidus viscosity is too low, devitrification is likely to occur during production. On the other hand, when the liquidus viscosity is 3.40 or more, the glass can be easily produced by a roll process or the like. When the liquidus viscosity is 3.50 or more, the glass can be easily produced by a casting process or the like. When the liquidus viscosity is 3.70 or more, the glass can be easily produced by a fusion process or the like.

In the $Li_2O$—$Al_2O_3$—$SiO_2$-based crystallized glass according to the present invention, a β-quartz solid solution is preferably precipitated as a major crystalline phase. When a β-quartz solid solution is precipitated as a major crystalline phase, its crystal grain size is likely to be small, so that the crystallized glass easily transmits visible light and the transparency is easily increased. In addition, the coefficient of thermal expansion of the glass can be easily approximated to zero. In the $Li_2O$—$Al_2O_3$—$SiO_2$-based crystallized glass according to the present invention, a β-spodumene solid solution is precipitated by subjecting the glass to a heat treatment at a higher temperature than under a crystallization condition for precipitating a β-quartz solid solution. The crystal grain size of the β-spodumene solid solution is likely to be larger than that of the β-quartz solid solution and the β-spodumene solid solution generally tends to be cloudy when produced into a crystallized glass. However, when the glass composition and the firing conditions are suitably adjusted, the difference in refractive index between the crystalline phase containing the β-spodumene solid solution and the remaining glass phase can be reduced, in which case the crystallized glass is less likely to be cloudy. The $Li_2O$—$Al_2O_3$—$SiO_2$-based crystallized glass according to the present invention may contain crystals of a β-spodumene solid solution or the like in the absence of any adverse effect in terms of tinting and so on.

In the $Li_2O$—$Al_2O_3$—$SiO_2$-based crystallized glass according to the present invention, the coefficient of thermal expansion at 30 to 380° C. is preferably $30 \times 10^{-7}$/° C. or below, $25 \times 10^{-7}$/° C. or below, $20 \times 10^{-7}$/° C. or below, $18 \times 10^{-7}$/° C. or below, $16 \times 10^{-7}$/° C. or below, $14 \times 10^{-7}$/° C. or below, $13 \times 10^{-7}$/° C. or below, $12 \times 10^{-7}$/° C. or below, $11 \times 10^{-7}$/° C. or below, $10 \times 10^{-7}$/° C. or below, $9 \times 10^{-7}$/° C. or below, $8 \times 10^{-7}$/° C. or below, $7 \times 10^{-7}$/° C. or below, $6 \times 10^{-7}$/° C. or below, $5 \times 10^{-7}$/° C. or below, $4 \times 10^{-7}$/° C. or below, or $3 \times 10^{-7}$/° C. or below, and particularly preferably $2 \times 10^{-7}$/° C. or below. When the dimensional stability and/or the thermal shock resistance are particularly required, the coefficient of thermal expansion at 30 to 380° C. is preferably $-5 \times 10^{-7}$/° C. to $5 \times 10^{-7}$/° C., $-3 \times 10^{-7}$/° C. to $3 \times 10^{-7}$/° C., $-2.5 \times 10^{-7}$/° C. to $2.5 \times 10^{-7}$/° C., $-2 \times 10^{-7}$/° C. to $2 \times 10^{-7}$/° C., $-1.5 \times 10^{-7}$/° C. to $1.5 \times 10^{-7}$/° C., or $-1 \times 10^{-7}$/° C. to $1 \times 10^{-7}$/° C., and particularly preferably $-0.5 \times 10^{-7}$/° C. to $0.5 \times 10^{-7}$/° C.

In the $Li_2O$—$Al_2O_3$—$SiO_2$-based crystallized glass according to the present invention, the coefficient of thermal expansion at 30 to 750° C. is preferably $30 \times 10^{-7}$/° C. or below, $25 \times 10^{-7}$/° C. or below, $20 \times 10^{-7}$/° C. or below, $18 \times 10^{-7}$/° C. or below, $16 \times 10^{-7}$/° C. or below, $14 \times 10^{-7}$/° C. or below, $13 \times 10^{-7}$/° C. or below, $12 \times 10^{-7}$/° C. or below, $11 \times 10^{-7}/°$ C. or below, $10 \times 10^{-7}/°$ C. or below, $9 \times 10^{-7}/°$ C. or below, $8 \times 10^{-7}/°$ C. or below, $7 \times 10^{-7}/°$ C. or below, $6 \times 10^{-7}/°$ C. or below, $5 \times 10^{-7}/°$ C. or below, or $4 \times 10^{-7}/°$ C. or below, and particularly preferably $3 \times 10^{-7}/°$ C. or below. When the dimensional stability and/or the thermal shock resistance are particularly required, the coefficient of thermal expansion at 30 to 750° C. is preferably $-15 \times 10^{-7}/°$ C. to $15 \times 10^{-7}/°$ C., $-12 \times 10^{-7}/°$ C. to $12 \times 10^{-7}/°$ C., $-10 \times 10^{-7}/°$ C. to $10 \times 10^{-7}/°$ C., $-8 \times 10^{-7}/°$ C. to $8 \times 10^{-7}/°$ C., $-6 \times 10^{-7}/°$ C. to $6 \times 10^{-7}/°$ C., $-5 \times 10^{-7}/°$ C. to $5 \times 10^{-7}/°$ C., $-4.5 \times 10^{-7}/°$ C. to $4.5 \times 10^{-7}/°$ C., $-4 \times 10^{-7}/°$ C. to $4 \times 10^{-7}/°$ C., $-3.5 \times 10^{-7}/°$ C. to $3.5 \times 10^{-7}/°$ C., $-3 \times 10^{-7}/°$ C. to $3 \times 10^{-7}/°$ C., $-2.5 \times 10^{-7}/°$ C. to $2.5 \times 10^{-7}/°$ C., $-2 \times 10^{-7}/°$ C. to $2 \times 10^{-7}/°$ C., $-1.5 \times 10^{-7}/°$ C. to $1.5 \times 10^{-7}/°$ C., or $-1 \times 10^{-7}/°$ C. to $1 \times 10^{-7}/°$ C., and particularly preferably $-0.5 \times 10^{-7}/°$ C. to $0.5 \times 10^{-7}/°$ C.

In the $Li_2O$—$Al_2O_3$—$SiO_2$-based crystallized glass according to the present invention, the Young's modulus is preferably 60 to 120 GPa, 70 to 110 GPa, 75 to 110 GPa, 75 to 105 GPa, or 80 to 105 GPa, and particularly preferably 80 to 100 GPa. If the Young's modulus is too low or too high, the crystallized glass becomes susceptible to breakage.

In the $Li_2O$—$Al_2O_3$—$SiO_2$-based crystallized glass according to the present invention, the modulus of rigidity is preferably 25 to 50 GPa, 27 to 48 GPa, or 29 to 46 GPa, and particularly preferably 30 to 45 GPa. If the modulus of rigidity is too low or too high, the crystallized glass becomes susceptible to breakage.

In the $Li_2O$—$Al_2O_3$—$SiO_2$-based crystallized glass according to the present invention, the Poisson's ratio is preferably 0.35 or less, 0.32 or less, 0.3 or less, 0.28 or less, or 0.26 or less, and particularly preferably 0.25 or less. If the Poisson's ratio is too large, the crystallized glass becomes susceptible to breakage.

In relation to the $Li_2O$—$Al_2O_3$—$SiO_2$-based crystallized glass according to the present invention, the density of a crystallizable glass before crystallization is preferably 2.30 to 2.60 g/cm³, 2.32 to 2.58 g/cm³, 2.34 to 2.56 g/cm³, 2.36 to 2.54 g/cm³, 2.38 to 2.52 g/cm³, or 2.39 to 2.51 g/cm³, and particularly preferably 2.40 to 2.50 g/cm³. If the density of the crystallizable glass is too small, the gas permeability of the glass before crystallization may deteriorate, so that the glass may be contaminated during storage. On the other hand, if the density of the crystallizable glass is too large, the weight per unit area of the glass becomes large, so that the glass becomes difficult to handle.

In relation to the $Li_2O$—$Al_2O_3$—$SiO_2$-based crystallized glass (after crystallization) according to the present invention, the density of the crystallized glass is preferably 2.40 to 2.80 g/cm³, 2.42 to 2.78 g/cm³, 2.44 to 2.76 g/cm³, or 2.46 to 2.74 g/cm³, and particularly preferably 2.47 to 2.73 g/cm³. If the density of the crystallized glass is too small, the gas permeability of the crystallized glass may deteriorate. On the other hand, if the density of the crystallized glass is too large, the weight per unit area of the glass becomes large, so that the glass becomes difficult to handle.

The rate of density change of the $Li_2O$—$Al_2O_3$—$SiO_2$-based crystallized glass according to the present invention is defined by {((density (g/cm³) after crystallization)−(density (g/cm³) before crystallization))/(density (g/cm³) before crystallization)}×100(%), wherein the density before crystallization is the density after a melted glass is held at 700° C. for 30 minutes and then cooled at 3° C./min to room temperature and the density after crystallization is the density after the glass is subjected to crystallization treatment under predetermined conditions. The rate of density change is preferably 0.01 to 10%, 0.05 to 8%, 0.1 to 8%, 0.3 to 8%, 0.5 to 8%, 0.9 to 8%, 1 to 7.8%, 1 to 7.4%, 1 to 7%, 1.2 to 7%, 1.6 to 7%, 2 to 7%, 2 to 6.8%, 2 to 6.5%, 2 to 6.3%, 2 to 6.2%, 2 to 6.1%, 2 to 6%, 2.5 to 5%, 2.6 to 4.5%, or 2.8 to 3.8%. By making the rate of density change between before and after crystallization small, the breakage rate after crystallization can be reduced, and scattering of the glass and glass matrix can also be reduced, so that a crystallized glass having a high transmittance can be obtained. Particularly, in reducing tinting factors other than the absorption of $TiO_2$ and so on in a region of $TiO_2$ contents of 2% or less (preferably, 1% or less, more preferably 0.5% or less, and particularly preferably 0.05% or less), the above small rate of density change enables significant reduction in scattering and can contribute to an increase in transmittance.

The $Li_2O$—$Al_2O_3$—$SiO_2$-based crystallized glass according to the present invention may be subjected to chemical strengthening or other treatments. In relation to the treatment conditions for chemical strengthening treatment, the treatment time and treatment temperature are sufficient to be appropriately selected in consideration of the glass composition, the degree of crystallization, the type of molten salt, and so on. For example, for the purpose of facilitating chemical strengthening after crystallization, a glass composition containing much $Na_2O$, which will be contained in the remaining glass, may be selected or the degree of crystallization may be deliberately reduced. Furthermore, as to the molten salt, alkali metals, such as Li, Na, and K, may be contained singly or in combination. Moreover, aside from an ordinary single-step strengthening process, a multistep chemical strengthening process may be selected. Besides the above, the $Li_2O$—$Al_2O_3$—$SiO_2$-based crystallized glass according to the present invention may be treated by chemical strengthening or the like before crystallization, so that the content of $Li_2O$ on the sample surface can be made smaller than inside of the sample. When such a glass is crystallized, the degree of crystallization on the sample surface becomes lower than inside of the sample, so that the coefficient of thermal expansion on the sample surface becomes relatively high and, thus, compressive stress due to a difference in thermal expansion can be applied to the sample surface. In addition, when the degree of crystallization on the sample surface is low, the amount of glass phase on the surface becomes large, so that the chemical resistance and gas barrier property can be increased depending on the selection of the glass composition.

Next, a description will be given of a method for producing a $Li_2O$—$Al_2O_3$—$SiO_2$-based crystallized glass according to the present invention.

First, a batch of raw materials prepared to provide a glass having the above-described composition is injected into a glass melting furnace, melted at 1500 to 1750° C., and then formed into shape. In glass melting, the flame fusion method using a burner, the electric melting method by electrical heating or so on may be used. Alternatively, melting using laser irradiation or plasma melting is also possible. Furthermore, the shape of the sample may be platy, fibrous, film-like, powdered, spherical, hollow or so on and is not particularly limited.

Next, the obtained crystallizable glass (a glass that is not yet crystallized and crystallizable) is subjected to heat treatment and thus crystallized. As crystallization conditions, nucleation is first performed at 700 to 950° C. (preferably 750 to 900° C.) for 0.1 to 100 hours (preferably 1 to 60 hours) and crystal growth is then performed at 800 to 1050° C. (preferably 800 to 1000° C.) for 0.1 to 50 hours (preferably 0.2 to 10 hours). Thus, a transparent $Li_2O$—$Al_2O_3$—$SiO_2$-based crystallized glass having β-quartz solid solution crystals precipitated as a major crystalline phase therein can be obtained. The heat treatment may be performed at a specific temperature only, may be performed stepwise by being held in two or more temperature levels or may be performed by the application of heat with a temperature gradient.

Furthermore, the crystallization may be promoted by applying sonic waves or electromagnetic waves to the glass. Moreover, the cooling of the crystallized glass in a high-temperature state may be performed at a cooling rate with a specific temperature gradient or in two or more levels of temperature gradients. In order to obtain a sufficient thermal shock resistance, it is desirable to control the cooling rate to sufficiently structurally relax the remaining glass phase. The average cooling rate from 800° C. to 25° C. is, in an innermost portion of the crystallized glass thickness farthest from the surface, preferably 3000° C./min, 1000° C./min or below, 500° C./min or below, 400° C./min or below, 300° C./min or below, 200° C./min or below, 100° C./min or below, 50° C./min or below, 25° C./min or below, or 10° C./min or below, and particularly preferably 5° C./min or below. In order to obtain dimensional stability over a long period, the above average cooling rate is more preferably 2.5° C./min or below, 1° C./min or below, 0.5° C./min or below, 0.1° C./min or below, 0.05° C./min or below, 0.01° C./min or below, 0.005° C./min or below, 0.001° C./min or below, or 0.0005° C./min or below, and particularly preferably 0.0001° C./min or below. Except for the case where physical strengthening treatment by air cooing, water cooling or the like is performed, the cooling rates of the crystallized glass from at the surface to in the innermost portion farthest from the surface preferably approximate to each other. The value of the cooling rate in the innermost portion farthest from the surface divided by the cooling rate at the surface is preferably 0.0001 to 1, 0.001 to 1, 0.01 to 1, 0.1 to 1, 0.5 to 1, 0.8 to 1, or 0.9 to 1, and particularly preferably 1. As the above value is closer to 1, residual strain is less likely to occur in all locations of the crystallized glass sample and long-term dimensional stability is more likely to be obtained. The cooling rate at the surface can be estimated by contact thermometry or with a radiation thermometer, while the temperature of the inner portions can be determined by placing the crystallized glass in a high-temperature state into a cooling medium, measuring the heat quantity and rate of heat quantity change of the cooling medium, and making an estimate from the measurement data, the respective specific heats of the crystallized glass and the cooling medium, the thermal conductivity, and so on.

EXAMPLES

Hereinafter, the present invention will be described with reference to examples, but the present invention is not limited to the following examples. Tables 1 to 18 show working examples (Samples Nos. 1 to 5 and 8 to 63) of the present invention and comparative examples (Samples Nos. 6 and 7).

TABLE 1

| | | No. 1 | No. 2 | No. 3 | No. 4 | No. 5 | No. 6 | No. 7 |
|---|---|---|---|---|---|---|---|---|
| Composition [% by weight] | $SiO_2$ | 65.9 | 64.7 | 65.6 | 65.6 | 65.1 | 65.7 | 63.6 |
| | $Al_2O_3$ | 22.3 | 21.9 | 22.2 | 22.2 | 22.0 | 22.2 | 22.2 |
| | $B_2O_3$ | 0.00 | 0.00 | 0.00 | 0.00 | 0.01 | 0.00 | 0.00 |
| | $P_2O_5$ | 1.40 | 1.38 | 1.38 | 1.38 | 1.38 | 1.40 | 1.40 |
| | $Li_2O$ | 3.71 | 3.64 | 3.70 | 3.70 | 4.10 | 3.70 | 3.70 |
| | $Na_2O$ | 0.40 | 0.39 | 0.39 | 0.39 | 0.39 | 0.35 | 0.35 |
| | $K_2O$ | 0.30 | 0.30 | 0.30 | 0.30 | 0.30 | 0.25 | 0.25 |
| | MgO | 0.70 | 0.69 | 0.20 | 0.20 | 0.40 | 0.70 | 0.70 |
| | CaO | 0.00 | 0.00 | 0.00 | 0.00 | 0.00 | 0.00 | 0.00 |
| | SrO | 0.00 | 0.00 | 0.00 | 0.00 | 0.00 | 0.00 | 0.00 |
| | BaO | 1.20 | 1.18 | 1.18 | 1.18 | 1.18 | 1.20 | 1.20 |
| | ZnO | 0.00 | 0.00 | 0.00 | 0.00 | 0.00 | 0.00 | 0.00 |
| | $TiO_2$ | 0.0023 | 0.0044 | 0.0009 | 0.0015 | 0.0030 | 2.00 | 3.50 |
| | $SnO_2$ | 0.69 | 1.81 | 1.40 | 1.40 | 1.40 | 0.30 | 0.30 |
| | $ZrO_2$ | 3.39 | 4.06 | 3.70 | 3.70 | 3.70 | 2.20 | 2.80 |
| | $Fe_2O_3$ | 0.0153 | 0.0149 | 0.0154 | 0.0152 | 0.0151 | 0.0150 | 0.0146 |
| Composition [ppm] | Pt | 0.03 | 0.03 | 0.03 | 0.03 | 0.03 | Unmeasured | Unmeasured |
| | Rh | 0.02 | 0.02 | 0.02 | 0.02 | 0.02 | Unmeasured | Unmeasured |
| | Pt + Rh | 0.05 | 0.05 | 0.05 | 0.05 | 0.05 | Unmeasured | Unmeasured |
| Sn/(P + B + Zr + Ti + Sn) | | 0.126 | 0.249 | 0.216 | 0.216 | 0.216 | 0.051 | 0.038 |
| Al/(Zr + Sn) | | 5.46 | 3.72 | 4.35 | 4.35 | 4.31 | 8.88 | 7.16 |
| (Mg + Zn)/Li | | 0.189 | 0.189 | 0.054 | 0.054 | 0.098 | 0.189 | 0.189 |
| Sn/(Zr + Sn) | | 0.17 | 0.31 | 0.27 | 0.27 | 0.27 | 0.12 | 0.10 |
| (Si + Al)/Li | | 23.76 | 23.76 | 23.73 | 23.73 | 21.24 | 23.76 | 23.19 |
| (Si + Al)/Sn | | 127.74 | 47.90 | 62.71 | 62.71 | 62.21 | 293.00 | 286.00 |
| (Li + Na + K)/Zr | | 1.30 | 1.07 | 1.19 | 1.19 | 1.29 | 1.95 | 1.54 |
| Ti/Zr | | 0.0007 | 0.0011 | 0.0002 | 0.0004 | 0.0008 | 0.91 | 1.25 |
| Ti/(Ti + Fe) | | 0.131 | 0.228 | 0.055 | 0.090 | 0.166 | 0.993 | 0.996 |
| Na + K + Ca + Sr + Ba | | 1.91 | 1.87 | 1.87 | 1.87 | 1.87 | 1.80 | 1.80 |
| (Mg + Ca + Sr + Ba)/Zr | | 0.56 | 0.46 | 0.37 | 0.37 | 0.43 | 0.86 | 0.68 |
| (Mg + Ca + Sr + Ba)/(Li + Na + K) | | 0.43 | 0.43 | 0.31 | 0.31 | 0.33 | 0.44 | 0.44 |
| Before Crystallization | | | | | | | | |
| Transmittance[%] 3 mm thick | 200 nm | Unmeasured | 44.9 | 54.1 | 54.1 | 53.9 | 5.3 | Unmeasured |
| | 250 nm | Unmeasured | 17.0 | 19.5 | 19.5 | 19.8 | 1.0 | Unmeasured |
| | 300 nm | Unmeasured | 24.1 | 29.9 | 29.9 | 32.3 | 0.6 | Unmeasured |
| | 325 nm | Unmeasured | 65.6 | 69.6 | 69.6 | 70.9 | 33.3 | Unmeasured |
| | 350 nm | Unmeasured | 84.4 | 86.1 | 86.1 | 86.2 | 72.4 | Unmeasured |
| | 380 nm | Unmeasured | 89.5 | 90.3 | 90.3 | 90.2 | 86.0 | Unmeasured |
| | 800 nm | Unmeasured | 91.5 | 91.8 | 91.8 | 91.7 | 91.7 | Unmeasured |
| | 1200 nm | Unmeasured | 91.7 | 91.9 | 91.9 | 91.7 | 91.7 | Unmeasured |

TABLE 1-continued

|  |  | No. 1 | No. 2 | No. 3 | No. 4 | No. 5 | No. 6 | No. 7 |
|---|---|---|---|---|---|---|---|---|
| L* |  | Unmeasured | 96.6 | 96.7 | 96.7 | 96.6 | 96.7 | Unmeasured |
| a* |  | Unmeasured | −0.1 | −0.1 | −0.1 | −0.1 | −0.1 | Unmeasured |
| b* |  | Unmeasured | 0.2 | 0.2 | 0.2 | 0.2 | 0.2 | Unmeasured |
| Low-Temperature Viscosity | Strain Point[° C.] | Unmeasured | Unmeasured | Unmeasured | Unmeasured | Unmeasured | Unmeasured | Unmeasured |
|  | Annealing Point[° C.] | Unmeasured | Unmeasured | Unmeasured | Unmeasured | Unmeasured | Unmeasured | Unmeasured |
|  | Glass Transition Point[° C.] | Unmeasured | Unmeasured | Unmeasured | Unmeasured | Unmeasured | Unmeasured | Unmeasured |
| High-Temperature Viscosity | $10^4$[° C.] | Unmeasured | Unmeasured | Unmeasured | Unmeasured | Unmeasured | Unmeasured | Unmeasured |
|  | $10^3$[° C.] | Unmeasured | Unmeasured | Unmeasured | Unmeasured | Unmeasured | Unmeasured | Unmeasured |
|  | $10^{2.5}$[° C.] | Unmeasured | Unmeasured | Unmeasured | Unmeasured | Unmeasured | Unmeasured | Unmeasured |
|  | $10^2$[° C.] | Unmeasured | Unmeasured | Unmeasured | Unmeasured | Unmeasured | Unmeasured | Unmeasured |
| Liquidus Temperature[° C.] |  | Unmeasured | Unmeasured | Unmeasured | Unmeasured | Unmeasured | Unmeasured | Unmeasured |
| Liquidus Viscosity[—] |  | Unmeasured | Unmeasured | Unmeasured | Unmeasured | Unmeasured | Unmeasured | Unmeasured |
| $\alpha[\times 10^{-7}$/° C.] | 30-380° C. | Unmeasured | 39.6 | Unmeasured | Unmeasured | Unmeasured | 41.5 | Unmeasured |
| Density[g/cm3] |  | Unmeasured | Unmeasured | Unmeasured | Unmeasured | Unmeasured | Unmeasured | Unmeasured |

TABLE 2

|  |  | No. 1 | No. 2 | No. 3 | No. 4 | No. 5 | No. 6 | No. 7 |
|---|---|---|---|---|---|---|---|---|
| After Crystallization | | | | | | | | |
| Crystallization Conditions |  | 810° C.-60 h 920° C.-3 h | 810° C.-60 h 920° C.-3 h | 810° C.-10 h 920° C.-3 h | 810° C.-20 h 920° C.-3 h | 810° C.-20 h 920° C.-3 h | 780° C.-60 h 890° C.-3 h | 780° C.-3 h 890° C.-3 h |
| Transmittance[%] 3 mm thick | 200 nm | 26.0 | 27.0 | 29.9 | 35.0 | 27.0 | 2.0 | Unmeasured |
|  | 250 nm | 26.0 | 14.0 | 17.3 | 20.0 | 14.0 | 0.0 | Unmeasured |
|  | 300 nm | 36.5 | 15.9 | 20.8 | 22.8 | 17.1 | 0.0 | Unmeasured |
|  | 325 nm | 55.1 | 53.5 | 62.0 | 63.7 | 58.3 | 0.0 | Unmeasured |
|  | 350 nm | 55.1 | 77.6 | 80.6 | 81.7 | 78.3 | 6.4 | Unmeasured |
|  | 380 nm | 69.7 | 84.4 | 85.7 | 86.4 | 84.2 | 55.2 | Unmeasured |
|  | 800 nm | 89.0 | 91.1 | 91.3 | 91.4 | 91.1 | 90.6 | Unmeasured |
|  | 1200 nm | 90.9 | 91.1 | 91.6 | 91.4 | 91.2 | 89.8 | Unmeasured |
| L* |  | 94.4 | 95.8 | 95.8 | 96.1 | 95.8 | 94.9 | Unmeasured |
| a* |  | −0.1 | −0.1 | −0.1 | 0.0 | −0.1 | −0.6 | Unmeasured |
| b* |  | 3.4 | 1.3 | 1.4 | 1.0 | 1.3 | 3.6 | Unmeasured |
| Precipitated Crystals |  | β-Q | β-Q | β-Q | β-Q | β-Q | β-Q | β-Q |
| Average Crystallite Size[nm] |  | Unmeasured | Unmeasured | Unmeasured | 45 | Unmeasured | Unmeasured | Unmeasured |
| $\alpha[\times 10^{-7}$/° C.] | 30-380° C. | −0.9 | −0.4 | Unmeasured | Unmeasured | Unmeasured | −1.1 | 0 |
| $\alpha[\times 10^{-7}$/° C.] | 30-750° C. | 0.9 | 0.9 | Unmeasured | Unmeasured | Unmeasured | 0.5 | 0.8 |
| Density[g/cm3] |  | Unmeasured | Unmeasured | Unmeasured | Unmeasured | Unmeasured | Unmeasured | Unmeasured |
| Young's Modulus[GPa] |  | 92 | 93 | Unmeasured | Unmeasured | Unmeasured | 92 | Unmeasured |
| Modulus of Rigidity [GPa] |  | 37 | 38 | Unmeasured | Unmeasured | Unmeasured | 37 | Unmeasured |
| Poisson's Ratio |  | 0.23 | 0.22 | Unmeasured | Unmeasured | Unmeasured | 0.23 | Unmeasured |
| Appearance |  | Clear and Colorless | Clear and Colorless | Clear and Colorless | Clear and Colorless | Clear and Colorless | Yellowish | Yellowish |
| Rate of Change between Before and After Crystallization[%] | | | | | | | | |
| 200 nm |  | Unmeasured | 39.8 | 44.7 | 35.4 | 49.9 | 62.3 | Unmeasured |
| 250 nm |  | Unmeasured | 17.6 | 11.3 | −3.0 | 29.4 | 100.0 | Unmeasured |
| 300 nm |  | Unmeasured | 34.2 | 30.3 | 23.7 | 47.1 | 1000 | Unmeasured |
| 325 nm |  | Unmeasured | 18.6 | 11.0 | 8.4 | 17.8 | 99.9 | Unmeasured |
| 350 nm |  | Unmeasured | 8.0 | 6.3 | 5.1 | 9.2 | 91.1 | Unmeasured |
| 380 nm |  | Unmeasured | 5.8 | 5.0 | 4.2 | 6.6 | 35.8 | Unmeasured |
| 800 nm |  | Unmeasured | 0.4 | 0.5 | 0.4 | 0.6 | 1.2 | Unmeasured |
| 1200 nm |  | Unmeasured | 0.4 | 0.5 | 0.4 | 0.6 | 1.2 | Unmeasured |

TABLE 3

|  |  | No. 8 | No. 9 | No. 10 | No. 11 | No. 12 | No. 13 | No. 14 |
|---|---|---|---|---|---|---|---|---|
| Composition [% by weight] | $SiO_2$ | 66.0 | 66.1 | 66.2 | 66.7 | 63.5 | 66.6 | 66.8 |
|  | $Al_2O_3$ | 22.4 | 22.4 | 22.4 | 22.2 | 23.5 | 22.3 | 21.8 |
|  | $B_2O_3$ | 0.00 | 0.00 | 0.00 | 0.82 | 0.00 | 0.00 | 0.00 |
|  | $P_2O_5$ | 1.42 | 1.42 | 1.39 | 0.00 | 2.51 | 1.40 | 1.37 |
|  | $Li_2O$ | 3.73 | 3.73 | 3.74 | 2.20 | 2.92 | 3.74 | 3.54 |
|  | $Na_2O$ | 0.08 | 0.36 | 0.38 | 0.01 | 0.80 | 0.00 | 0.39 |
|  | $K_2O$ | 0.30 | 0.00 | 0.00 | 0.01 | 0.05 | 0.00 | 0.00 |
|  | MgO | 0.69 | 0.69 | 0.69 | 0.00 | 1.14 | 0.69 | 0.77 |
|  | CaO | 0.01 | 0.01 | 0.00 | 0.02 | 0.01 | 0.01 | 0.01 |
|  | SrO | 0.00 | 0.00 | 0.01 | 0.34 | 0.00 | 0.00 | 0.00 |
|  | BaO | 0.00 | 0.00 | 0.00 | 0.48 | 0.12 | 0.01 | 0.00 |
|  | ZnO | 0.00 | 0.00 | 0.00 | 1.66 | 0.00 | 0.01 | 0.00 |
|  | $TiO_2$ | 0.0065 | 0.0042 | 0.0031 | 0.0000 | 0.1990 | 0.0055 | 0.0049 |
|  | $SnO_2$ | 1.42 | 1.43 | 1.34 | 1.63 | 1.75 | 1.40 | 1.27 |

TABLE 3-continued

|  |  | No. 8 | No. 9 | No. 10 | No. 11 | No. 12 | No. 13 | No. 14 |
|---|---|---|---|---|---|---|---|---|
|  | $ZrO_2$ | 3.85 | 3.83 | 3.84 | 3.90 | 3.72 | 3.81 | 2.96 |
|  | $Fe_2O_3$ | 0.0068 | 0.0087 | 0.0099 | 0.0284 | 0.0081 | 0.0084 | 0.0075 |
| Composition | Pt | 1.5 | 1.5 | 1.5 | Unmeasured | 1.5 | 1.5 | 1.5 |
| [ppm] | Rh | 0.02 | 0.02 | 0.02 | Unmeasured | 0.02 | 0.02 | 0.02 |
|  | Pt + Rh | 1.52 | 1.52 | 1.52 | Unmeasured | 1.52 | 1.52 | 1.52 |
| Sn/(P + B + Zr + Ti + Sn) |  | 0.212 | 0.214 | 0.204 | 0.257 | 0.214 | 0.212 | 0.227 |
| Al/(Zr + Sn) |  | 4.25 | 4.26 | 4.32 | 4.01 | 4.30 | 4.28 | 5.15 |
| (Mg + Zn)/Li |  | 0.185 | 0.185 | 0.184 | 0.755 | 0.390 | 0.187 | 0.218 |
| Sn/(Zr + Sn) |  | 0.27 | 0.27 | 0.26 | 0.29 | 0.32 | 0.27 | 0.30 |
| (Si + Al)/Li |  | 23.70 | 23.73 | 23.69 | 40.41 | 29.79 | 23.77 | 25.03 |
| (Si + Al)/Sn |  | 62.25 | 61.89 | 66.12 | 54.54 | 49.71 | 63.50 | 69.76 |
| (Li + Na + K)/Zr |  | 1.07 | 1.07 | 1.07 | 0.57 | 1.01 | 0.98 | 1.33 |
| Ti/Zr |  | 0.0017 | 0.0011 | 0.0008 | 0.0000 | 0.0535 | 0.0014 | 0.0017 |
| Ti/(Ti + Fe) |  | 0.489 | 0.326 | 0.238 | 0.000 | 0.961 | 0.396 | 0.395 |
| Na + K + Ca + Sr + Ba |  | 0.39 | 0.37 | 0.39 | 0.86 | 0.98 | 0.02 | 0.40 |
| (Mg + Ca + Sr + Ba)/Zr |  | 0.18 | 0.18 | 0.18 | 0.21 | 0.34 | 0.19 | 0.26 |
| (Mg + Ca + Sr + Ba)/(Li + Na + K) |  | 0.17 | 0.17 | 0.17 | 0.38 | 0.34 | 0.19 | 0.20 |
|  | Before Crystallization |  |  |  |  |  |  |  |
| Transmittance[%] | 200 nm | 65.9 | 67.4 | 65.7 | Unmeasured | Unmeasured | 77.2 | 80.7 |
| 3 mm thick | 250 nm | 21.2 | 21.3 | 21.3 | Unmeasured | Unmeasured | 22.3 | 22.8 |
|  | 300 nm | 30.4 | 30.1 | 30.3 | Unmeasured | Unmeasured | 29.1 | 32.0 |
|  | 325 nm | 69.0 | 68.8 | 69.0 | Unmeasured | Unmeasured | 67.8 | 69.2 |
|  | 350 nm | 85.4 | 85.2 | 85.3 | Unmeasured | Unmeasured | 85.0 | 85.2 |
|  | 380 nm | 89.8 | 89.7 | 89.8 | Unmeasured | Unmeasured | 89.7 | 89.8 |
|  | 800 nm | 91.6 | 91.6 | 91.6 | Unmeasured | Unmeasured | 91.6 | 91.6 |
|  | 1200 nm | 91.6 | 91.6 | 91.6 | Unmeasured | Unmeasured | 91.5 | 91.6 |
| L* |  | 96.6 | 96.6 | 96.6 | Unmeasured | Unmeasured | 96.6 | 96.7 |
| a* |  | −0.1 | −0.1 | −0.1 | Unmeasured | Unmeasured | −0.1 | −0.1 |
| b* |  | 0.3 | 0.3 | 0.3 | Unmeasured | Unmeasured | 0.3 | 0.4 |
| Low- | Strain Point[° C.] | 687 | 683 | 684 | Unmeasured | Unmeasured | Unmeasured | Unmeasured |
| Temperature | Annealing Point[° C.] | 745 | 741 | 742 | Unmeasured | Unmeasured | Unmeasured | Unmeasured |
| Viscosity | Glass Transition Point[° C.] | 728 | 730 | 728 | Unmeasured | Unmeasured | 745 | 740 |
| High- | 10^4[° C.] | 1353 | 1351 | 1352 | Unmeasured | Unmeasured | 1358 | 1368 |
| Temperature | 10^3[° C.] | 1530 | 1528 | 1531 | Unmeasured | Unmeasured | 1537 | 1549 |
| Viscosity | 10^2.5[° C.] | 1643 | 1641 | 1644 | Unmeasured | Unmeasured | 1650 | 1662 |
|  | 10^2[° C.] | 1780 | 1777 | 1780 | Unmeasured | Unmeasured | 1786 | 1795 |
| Liquidus Temperature[° C.] |  | 1489 | 1486 | 1489 | Unmeasured | Unmeasured | Unmeasured | Unmeasured |
| Liquidus Viscosity[—] |  | 3.20 | 3.21 | 3.21 | Unmeasured | Unmeasured | Unmeasured | Unmeasured |
| α[×10$^{-7}$/° C.] | 30-380° C. | 38.2 | 38.7 | 38.6 | Unmeasured | Unmeasured | 36.4 | 37.5 |
| Density[g/cm3] |  | 2.442 | 2.442 | 2.441 | Unmeasured | Unmeasured | 2.441 | 2.444 |

TABLE 4

|  |  | No. 8 | No. 9 | No. 10 | No. 11 | No. 12 | No. 13 | No. 14 |
|---|---|---|---|---|---|---|---|---|
|  | After Crystallization |  |  |  |  |  |  |  |
| Crystallization Conditions |  | 840° C.-3 h 890° C.-1 h | 840° C.-3 h 890° C.-1 h | 840° C.-3 h 890° C.-1 h | 810° C.-30 h 890° C.-3 h | 825° C.-30 h 905° C.-3 h | 840° C.-3 h 890° C.-1 h | 810° C.-3 h 920° C.-1 h |
| Transmittance[%] | 200 nm | 26.8 | 25.4 | 22.7 | Unmeasured | Unmeasured | 26.5 | 35.3 |
| 3 mm thick | 250 nm | 12.1 | 11.5 | 11.7 | Unmeasured | Unmeasured | 12.1 | 16.1 |
|  | 300 nm | 26.8 | 25.4 | 22.7 | Unmeasured | Unmeasured | 26.5 | 35.3 |
|  | 325 nm | 56.4 | 54.1 | 55.7 | Unmeasured | Unmeasured | 52.7 | 59.2 |
|  | 350 nm | 77.2 | 75.5 | 76.7 | Unmeasured | Unmeasured | 75.3 | 74.4 |
|  | 380 nm | 83.2 | 81.8 | 82.9 | Unmeasured | Unmeasured | 82.1 | 79.6 |
|  | 800 nm | 90.7 | 90.5 | 90.6 | Unmeasured | Unmeasured | 90.5 | 89.9 |
|  | 1200 nm | 90.8 | 90.7 | 90.9 | Unmeasured | Unmeasured | 90.6 | 90.7 |
| L* |  | 95.5 | 95.2 | 95.4 | Unmeasured | Unmeasured | 95.3 | 94.7 |
| a* |  | 0.1 | 0.1 | 0.1 | Unmeasured | Unmeasured | 0.1 | 0.1 |
| b* |  | 1.6 | 1.9 | 1.7 | Unmeasured | Unmeasured | 1.7 | 2.3 |
| Precipitated Crystals |  | β-Q | β-Q | β-Q | β-Q | β-Q | β-Q | β-Q |
| Average Crystallite Size[nm] |  | Unmeasured | Unmeasured | 45 | Unmeasured | Unmeasured | Unmeasured | Unmeasured |
| α[×10$^{-7}$/° C.] | 30-380° C. | −5.2 | −5.1 | −5.0 | Unmeasured | Unmeasured | −4.0 | −2.5 |
| α[×10$^{-7}$/° C.] | 30-750° C. | −3.7 | −3.6 | −3.6 | Unmeasured | Unmeasured | −3.7 | −1.7 |
| Density[g/cm3] |  | 2.531 | 2.534 | 2.534 | Unmeasured | Unmeasured | 2.542 | 2.535 |
| Young's Modulus[GPa] |  | Unmeasured | Unmeasured | Unmeasured | Unmeasured | Unmeasured | Unmeasured | Unmeasured |
| Modulus of Rigidity [GPa] |  | Unmeasured | Unmeasured | Unmeasured | Unmeasured | Unmeasured | Unmeasured | Unmeasured |
| Poisson's Ratio |  | Unmeasured | Unmeasured | Unmeasured | Unmeasured | Unmeasured | Unmeasured | Unmeasured |
| Appearance |  | Clear and Colorless | Clear and Colorless | Clear and Colorless | Clear and Colorless | Clear and Colorless | Clear and Colorless | Clear and Colorless |
|  | Rate of Change between Before and After Crystallization[%] |  |  |  |  |  |  |  |
|  | 200 nm | 59.3 | 62.3 | 65.5 | Unmeasured | Unmeasured | 65.7 | 56.2 |
|  | 250 nm | 43.0 | 46.1 | 44.8 | Unmeasured | Unmeasured | 45.5 | 29.4 |

TABLE 4-continued

|  | No. 8 | No. 9 | No. 10 | No. 11 | No. 12 | No. 13 | No. 14 |
|---|---|---|---|---|---|---|---|
| 300 nm | 11.7 | 15.7 | 25.1 | Unmeasured | Unmeasured | 8.9 | −10.5 |
| 325 nm | 18.3 | 21.3 | 19.3 | Unmeasured | Unmeasured | 22.3 | 14.4 |
| 350 nm | 9.6 | 11.4 | 10.0 | Unmeasured | Unmeasured | 11.3 | 12.6 |
| 380 nm | 7.3 | 8.8 | 7.7 | Unmeasured | Unmeasured | 8.5 | 11.4 |
| 800 nm | 1.0 | 1.2 | 1.1 | Unmeasured | Unmeasured | 1.2 | 1.9 |
| 1200 nm | 0.9 | 1.0 | 0.7 | Unmeasured | Unmeasured | 0.9 | 1.0 |

TABLE 5

| | | No. 15 | No. 16 | No. 17 | No. 18 | No. 19 | No. 20 | No. 21 |
|---|---|---|---|---|---|---|---|---|
| Composition [% by weight] | $SiO_2$ | 65.7 | 65.9 | 67.2 | 65.5 | 65.5 | 66.0 | 65.8 |
| | $Al_2O_3$ | 21.7 | 22.2 | 21.6 | 22.0 | 22.0 | 22.3 | 22.1 |
| | $B_2O_3$ | 0.001 | 0.00 | 0.00 | 0.00 | 0.00 | 0.00 | 0.00 |
| | $P_2O_5$ | 1.37 | 1.40 | 1.41 | 1.39 | 1.42 | 1.42 | 1.38 |
| | $Li_2O$ | 3.63 | 4.02 | 3.30 | 3.67 | 3.67 | 3.70 | 3.70 |
| | $Na_2O$ | 0.87 | 0.37 | 0.37 | 0.01 | 0.37 | 0.39 | 0.09 |
| | $K_2O$ | 0.10 | 0.00 | 0.00 | 0.30 | 0.00 | 0.30 | 0.001 |
| | MgO | 0.68 | 1.52 | 1.23 | 0.65 | 0.68 | 0.68 | 0.68 |
| | CaO | 0.00 | 0.35 | 0.00 | 0.01 | 0.01 | 0.01 | 0.01 |
| | SrO | 0.01 | 0.001 | 0.00 | 0.00 | 0.00 | 0.00 | 0.00 |
| | BaO | 1.18 | 0.00 | 0.30 | 1.18 | 1.18 | 0.001 | 1.17 |
| | ZnO | 0.00 | 0.01 | 0.01 | 0.001 | 0.00 | 0.00 | 0.00 |
| | $TiO_2$ | 0.0175 | 0.0080 | 0.1560 | 0.0782 | 0.0095 | 0.0014 | 0.0147 |
| | $SnO_2$ | 1.17 | 0.45 | 1.18 | 1.39 | 1.39 | 1.41 | 1.31 |
| | $ZrO_2$ | 2.93 | 3.90 | 1.89 | 3.75 | 3.73 | 3.80 | 3.77 |
| | $Fe_2O_3$ | 0.0045 | 0.0033 | 0.0021 | 0.0005 | 0.0072 | 0.0085 | 0.0093 |
| Composition [ppm] | Pt | 1.4 | 0.2 | 1.4 | 1.5 | 1.5 | 1.5 | 1.5 |
| | Rh | 0.03 | 0.03 | 0.03 | 0.02 | 0.02 | 0.02 | 0.02 |
| | Pt + Rh | 1.43 | 0.23 | 1.43 | 1.52 | 1.52 | 1.52 | 1.52 |
| Sn/(P + B + Zr + Ti + Sn) | | 0.213 | 0.078 | 0.255 | 0.210 | 0.212 | 0.213 | 0.202 |
| Al/(Zr + Sn) | | 5.29 | 5.10 | 7.04 | 4.28 | 4.30 | 4.28 | 4.35 |
| (Mg + Zn)/Li | | 0.187 | 0.381 | 0.377 | 0.177 | 0.185 | 0.184 | 0.184 |
| Sn/(Zr + Sn) | | 0.29 | 0.10 | 0.38 | 0.27 | 0.27 | 0.27 | 0.26 |
| (Si + Al)/Li | | 24.08 | 21.92 | 26.91 | 23.84 | 23.84 | 23.86 | 23.76 |
| (Si + Al)/Sn | | 74.70 | 195.78 | 75.25 | 62.95 | 62.95 | 62.62 | 67.10 |
| (Li + Na + K)/Zr | | 1.57 | 1.13 | 1.94 | 1.06 | 1.08 | 1.16 | 1.01 |
| Ti/Zr | | 0.0060 | 0.0021 | 0.0825 | 0.0209 | 0.0025 | 0.0004 | 0.0039 |
| Ti/(Ti + Fe) | | 0.795 | 0.708 | 0.987 | 0.994 | 0.569 | 0.141 | 0.613 |
| Na + K + Ca + Sr + Ba | | 2.16 | 0.72 | 0.67 | 1.50 | 1.56 | 0.70 | 1.27 |
| (Mg + Ca + Sr + Ba)/Zr | | 0.64 | 0.48 | 0.81 | 0.49 | 0.50 | 0.18 | 0.49 |
| (Mg + Ca + Sr + Ba)/(Li + Na + K) | | 0.41 | 0.43 | 0.42 | 0.46 | 0.46 | 0.16 | 0.49 |
| Before Crystallization | | | | | | | | |
| Transmittance[%] 3 mm thick | 200 nm | 79.6 | Unmeasured | Unmeasured | 62.3 | 61.1 | 62.8 | 69.0 |
| | 250 nm | 22.9 | Unmeasured | Unmeasured | 20.7 | 20.6 | 20.9 | 21.7 |
| | 300 nm | 33.5 | Unmeasured | Unmeasured | 30.7 | 30.0 | 30.3 | 30.4 |
| | 325 nm | 71.2 | Unmeasured | Unmeasured | 68.9 | 68.7 | 69.2 | 67.9 |
| | 350 nm | 86.1 | Unmeasured | Unmeasured | 85.0 | 85.1 | 85.4 | 84.5 |
| | 380 nm | 90.2 | Unmeasured | Unmeasured | 89.5 | 89.6 | 89.8 | 89.3 |
| | 800 nm | 91.7 | Unmeasured | Unmeasured | 91.6 | 91.5 | 91.5 | 91.5 |
| | 1200 nm | 91.7 | Unmeasured | Unmeasured | 91.6 | 91.5 | 91.6 | 91.6 |
| L* | | 96.7 | Unmeasured | Unmeasured | 96.6 | 96.6 | 96.6 | 96.5 |
| a* | | −0.1 | Unmeasured | Unmeasured | −0.1 | −0.1 | −0.1 | −0.1 |
| b* | | 0.3 | Unmeasured | Unmeasured | 0.4 | 0.4 | 0.3 | 0.4 |
| Low-Temperature Viscosity | Strain Point[° C.] | Unmeasured | Unmeasured | Unmeasured | 679 | 682 | 682 | 687 |
| | Annealing Point[° C.] | Unmeasured | Unmeasured | Unmeasured | 738 | 741 | 740 | 745 |
| | Glass Transition Point[° C.] | Unmeasured | Unmeasured | Unmeasured | 727 | 728 | 726 | 730 |
| High-Temperature Viscosity | $10^4$[° C.] | Unmeasured | Unmeasured | Unmeasured | 1350 | 1348 | 1351 | 1350 |
| | $10^3$[° C.] | Unmeasured | Unmeasured | Unmeasured | 1528 | 1525 | 1531 | 1527 |
| | $10^{2.5}$[° C.] | Unmeasured | Unmeasured | Unmeasured | 1639 | 1636 | 1642 | 1640 |
| | $10^2$[° C.] | Unmeasured | Unmeasured | Unmeasured | 1772 | 1769 | 1773 | 1774 |
| Liquidus Temperature[° C.] | | Unmeasured | Unmeasured | 1378 | 1492 | 1488 | 1491 | 1479 |
| Liquidus Viscosity[—] | | Unmeasured | Unmeasured | Unmeasured | 3.18 | 3.19 | 3.20 | 3.24 |
| $\alpha[\times 10^{-7}/° C.]$ | 30-380° C. | Unmeasured | Unmeasured | Unmeasured | 39.2 | 39.7 | 39.4 | 38.4 |
| Density[g/cm3] | | 2.443 | Unmeasured | Unmeasured | 2.462 | 2.461 | 2.440 | 2.461 |

TABLE 6

|  |  | No. 15 | No. 16 | No. 17 | No. 18 | No. 19 | No. 20 | No. 21 |
|---|---|---|---|---|---|---|---|---|
| | | After Crystallization | | | | | | |
| Crystallization Conditions | | 780° C.-3 h<br>905° C.-1 h | 780° C.-3 h<br>890° C.-1 h | 780° C.-12 h<br>890° C.-1 h | 855° C.-3 h<br>920° C.-1 h | 840° C.-3 h<br>890° C.-1 h | 855° C.-3 h<br>920° C.-1 h | 840° C.-3 h<br>890° C.-1 h |
| Transmittance[%] | 200 nm | 37.2 | Unmeasured | Unmeasured | 28.9 | 23.5 | 30.0 | 26.1 |
| 3 mm thick | 250 nm | 19.0 | Unmeasured | Unmeasured | 15.2 | 13.8 | 15.3 | 13.9 |
| | 300 nm | 37.2 | Unmeasured | Unmeasured | 28.9 | 23.5 | 30.0 | 26.1 |
| | 325 nm | 64.4 | Unmeasured | Unmeasured | 59.8 | 58.1 | 49.8 | 53.3 |
| | 350 nm | 80.2 | Unmeasured | Unmeasured | 77.0 | 76.8 | 67.1 | 74.3 |
| | 380 nm | 85.1 | Unmeasured | Unmeasured | 82.3 | 82.5 | 74.3 | 80.8 |
| | 800 nm | 90.9 | Unmeasured | Unmeasured | 90.4 | 90.5 | 90.2 | 90.2 |
| | 1200 nm | 91.2 | Unmeasured | Unmeasured | 90.6 | 90.9 | 90.8 | 90.6 |
| L* | | 95.8 | Unmeasured | Unmeasured | 95.3 | 95.3 | 95.3 | 95.4 |
| a* | | 0.0 | Unmeasured | Unmeasured | 0.1 | 0.1 | 0.1 | 0.0 |
| b* | | 1.2 | Unmeasured | Unmeasured | 1.8 | 1.8 | 1.8 | 1.9 |
| Precipitated Crystals | | β-Q | β-Q | β-Q | β-Q | β-Q | β-Q | β-Q |
| Average Crystallite Size[nm] | | Unmeasured | Unmeasured | Unmeasured | Unmeasured | Unmeasured | Unmeasured | Unmeasured |
| α[×10−7/° C.] | 30-380° C. | −3.0 | −1.3 | −0.8 | −3.4 | −3.5 | −3.7 | −5.0 |
| α[×10−7/° C.] | 30-750° C. | −2.7 | −0.8 | −0.5 | −1.8 | −1.9 | −2.0 | −3.5 |
| Density[g/cm3] | | 2.530 | Unmeasured | 2.521 | 2.544 | 2.544 | 2.521 | 2.551 |
| Young's Modulus[GPa] | | Unmeasured | Unmeasured | Unmeasured | Unmeasured | Unmeasured | Unmeasured | Unmeasured |
| Modulus of Rigidity [GPa] | | Unmeasured | Unmeasured | Unmeasured | Unmeasured | Unmeasured | Unmeasured | Unmeasured |
| Poisson's Ratio | | Unmeasured | Unmeasured | Unmeasured | Unmeasured | Unmeasured | Unmeasured | Unmeasured |
| Appearance | | Clear and Colorless | Clear and Colorless | Clear and Colorless | Clear and Colorless | Clear and Colorless | Clear and Colorless | Clear and Colorless |
| | | Rate of Change between Before and After Crystallization[%] | | | | | | |
| | 200 nm | 53.2 | Unmeasured | Unmeasured | 53.7 | 61.5 | 52.2 | 62.2 |
| | 250 nm | 16.8 | Unmeasured | Unmeasured | 26.7 | 33.3 | 26.4 | 36.0 |
| | 300 nm | −11.2 | Unmeasured | Unmeasured | 6.1 | 21.5 | 0.8 | 14.3 |
| | 325 nm | 9.5 | Unmeasured | Unmeasured | 13.3 | 15.4 | 28.0 | 21.5 |
| | 350 nm | 6.9 | Unmeasured | Unmeasured | 9.5 | 9.7 | 21.4 | 12.0 |
| | 380 nm | 5.6 | Unmeasured | Unmeasured | 8.1 | 8.0 | 17.3 | 9.5 |
| | 800 nm | 0.8 | Unmeasured | Unmeasured | 1.3 | 1.1 | 1.5 | 1.3 |
| | 1200 nm | 0.6 | Unmeasured | Unmeasured | 1.1 | 0.7 | 0.8 | 1.0 |

TABLE 7

|  |  | No. 22 | No. 23 | No. 24 | No. 25 | No. 26 | No. 27 | No. 28 |
|---|---|---|---|---|---|---|---|---|
| Composition | $SiO_2$ | 66.6 | 65.0 | 66.1 | 67.1 | 68.0 | 65.7 | 67.0 |
| [% by weight] | $Al_2O_3$ | 21.9 | 22.0 | 21.7 | 22.2 | 22.6 | 21.9 | 22.1 |
| | $B_2O_3$ | 0.00 | 0.00 | 0.00 | 0.00 | 0.00 | 0.60 | 0.00 |
| | $P_2O_5$ | 1.39 | 1.38 | 1.36 | 1.41 | 0.00 | 2.55 | 1.40 |
| | $Li_2O$ | 3.66 | 3.67 | 3.63 | 3.69 | 3.74 | 3.64 | 3.62 |
| | $Na_2O$ | 0.40 | 0.40 | 0.41 | 0.07 | 0.09 | 0.07 | 0.37 |
| | $K_2O$ | 0.00 | 0.30 | 0.02 | 0.02 | 0.00 | 0.00 | 0.00 |
| | MgO | 0.68 | 0.69 | 0.68 | 1.23 | 0.40 | 1.23 | 1.23 |
| | CaO | 0.01 | 0.00 | 0.03 | 0.01 | 0.02 | 0.01 | 0.00 |
| | SrO | 0.00 | 0.00 | 0.43 | 0.00 | 0.00 | 0.00 | 0.01 |
| | BaO | 1.17 | 1.19 | 1.16 | 0.00 | 0.00 | 0.00 | 0.00 |
| | ZnO | 0.00 | 0.00 | 0.00 | 0.00 | 0.90 | 0.00 | 0.00 |
| | $TiO_2$ | 0.0210 | 0.3630 | 0.0235 | 0.0001 | 0.0141 | 0.0385 | 0.0720 |
| | $SnO_2$ | 1.23 | 1.36 | 1.21 | 1.41 | 1.22 | 1.25 | 1.29 |
| | $ZrO_2$ | 2.81 | 3.71 | 3.01 | 3.02 | 3.06 | 3.06 | 3.01 |
| | $Fe_2O_3$ | 0.0039 | 0.0000 | 0.0131 | 0.0088 | 0.0003 | 0.0091 | 0.0029 |
| Composition | Pt | 1.5 | 0.01 | 1.5 | 1.4 | 1.4 | 1.4 | 1.4 |
| [ppm] | Rh | 0.02 | 0.01 | 0.02 | 0.02 | 0.03 | 0.03 | 0.03 |
| | Pt + Rh | 1.52 | 0.02 | 1.52 | 1.42 | 1.43 | 1.43 | 1.43 |
| Sn/(P + B + Zr + Ti + Sn) | | 0.226 | 0.200 | 0.216 | 0.241 | 0.284 | 0.167 | 0.223 |
| Al/(Zr + Sn) | | 5.42 | 4.33 | 5.14 | 5.01 | 5.28 | 5.08 | 5.14 |
| (Mg + Zn)/Li | | 0.186 | 0.188 | 0.187 | 0.333 | 0.348 | 0.338 | 0.340 |
| Sn/(Zr + Sn) | | 0.30 | 0.27 | 0.29 | 0.32 | 0.29 | 0.29 | 0.30 |
| (Si + Al)/Li | | 24.18 | 23.69 | 24.19 | 24.20 | 24.22 | 24.07 | 24.61 |
| (Si + Al)/Sn | | 71.95 | 63.93 | 72.56 | 63.33 | 74.26 | 70.08 | 69.07 |
| (Li + Na + K)/Zr | | 1.44 | 1.18 | 1.35 | 1.25 | 1.25 | 1.21 | 1.33 |
| Ti/Zr | | 0.0075 | 0.0978 | 0.0078 | 0.0000 | 0.0046 | 0.0126 | 0.0239 |
| Ti/(Ti + Fe) | | 0.843 | 1.000 | 0.642 | 0.011 | 0.979 | 0.809 | 0.961 |
| Na + K + Ca + Sr + Ba | | 4.75 | 4.76 | 5.18 | 5.00 | 4.25 | 4.95 | 5.23 |
| (Mg + Ca + Sr + Ba)/Zr | | 0.66 | 0.51 | 0.76 | 0.41 | 0.14 | 0.41 | 0.41 |
| (Mg + Ca + Sr + Ba)/(Li + Na + K) | | 0.46 | 0.43 | 0.57 | 0.33 | 0.11 | 0.34 | 0.31 |
| | | Before Crystallization | | | | | | |
| Transmittance[%] | 200 nm | 80 | Unmeasured | 70 | 81 | 78 | 80 | 82 |
| 3 mm thick | 250 nm | 23 | Unmeasured | 19 | 24 | 23 | 24 | 24 |

TABLE 7-continued

|  |  | No. 22 | No. 23 | No. 24 | No. 25 | No. 26 | No. 27 | No. 28 |
|---|---|---|---|---|---|---|---|---|
|  | 300 nm | 35 | Unmeasured | 19 | 34 | 33 | 30 | 34 |
|  | 325 nm | 71 | Unmeasured | 56 | 72 | 71 | 67 | 71 |
|  | 350 nm | 86 | Unmeasured | 80 | 86 | 86 | 85 | 86 |
|  | 380 nm | 90 | Unmeasured | 88 | 90 | 90 | 90 | 90 |
|  | 800 nm | 92 | Unmeasured | 91 | 92 | 92 | 91 | 92 |
|  | 1200 nm | 92 | Unmeasured | 91 | 92 | 92 | 92 | 92 |
| L* |  | 96.7 | Unmeasured | 96.6 | 96.7 | 96.7 | 96.6 | 96.6 |
| a* |  | −0.1 | Unmeasured | −0.1 | 0.0 | 0.0 | 0.0 | 0.0 |
| b* |  | 0.3 | Unmeasured | 0.4 | 0.3 | 0.3 | 0.3 | 0.3 |
| Low-Temperature Viscosity | Strain Point[° C.] | 683 | Unmeasured | 683 | Unmeasured | Unmeasured | Unmeasured | Unmeasured |
|  | Annealing Point[° C.] | 742 | Unmeasured | 742 | Unmeasured | Unmeasured | Unmeasured | Unmeasured |
|  | Glass Transition Point[° C.] | 737 | Unmeasured | 731 | 738 | 743 | 731 | Unmeasured |
| High-Temperature Viscosity | 10^4[° C.] | 1362 | Unmeasured | 1362 | 1356 | 1352 | 1357 | 1358 |
|  | 10^3[° C.] | 1544 | Unmeasured | 1544 | 1537 | 1532 | 1538 | 1538 |
|  | 10^2.5[° C.] | 1658 | Unmeasured | 1656 | 1649 | 1645 | 1650 | 1653 |
|  | 10^2[° C.] | 1793 | Unmeasured | 1789 | 1778 | 1778 | 1780 | 1790 |
| Liquidus Temperature[° C.] |  | 1423 | Unmeasured | 1442 | Unmeasured | Unmeasured | Unmeasured | Unmeasured |
| Liquidus Viscosity[—] |  | 3.63 | Unmeasured | 3.53 | Unmeasured | Unmeasured | Unmeasured | Unmeasured |
| α[×10$^{-7}$/° C.] | 30-380° C. | 39.2 | Unmeasured | 39.3 | 36.6 | 36.9 | 36.5 | 36.9 |
| Density[g/cm3] |  | 2.441 | Unmeasured | 2.445 | 2.431 | 2.438 | 2.420 | 2.430 |

TABLE 8

|  |  | No. 22 | No. 23 | No. 24 | No. 25 | No. 26 | No. 27 | No. 28 |
|---|---|---|---|---|---|---|---|---|
| After Crystallization | | | | | | | | |
| Crystallization Conditions |  | 840° C.-3 h 890° C.-1 h | 810° C.-20 h 920° C.-3 h | 810° C.-3 h 920° C.-1 h | 780° C.-3 h 890° C.-1 h | 780° C.-3 h 890° C.-1 h | 780° C.-3 h 890° C.-1 h | 780° C.-3 h 890° C.-1 h |
| Transmittance[%] 3 mm thick | 200 nm | 41 | Unmeasured | 34 | 30 | 26 | 29 | 33 |
|  | 250 nm | 17 | Unmeasured | 10 | 14 | 13 | 11 | 13 |
|  | 300 nm | 41 | Unmeasured | 34 | 30 | 26 | 29 | 33 |
|  | 325 nm | 54 | Unmeasured | 44 | 56 | 55 | 55 | 61 |
|  | 350 nm | 69 | Unmeasured | 66 | 76 | 75 | 76 | 79 |
|  | 380 nm | 74 | 0 | 76 | 82 | 81 | 83 | 84 |
|  | 800 nm | 90 | 0 | 90 | 91 | 91 | 91 | 91 |
|  | 1200 nm | 91 | Unmeasured | 90 | 91 | 91 | 91 | 91 |
| L* |  | 93.9 | Unmeasured | 94.8 | 95.4 | 95.3 | 95.6 | 95.6 |
| a* |  | 0.2 | Unmeasured | 0.0 | 0.1 | 0.0 | 0.0 | 0.1 |
| b* |  | 3.4 | Unmeasured | 2.7 | 1.7 | 1.9 | 1.5 | 1.4 |
| Precipitated Crystals |  | β-Q | β-Q | β-Q | β-Q | β-Q | β-Q | β-Q |
| Average Crystallite Size[nm] |  | Unmeasured | Unmeasured | Unmeasured | Unmeasured | Unmeasured | Unmeasured | Unmeasured |
| α[×10$^{-7}$/° C.] | 30-380° C. | −5.4 | −0.2 | −5.0 | −2.8 | −2.5 | −2.4 | −1.1 |
|  | 30-750° C. | −4.0 | 0.9 | −3.4 | −2.6 | −1.9 | −2.5 | −0.8 |
| Density[g/cm3] |  | 2.520 | Unmeasured | 2.529 | 2.529 | 2.534 | 2.527 | 2.523 |
| Young's Modulus[GPa] |  | Unmeasured | Unmeasured | Unmeasured | Unmeasured | Unmeasured | Unmeasured | Unmeasured |
| Modulus of Rigidity [GPa] |  | Unmeasured | Unmeasured | Unmeasured | Unmeasured | Unmeasured | Unmeasured | Unmeasured |
| Poisson's Ratio |  | Unmeasured | Unmeasured | Unmeasured | Unmeasured | Unmeasured | Unmeasured | Unmeasured |
| Appearance |  | Clear and Colorless | Clear and Colorless | Clear and Colorless | Clear and Colorless | Clear and Colorless | Clear and Colorless | Clear and Colorless |
| Rate of Change between Before and After Crystallization[%] | | | | | | | | |
|  | 200 nm | 49.3 | Unmeasured | 51.1 | 62.8 | 66.5 | 64.5 | 59.8 |
|  | 250 nm | 24.3 | Unmeasured | 47.7 | 41.5 | 42.8 | 54.3 | 43.9 |
|  | 300 nm | −16.4 | Unmeasured | −76.5 | 12.6 | 21.0 | 4.2 | 2.2 |
|  | 325 nm | 23.8 | Unmeasured | 22.2 | 21.6 | 22.4 | 19.0 | 13.6 |
|  | 350 nm | 20.1 | Unmeasured | 18.1 | 12.0 | 12.8 | 9.6 | 8.2 |
|  | 380 nm | 17.3 | Unmeasured | 13.7 | 8.9 | 9.6 | 7.1 | 6.6 |
|  | 800 nm | 2.1 | Unmeasured | 1.3 | 1.3 | 1.1 | 0.8 | 1.0 |
|  | 1200 nm | 1.0 | Unmeasured | 1.4 | 0.9 | 0.9 | 0.6 | 0.9 |

TABLE 9

|  |  | No. 29 | No. 30 | No. 31 | No. 32 | No. 33 | No. 34 | No. 35 |
|---|---|---|---|---|---|---|---|---|
| Composition [% by weight] | SiO$_2$ | 66.5 |  |  | 67.4 |  |  |  |
|  | Al$_2$O$_3$ | 21.8 |  |  | 22.3 |  |  |  |
|  | B$_2$O$_3$ | 0.00 |  |  | 0.00 |  |  |  |
|  | P$_2$O$_5$ | 1.40 |  |  | 1.33 |  |  |  |
|  | Li$_2$O | 3.63 |  |  | 3.68 |  |  |  |
|  | Na$_2$O | 0.41 |  |  | 0.37 |  |  |  |
|  | K$_2$O | 0.00 |  |  | 0.00 |  |  |  |

TABLE 9-continued

|  |  | No. 29 | No. 30 | No. 31 | No. 32 | No. 33 | No. 34 | No. 35 |
|---|---|---|---|---|---|---|---|---|
|  | MgO | 0.69 |  |  |  | 1.24 |  |  |
|  | CaO | 0.00 |  |  |  | 0.00 |  |  |
|  | SrO | 0.00 |  |  |  | 0.00 |  |  |
|  | BaO | 1.18 |  |  |  | 0.00 |  |  |
|  | ZnO | 0.01 |  |  |  | 0.00 |  |  |
|  | $TiO_2$ | 0.0182 |  |  |  | 0.0145 |  |  |
|  | $SnO_2$ | 1.36 |  |  |  | 1.13 |  |  |
|  | $ZrO_2$ | 2.95 |  |  |  | 2.62 |  |  |
|  | $Fe_2O_3$ | 0.0018 |  |  |  | 0.0064 |  |  |
| Composition | Pt | 0 | 0.03 | 0.16 | 0.30 | 0.49 | 0.71 | 0.03 |
| [ppm] | Rh | 0 | 0.02 | 0.09 | 0.06 | 0.07 | 0.10 | 0.22 |
|  | Pt + Rh | 0 | 0.05 | 0.25 | 0.36 | 0.56 | 0.81 | 0.25 |
| Sn/(P + B + Zr + Ti + Sn) |  | 0.237 |  |  |  | 0.222 |  |  |
| Al/(Zr + Sn) |  | 5.06 |  |  |  | 5.95 |  |  |
| (Mg + Zn)/Li |  | 0.194 |  |  |  | 0.337 |  |  |
| Sn/(Zr + Sn) |  | 0.32 |  |  |  | 0.30 |  |  |
| (Si + Al)/Li |  | 24.33 |  |  |  | 24.38 |  |  |
| (Si + Al)/Sn |  | 64.93 |  |  |  | 79.38 |  |  |
| (Li + Na + K)/Zr |  | 1.37 |  |  |  | 1.55 |  |  |
| Ti/Zr |  | 0.0062 |  |  |  | 0.0055 |  |  |
| Ti/(Ti + Fe) |  | 0.910 |  |  |  | 0.694 |  |  |
| Na + K + Ca + Sr + Ba |  | 4.73 |  |  |  | 5.29 |  |  |
| (Mg + Ca + Sr + Ba)/Zr |  | 0.64 |  |  |  | 0.47 |  |  |
| (Mg + Ca + Sr + Ba)/(Li + Na + K) |  | 0.47 |  |  |  | 0.31 |  |  |
|  |  | Before Crystallization |  |  |  |  |  |  |
| Transmittance[%] | 200 nm | 72.0 | 83.4 | Unmeasured | Unmeasured | Unmeasured | Unmeasured | Unmeasured |
| 3 mm thick | 250 nm | 22.1 | 24.6 | Unmeasured | Unmeasured | Unmeasured | Unmeasured | Unmeasured |
|  | 300 nm | 35.3 | 45.9 | Unmeasured | Unmeasured | Unmeasured | Unmeasured | Unmeasured |
|  | 325 nm | 72.6 | 76.6 | Unmeasured | Unmeasured | Unmeasured | Unmeasured | Unmeasured |
|  | 350 nm | 86.8 | 87.5 | Unmeasured | Unmeasured | Unmeasured | Unmeasured | Unmeasured |
|  | 380 nm | 90.4 | 90.3 | Unmeasured | Unmeasured | Unmeasured | Unmeasured | Unmeasured |
|  | 800 nm | 91.6 | 91.7 | Unmeasured | Unmeasured | Unmeasured | Unmeasured | Unmeasured |
|  | 1200 nm | 91.6 | 91.7 | Unmeasured | Unmeasured | Unmeasured | Unmeasured | Unmeasured |
| L* |  | 96.7 | 96.6 | Unmeasured | Unmeasured | Unmeasured | Unmeasured | Unmeasured |
| a* |  | 0.0 | −0.1 | Unmeasured | Unmeasured | Unmeasured | Unmeasured | Unmeasured |
| b* |  | 0.2 | 0.4 | Unmeasured | Unmeasured | Unmeasured | Unmeasured | Unmeasured |
| Low-Temperature Viscosity | Strain Point[° C.] | 683 | Unmeasured | Unmeasured | Unmeasured | Unmeasured | Unmeasured | Unmeasured |
|  | Annealing Point[° C.] | 742 | Unmeasured | Unmeasured | Unmeasured | Unmeasured | Unmeasured | Unmeasured |
|  | Glass Transition Point[° C.] | 731 | 737 | Unmeasured | Unmeasured | Unmeasured | Unmeasured | Unmeasured |
| High-Temperature Viscosity | 10^4[° C.] | 1362 | 1362 | Unmeasured | Unmeasured | Unmeasured | Unmeasured | Unmeasured |
|  | 10^3[° C.] | 1544 | 1542 | Unmeasured | Unmeasured | Unmeasured | Unmeasured | Unmeasured |
|  | 10^2.5[° C.] | 1656 | 1655 | Unmeasured | Unmeasured | Unmeasured | Unmeasured | Unmeasured |
|  | 10^2[° C.] | 1789 | 1789 | Unmeasured | Unmeasured | Unmeasured | Unmeasured | Unmeasured |
| Liquidus Temperature[° C.] |  | 1442 | 1401 | Unmeasured | Unmeasured | Unmeasured | Unmeasured | Unmeasured |
| Liquidus Viscosity[—] |  | 3.53 | 3.72 | Unmeasured | Unmeasured | Unmeasured | Unmeasured | Unmeasured |
| α[×$10^{-7}$/° C.] | 30-380° C. | 39.3 | 37.8 | Unmeasured | Unmeasured | Unmeasured | Unmeasured | Unmeasured |
| Density[g/cm3] |  | 2.444 | 2.422 | Unmeasured | Unmeasured | Unmeasured | Unmeasured | Unmeasured |

TABLE 10

|  |  | No. 29 | No. 30 | No. 31 | No. 32 | No. 33 | No. 34 | No. 35 |
|---|---|---|---|---|---|---|---|---|
|  |  | After Crystallization |  |  |  |  |  |  |
| Crystallization Conditions |  | 780° C.-3 h 905° C.-1 h | 780° C.-3 h 890° C.-1 h | 780° C.-3 h 890° C.-1 h | 780° C.-3 h 890° C.-1 h | 780° C.-3 h 890° C.-1 h | 780° C.-3 h 890° C.-1 h | 780° C.-3 h 890° C.-1 h |
| Transmittance[%] | 200 nm | 34.9 | 30.6 | 37.5 | 36.7 | 36.7 | 35.9 | 30.6 |
| 3 mm thick | 250 nm | 17.0 | 12.1 | 18.9 | 19.0 | 18.9 | 18.7 | 12.1 |
|  | 300 nm | 34.9 | 30.6 | 20.6 | 23.0 | 22.9 | 23.1 | 30.6 |
|  | 325 nm | 59.9 | 61.9 | 59.7 | 62.2 | 60.7 | 60.5 | 61.9 |
|  | 350 nm | 85.3 | 81.7 | 78.7 | 79.7 | 77.6 | 77.2 | 81.7 |
|  | 380 nm | 88.9 | 87.0 | 91.1 | 91.1 | 90.8 | 90.7 | 87.0 |
|  | 800 nm | 91.4 | 91.4 | 91.1 | 91.1 | 90.8 | 90.7 | 91.4 |
|  | 1200 nm | 91.2 | 91.3 | 91.0 | 90.9 | 90.8 | 90.8 | 91.3 |
| L* |  | 96.3 | 96.2 | 95.9 | 95.9 | 95.6 | 95.5 | 96.2 |
| a* |  | 0.1 | 0.0 | −0.1 | −0.1 | −0.1 | −0.1 | 0.0 |
| b* |  | 0.4 | 0.7 | 1.2 | 1.1 | 1.5 | 1.6 | 0.7 |
| Diffuse Transmittance [%] 3 mm thick | 600 nm | Unmeasured | 0.10 | Unmeasured | Unmeasured | Unmeasured | 0.53 | Unmeasured |
|  | 800 nm | Unmeasured | 0.04 | Unmeasured | Unmeasured | Unmeasured | 0.23 | Unmeasured |
|  | 1200 nm | Unmeasured | 0.03 | Unmeasured | Unmeasured | Unmeasured | 0.06 | Unmeasured |
| Precipitated Crystals |  | β-Q | β-Q | β-Q | β-Q | β-Q | β-Q | β-Q |
| Average Crystallite Size[nm] |  | 38 | Unmeasured | Unmeasured | Unmeasured | Unmeasured | Unmeasured | Unmeasured |
| α[×$10^{-7}$/° C.] | 30-380° C. | −5.0 | −2.7 | Unmeasured | Unmeasured | Unmeasured | Unmeasured | Unmeasured |

TABLE 10-continued

|  |  | No. 29 | No. 30 | No. 31 | No. 32 | No. 33 | No. 34 | No. 35 |
|---|---|---|---|---|---|---|---|---|
| α[×10$^{-7}$/° C.] | 30-750° C. | −3.4 | −1.7 | Unmeasured | Unmeasured | Unmeasured | Unmeasured | Unmeasured |
| Density[g/cm3] |  | 2.530 | 2.515 | Unmeasured | Unmeasured | Unmeasured | Unmeasured | Unmeasured |
| Young's Modulus[GPa] |  | Unmeasured | Unmeasured | Unmeasured | Unmeasured | Unmeasured | Unmeasured | Unmeasured |
| Modulus of Rigidity [GPa] |  | Unmeasured | Unmeasured | Unmeasured | Unmeasured | Unmeasured | Unmeasured | Unmeasured |
| Poisson's Ratio |  | Unmeasured | Unmeasured | Unmeasured | Unmeasured | Unmeasured | Unmeasured | Unmeasured |
| Appearance |  | Clear and Colorless | Clear and Colorless | Clear and Colorless | Clear and Colorless | Clear and Colorless | Clear and Colorless | Clear and Colorless |
| Rate of Change between Before and After Crystallization[%] |||||||||
| 200 nm |  | 51.5 | 63.3 | Unmeasured | Unmeasured | Unmeasured | Unmeasured | Unmeasured |
| 250 nm |  | 22.9 | 50.6 | Unmeasured | Unmeasured | Unmeasured | Unmeasured | Unmeasured |
| 300 nm |  | 1.1 | 33.3 | Unmeasured | Unmeasured | Unmeasured | Unmeasured | Unmeasured |
| 325 nm |  | 3.8 | 19.3 | Unmeasured | Unmeasured | Unmeasured | Unmeasured | Unmeasured |
| 350 nm |  | 1.7 | 6.6 | Unmeasured | Unmeasured | Unmeasured | Unmeasured | Unmeasured |
| 380 nm |  | 1.7 | 3.6 | Unmeasured | Unmeasured | Unmeasured | Unmeasured | Unmeasured |
| 800 nm |  | 0.2 | 0.3 | Unmeasured | Unmeasured | Unmeasured | Unmeasured | Unmeasured |
| 1200 nm |  | 0.4 | 0.5 | Unmeasured | Unmeasured | Unmeasured | Unmeasured | Unmeasured |

TABLE 11

|  |  | No. 36 | No. 37 | No. 38 | No. 39 | No. 40 | No. 41 | No. 42 | No. 43 | No. 44 | No. 45 |
|---|---|---|---|---|---|---|---|---|---|---|---|
| Composition [% by weight] | SiO$_2$ |  |  |  |  | 66.5 |  |  | 66.2 |  |  |
|  | Al$_2$O$_3$ |  |  |  |  | 22.0 |  |  | 22.2 |  |  |
|  | B$_2$O$_3$ |  |  |  |  | 0.00 |  |  | 0.00 |  |  |
|  | P$_2$O$_5$ |  |  |  |  | 1.42 |  |  | 1.40 |  |  |
|  | Li$_2$O |  |  |  |  | 3.50 |  |  | 2.35 |  |  |
|  | Na$_2$O |  |  |  |  | 0.40 |  |  | 0.40 |  |  |
|  | K$_2$O |  |  |  |  | 0.00 |  |  | 0.30 |  |  |
|  | MgO |  |  |  |  | 1.20 |  |  | 1.20 |  |  |
|  | CaO |  |  |  |  | 0.00 |  |  | 0.00 |  |  |
|  | SrO |  |  |  |  | 0.01 |  |  | 0.00 |  |  |
|  | BaO |  |  |  |  | 0.00 |  |  | 1.20 |  |  |
|  | ZnO |  |  |  |  | 0.00 |  |  | 0.00 |  |  |
|  | TiO$_2$ |  |  |  |  | 0.0058 |  |  | 0.0072 |  |  |
|  | SnO$_2$ |  |  |  |  | 1.33 |  |  | 1.30 |  |  |
|  | ZrO$_2$ |  |  |  |  | 3.00 |  |  | 2.99 |  |  |
|  | Fe$_2$O$_3$ |  |  |  |  | 0.0057 |  |  | 0.0066 |  |  |
| Composition [ppm] | Pt |  |  | 0.01 |  |  |  | 0.00 | 1.90 |  |  |
|  | Rh |  |  | 0.03 |  |  |  |  | 0.05 |  |  |
|  | Pt + Rh |  |  | 0.04 |  |  |  | 0.00 | 1.95 |  |  |
| Sn/(P + B + Zr + Ti + Sn) |  |  |  |  |  | 0.231 |  |  | 0.228 |  |  |
| Al/(Zr + Sn) |  |  |  |  |  | 5.08 |  |  | 5.17 |  |  |
| (Mg + Zn)/Li |  |  |  |  |  | 0.343 |  |  | 0.511 |  |  |
| Sn/(Zr + Sn) |  |  |  |  |  | 0.31 |  |  | 0.30 |  |  |
| (Si + Al)/Li |  |  |  |  |  | 25.29 |  |  | 37.62 |  |  |
| (Si + Al)/Sn |  |  |  |  |  | 66.54 |  |  | 68.00 |  |  |
| (Li + Na + K)/Zr |  |  |  |  |  | 1.30 |  |  | 1.02 |  |  |
| Ti/Zr |  |  |  |  |  | 0.0019 |  |  | 0.0024 |  |  |
| Ti/(Ti + Fe) |  |  |  |  |  | 0.504 |  |  | 0.522 |  |  |
| Na + K + Ca + Sr + Ba |  |  |  |  |  | 0.41 |  |  | 1.90 |  |  |
| (Mg + Ca + Sr + Ba)/Zr |  |  |  |  |  | 0.40 |  |  | 0.80 |  |  |
| (Mg + Ca + Sr + Ba)/(Li + Na + K) |  |  |  |  |  | 0.31 |  |  | 0.79 |  |  |
| Before Crystallization |||||||||||
| Transmittance[%] 3 mm thick | 200 nm |  |  |  |  | 82.2 |  | Unmeasured | 81.5 |  |  |
|  | 250 nm |  |  |  |  | 25.0 |  | Unmeasured | 23.7 |  |  |
|  | 300 nm |  |  |  |  | 36.2 |  | Unmeasured | 30.6 |  |  |
|  | 325 nm |  |  |  |  | 72.5 |  | Unmeasured | 68.1 |  |  |
|  | 350 nm |  |  |  |  | 86.3 |  | Unmeasured | 85.0 |  |  |
|  | 380 nm |  |  |  |  | 90.0 |  | Unmeasured | 89.9 |  |  |
|  | 800 nm |  |  |  |  | 91.6 |  | Unmeasured | 91.6 |  |  |
|  | 1200 nm |  |  |  |  | 91.7 |  | Unmeasured | 91.6 |  |  |
| L* |  |  |  |  |  | 96.6 |  | Unmeasured | 96.6 |  |  |
| a* |  |  |  |  |  | 0.0 |  | Unmeasured | −0.1 |  |  |
| b* |  |  |  |  |  | 0.3 |  | Unmeasured | 0.4 |  |  |
| Low-Temperature Viscosity | Strain Point[° C.] |  |  |  |  | Unmeasured |  | Unmeasured | 695 |  |  |
|  | Annealing Point[° C.] |  |  |  |  | Unmeasured |  | Unmeasured | 754 |  |  |
|  | Glass Transition Point[° C.] |  |  |  |  | 742 |  | Unmeasured | Unmeasured |  |  |
| High-Temperature Viscosity | 10^4[° C.] |  |  |  |  | Unmeasured |  | Unmeasured | 1364 |  |  |
|  | 10^3[° C.] |  |  |  |  | Unmeasured |  | Unmeasured | 1542 |  |  |
|  | 10^2.5[° C.] |  |  |  |  | Unmeasured |  | Unmeasured | 1658 |  |  |
|  | 10^2[° C.] |  |  |  |  | Unmeasured |  | Unmeasured | Unmeasured |  |  |
| Liquidus Temperature[° C.] |  |  |  |  |  | Unmeasured |  | Unmeasured | 1440 |  |  |

TABLE 11-continued

|  |  | No. 36 | No. 37 | No. 38 | No. 39 | No. 40 | No. 41 | No. 42 | No. 43 | No. 44 | No. 45 |
|---|---|---|---|---|---|---|---|---|---|---|---|
| Liquidus Viscosity[—] |  |  |  | Unmeasured |  |  |  | Unmeasured |  | 3.53 |  |
| $\alpha[\times 10^{-7}/°C.]$ | 30-380° C. |  |  | 37.1 |  |  |  |  |  | Unmeasured |  |
| Density[g/cm3] |  |  |  | 2.431 |  |  |  |  |  | 2.460 |  |

TABLE 12

|  |  | No. 36 | No. 37 | No. 38 | No. 39 | No. 40 | No. 41 |
|---|---|---|---|---|---|---|---|
|  | | After Crystallization | | | | | |
| Crystallization Conditions |  | 780° C.-3 h 890° C.-1 h | 780° C.-3 h 920° C.-1 h | 810° C.-0.75 h 920° C.-0.25 h | 810° C.-0.75 h 935° C.-0.25 h | 825° C.-0.75 h 935° C.-0.25 h | 825° C.-0.75 h 935° C.-0.25 h |
| Transmittance[%] | 200 nm | 35.5 | 30.2 | 32.9 | 31.4 | 38.1 | Unmeasured |
| 3 mm thick | 250 nm | 15.6 | 14.5 | 15.9 | 16.0 | 18.9 | Unmeasured |
|  | 300 nm | 35.5 | 22.0 | 23.4 | 23.9 | 23.2 | 23.2 |
|  | 325 nm | 67.7 | 66.5 | 64.4 | 65.4 | 60.8 | Unmeasured |
|  | 350 nm | 84.5 | 83.8 | 81.5 | 81.9 | 78.2 | Unmeasured |
|  | 380 nm | 88.6 | 88.1 | 86.6 | 86.9 | 84.4 | Unmeasured |
|  | 800 nm | 91.4 | 91.4 | 91.4 | 91.4 | 91.3 | Unmeasured |
|  | 1200 nm | 91.3 | 91.3 | 91.3 | 91.4 | 91.5 | Unmeasured |
| L* |  | 96.3 | 96.3 | 96.2 | 96.2 | 96.0 | Unmeasured |
| a* |  | 0.0 | 0.0 | 0.0 | 0.0 | −0.1 | Unmeasured |
| b* |  | 0.5 | 0.6 | 0.8 | 0.8 | 1.2 | Unmeasured |
| Precipitated Crystals |  | β-Q | β-Q | β-Q | β-Q | β-Q | β-Q |
| Average Crystallite Size[nm] |  | 41 | Unmeasured | Unmeasured | Unmeasured | Unmeasured | Unmeasured |
| $\alpha[\times 10^{-7}/°C.]$ | 30-380° C. | −1.7 | −1.6 | −1.7 | Unmeasured | Unmeasured | Unmeasured |
| $\alpha[\times 10^{-7}/°C.]$ | 30-750° C. | −1.1 | −1.0 | −1.1 | Unmeasured | Unmeasured | Unmeasured |
| Density[g/cm3] |  | 2 521 | Unmeasured | Unmeasured | Unmeasured | 2.521 | 2.514 |
| Young's Modulus[GPa] |  | Unmeasured | Unmeasured | Unmeasured | Unmeasured | Unmeasured | Unmeasured |
| Modulus of Rigidity [GPa] |  | Unmeasured | Unmeasured | Unmeasured | Unmeasured | Unmeasured | Unmeasured |
| Poisson's Ratio |  | Unmeasured | Unmeasured | Unmeasured | Unmeasured | Unmeasured | Unmeasured |
| Appearance |  | | | Clear and Colorless | | | |
|  | | Rate of Change between Before and After Crystallization[%] | | | | | |
| Transmittance | 200 nm | 56.8 | 63.3 | 59.9 | 61.8 | 53.6 | 53.6 |
| 3 mm thick | 250 nm | 36.7 | 42.1 | 36.6 | 36.1 | 24.6 | 24.6 |
|  | 300 nm | 2.0 | 39.1 | 35.4 | 33.9 | 35.8 | 35.8 |
|  | 325 nm | 6.6 | 8.3 | 11.1 | 9.8 | 16.1 | 16.1 |
|  | 350 nm | 2.1 | 3.0 | 5.6 | 5.1 | 9.4 | 9.4 |
|  | 380 nm | 1.5 | 2.1 | 3.8 | 3.5 | 6.2 | 6.2 |
|  | 800 nm | 0.1 | 0.2 | 0.1 | 0.2 | 0.2 | 0.2 |
|  | 1200 nm | 0.5 | 0.5 | 0.5 | 0.5 | 0.2 | 0.2 |

|  |  | No. 42 | No. 43 | No. 44 | No. 45 |
|---|---|---|---|---|---|
|  | | After Crystallization | | | |
| Crystallization Conditions |  | 810° C.-1.5 h 920° C.-1 h | 810° C.-1.5 h 935° C.-1 h | 810° C.-1.5 h 950° C.-1 h | 840° C.-1.5 h 920° C.-1 h |
| Transmittance[%] | 200 nm | Unmeasured | Unmeasured | Unmeasured | Unmeasured |
| 3 mm thick | 250 nm | Unmeasured | Unmeasured | Unmeasured | Unmeasured |
|  | 300 nm | 23.2 | 24.3 | 23.5 | 20.2 |
|  | 325 nm | 60.8 | 47.1 | 50.1 | 45.7 |
|  | 350 nm | 78.2 | 59.5 | 64.0 | 60.7 |
|  | 380 nm | Unmeasured | Unmeasured | Unmeasured | Unmeasured |
|  | 800 nm | Unmeasured | Unmeasured | Unmeasured | Unmeasured |
|  | 1200 nm | Unmeasured | Unmeasured | Unmeasured | Unmeasured |
| L* |  | Unmeasured | Unmeasured | Unmeasured | Unmeasured |
| a* |  | Unmeasured | Unmeasured | Unmeasured | Unmeasured |
| b* |  | Unmeasured | Unmeasured | Unmeasured | Unmeasured |
| Precipitated Crystals |  | β-Q | β-Q | β-Q | β-Q |
| Average Crystallite Size[nm] |  | Unmeasured | Unmeasured | Unmeasured | Unmeasured |
| $\alpha[\times 10^{-7}/°C.]$ | 30-380° C. | 12.2 | 13.6 | 15.4 | 12.0 |
| $\alpha[\times 10^{-7}/°C.]$ | 30-750° C. | Unmeasured | Unmeasured | Unmeasured | Unmeasured |
| Density[g/cm3] |  | Unmeasured | Unmeasured | Unmeasured | Unmeasured |
| Young's Modulus[GPa] |  | Unmeasured | Unmeasured | Unmeasured | Unmeasured |
| Modulus of Rigidity [GPa] |  | Unmeasured | Unmeasured | Unmeasured | Unmeasured |
| Poisson's Ratio |  | Unmeasured | Unmeasured | Unmeasured | Unmeasured |
| Appearance |  | | Clear and Colorless | | |
|  | | Rate of Change between Before and After Crystallization[%] | | | |
| Transmittance | 200 nm | Unmeasured | Unmeasured | Unmeasured | Unmeasured |
| 3 mm thick | 250 nm | Unmeasured | Unmeasured | Unmeasured | Unmeasured |
|  | 300 nm | 7.3 | 6.3 | 7.0 | 10.3 |
|  | 325 nm | 7.3 | 21.0 | 18.0 | 22.4 |

TABLE 12-continued

| | | | | |
|---|---|---|---|---|
| 350 nm | 6.8 | 25.5 | 21.1 | 24.4 |
| 380 nm | Unmeasured | Unmeasured | Unmeasured | Unmeasured |
| 800 nm | Unmeasured | Unmeasured | Unmeasured | Unmeasured |
| 1200 nm | Unmeasured | Unmeasured | Unmeasured | Unmeasured |

TABLE 13

| | | No. 46 | No. 47 | No. 48 | No. 49 | No. 50 | No. 51 | No. 52 |
|---|---|---|---|---|---|---|---|---|
| Composition [% by weight] | $SiO_2$ | 66.60 | 64.4 | 67.0 | 66.9 | 66.9 | 66.7 | 67.0 |
| | $Al_2O_3$ | 22.3 | 24.0 | 22.3 | 22.4 | 22.5 | 22.2 | 22.3 |
| | $B_2O_3$ | 0.00 | 0.00 | 0.02 | 0.00 | 0.00 | 0.00 | 0.00 |
| | $P_2O_5$ | 1.42 | 1.61 | 1.33 | 1.34 | 1.34 | 1.41 | 1.36 |
| | $Li_2O$ | 3.65 | 3.85 | 3.59 | 3.64 | 3.61 | 3.60 | 3.68 |
| | $Na_2O$ | 0.65 | 0.62 | 0.39 | 0.40 | 0.39 | 0.38 | 0.39 |
| | $K_2O$ | 0.01 | 0.01 | 0.005 | 0.007 | 0.001 | 0.0001 | 0.0032 |
| | MgO | 1.05 | 1.38 | 1.26 | 1.31 | 1.32 | 1.32 | 1.17 |
| | CaO | 0.00 | 0.00 | 0.002 | 0.01 | 0.00 | 0.0007 | 0.00 |
| | SrO | 0.00 | 0.00 | 0.00 | 0.0012 | 0.01 | 0.0007 | 0.00 |
| | BaO | 0.45 | 0.00 | 0.03 | 0.00 | 0.01 | 0.01 | 0.0008 |
| | ZnO | 0.0000 | 0.00 | 0.00 | 0.00 | 0.02 | 0.0001 | 0.00 |
| | $TiO_2$ | 0.0181 | 0.0147 | 0.0044 | 0.0048 | 0.0132 | 0.0222 | 0.0058 |
| | $SnO_2$ | 1.19 | 1.20 | 1.20 | 1.18 | 1.15 | 1.28 | 1.19 |
| | $ZrO_2$ | 2.57 | 2.69 | 2.57 | 2.61 | 2.62 | 2.94 | 2.73 |
| | $Fe_2O_3$ | 0.0132 | 0.0112 | 0.0085 | 0.0093 | 0.0095 | 0.0110 | 0.0082 |
| Composition [ppm] | Pt | 0.01 | 0.00 | 0.15 | 0.15 | 0.15 | 0.15 | 0.15 |
| | Rh | 0.02 | 0.01 | 0.05 | 0.05 | 0.05 | 0.05 | 0.05 |
| | Pt + Rh | 0.03 | 0.01 | 0.20 | 0.20 | 0.20 | 0.20 | 0.20 |
| Sn/(P + B + Zr + Ti + Sn) | | 0.229 | 0.218 | 0.234 | 0.230 | 0.224 | 0.226 | 0.225 |
| Al/(Zr + Sn) | | 5.93 | 6.17 | 5.92 | 5.91 | 5.97 | 5.26 | 5.69 |
| (Mg + Zn)/Li | | 0.288 | 0.358 | 0.351 | 0.360 | 0.372 | 0.367 | 0.318 |
| Sn/(Zr + Sn) | | 0.32 | 0.31 | 0.32 | 0.31 | 0.31 | 0.30 | 0.30 |
| (Si + Al)/Li | | 24.36 | 22.96 | 24.87 | 24.53 | 24.76 | 24.69 | 24.27 |
| (Si + Al)/Sn | | 74.71 | 73.67 | 74.42 | 75.68 | 77.74 | 69.45 | 75.04 |
| (Li + Na + K)/Zr | | 1.68 | 1.67 | 1.55 | 1.55 | 1.53 | 1.35 | 1.49 |
| Ti/Zr | | 0.0070 | 0.0055 | 0.0017 | 0.0018 | 0.0050 | 0.0076 | 0.0021 |
| Ti/(Ti + Fe) | | 0.578 | 0.568 | 0.341 | 0.340 | 0.581 | 0.669 | 0.414 |
| Na + K + Ca + Sr + Ba | | 1.11 | 0.63 | 0.43 | 0.42 | 0.41 | 0.39 | 0.39 |
| (Mg + Ca + Sr + Ba)/Zr | | 0.58 | 0.51 | 0.50 | 0.51 | 0.51 | 0.45 | 0.43 |
| (Mg + Ca + Sr + Ba)/(Li + Na + K) | | 0.35 | 0.31 | 0.32 | 0.33 | 0.33 | 0.33 | 0.29 |
| Before Crystallization | | | | | | | | |
| Transmittance[%] 3 mm thick | 200 nm | Unmeasured | Unmeasured | Unmeasured | Unmeasured | Unmeasured | Unmeasured | Unmeasured |
| | 250 nm | Unmeasured | Unmeasured | Unmeasured | Unmeasured | Unmeasured | Unmeasured | Unmeasured |
| | 300 nm | Unmeasured | Unmeasured | Unmeasured | Unmeasured | Unmeasured | Unmeasured | Unmeasured |
| | 325 nm | Unmeasured | Unmeasured | Unmeasured | Unmeasured | Unmeasured | Unmeasured | Unmeasured |
| | 350 nm | Unmeasured | Unmeasured | Unmeasured | Unmeasured | Unmeasured | Unmeasured | Unmeasured |
| | 380 nm | Unmeasured | Unmeasured | Unmeasured | Unmeasured | Unmeasured | Unmeasured | Unmeasured |
| | 800 nm | Unmeasured | Unmeasured | Unmeasured | Unmeasured | Unmeasured | Unmeasured | Unmeasured |
| | 1200 nm | Unmeasured | Unmeasured | Unmeasured | Unmeasured | Unmeasured | Unmeasured | Unmeasured |
| L* | | Unmeasured | Unmeasured | Unmeasured | Unmeasured | Unmeasured | Unmeasured | Unmeasured |
| a* | | Unmeasured | Unmeasured | Unmeasured | Unmeasured | Unmeasured | Unmeasured | Unmeasured |
| b* | | Unmeasured | Unmeasured | Unmeasured | Unmeasured | Unmeasured | Unmeasured | Unmeasured |
| Low-Temperature Viscosity | Strain Point[° C.] | Unmeasured | Unmeasured | Unmeasured | Unmeasured | Unmeasured | Unmeasured | Unmeasured |
| | Annealing Point[° C.] | Unmeasured | Unmeasured | Unmeasured | Unmeasured | Unmeasured | Unmeasured | Unmeasured |
| | Glass Transition Point[° C.] | Unmeasured | Unmeasured | Unmeasured | Unmeasured | Unmeasured | Unmeasured | Unmeasured |
| High-Temperature Viscosity | $10^4$[° C.] | Unmeasured | Unmeasured | Unmeasured | Unmeasured | Unmeasured | Unmeasured | Unmeasured |
| | $10^3$[° C.] | Unmeasured | Unmeasured | Unmeasured | Unmeasured | Unmeasured | Unmeasured | Unmeasured |
| | $10^{2.5}$[° C.] | Unmeasured | Unmeasured | Unmeasured | Unmeasured | Unmeasured | Unmeasured | Unmeasured |
| | $10^2$[° C.] | Unmeasured | Unmeasured | Unmeasured | Unmeasured | Unmeasured | Unmeasured | Unmeasured |
| Liquidus Temperature[° C.] | | Unmeasured | Unmeasured | Unmeasured | Unmeasured | Unmeasured | Unmeasured | Unmeasured |
| Liquidus Viscosity[—] | | Unmeasured | Unmeasured | Unmeasured | Unmeasured | Unmeasured | Unmeasured | Unmeasured |
| $\alpha [\times 10^{-7}$/° C.] | 30-380° C. | Unmeasured | Unmeasured | Unmeasured | Unmeasured | Unmeasured | Unmeasured | Unmeasured |
| Density[g/cm3] | | Unmeasured | Unmeasured | 2.427 | 2.4275 | 2.429 | 2.435 | Unmeasured |

TABLE 14

| | No. 46 | No. 47 | No. 48 | No. 49 | No. 50 | No. 51 | No. 52 |
|---|---|---|---|---|---|---|---|
| After Crystallization | | | | | | | |
| Crystallization Conditions | 795° C.-3 h 890° C.-1 h | 795° C.-3 h 890° C.-1 h | 780° C.-3 h 890° C.-1 h | 780° C.-3 h 890° C.-1 h | 780° C.-3 h 890° C.-1 h | 780° C.-3 h 890° C.-1 h | 780° C.-3 h 890° C.-1 h |

TABLE 14-continued

|  |  | No. 46 | No. 47 | No. 48 | No. 49 | No. 50 | No. 51 | No. 52 |
|---|---|---|---|---|---|---|---|---|
| Transmittance[%] 3 mm thick | 200 nm | Unmeasured | Unmeasured | Unmeasured | Unmeasured | Unmeasured | Unmeasured | Unmeasured |
|  | 250 nm | Unmeasured | Unmeasured | Unmeasured | Unmeasured | Unmeasured | Unmeasured | Unmeasured |
|  | 300 nm | Unmeasured | Unmeasured | Unmeasured | Unmeasured | Unmeasured | Unmeasured | Unmeasured |
|  | 325 nm | Unmeasured | Unmeasured | Unmeasured | Unmeasured | Unmeasured | Unmeasured | Unmeasured |
|  | 350 nm | Unmeasured | Unmeasured | Unmeasured | Unmeasured | Unmeasured | Unmeasured | Unmeasured |
|  | 380 nm | Unmeasured | Unmeasured | Unmeasured | Unmeasured | Unmeasured | Unmeasured | Unmeasured |
|  | 800 nm | Unmeasured | Unmeasured | Unmeasured | Unmeasured | Unmeasured | Unmeasured | Unmeasured |
|  | 1200 nm | Unmeasured | Unmeasured | Unmeasured | Unmeasured | Unmeasured | Unmeasured | Unmeasured |
| L* |  | Unmeasured | Unmeasured | Unmeasured | Unmeasured | Unmeasured | Unmeasured | Unmeasured |
| a* |  | Unmeasured | Unmeasured | Unmeasured | Unmeasured | Unmeasured | Unmeasured | Unmeasured |
| b* |  | Unmeasured | Unmeasured | Unmeasured | Unmeasured | Unmeasured | Unmeasured | Unmeasured |
| Precipitated Crystals |  | β-Q | β-Q | β-Q | β-Q | β-Q | β-Q | β-Q |
| Average Crystallite Size[nm] |  | Unmeasured | Unmeasured | Unmeasured | Unmeasured | Unmeasured | Unmeasured | Unmeasured |
| α[×$10^{-7}$/° C.] | 30-380° C. | Unmeasured | Unmeasured | −1.5 | −2.1 | −1.0 | −0.7 | Unmeasured |
| α[×$10^{-7}$/° C.] | 30-750° C. | Unmeasured | Unmeasured | −0.8 | −0.9 | −0.1 | 0.1 | Unmeasured |
| Density[g/cm3] |  | Unmeasured | Unmeasured | 2.514 | 2.513 | 2.513 | 2.527 | Unmeasured |
| Young's Modulus[GPa] |  | Unmeasured | Unmeasured | Unmeasured | Unmeasured | Unmeasured | Unmeasured | 93 |
| Modulus of Rigidity [GPa] |  | Unmeasured | Unmeasured | Unmeasured | Unmeasured | Unmeasured | Unmeasured | 38 |
| Poisson's Ratio |  | Unmeasured | Unmeasured | Unmeasured | Unmeasured | Unmeasured | Unmeasured | 0.22 |
| Appearance |  | Clear and Colorless | Clear and Colorless | Clear and Colorless | Clear and Colorless | Clear and Colorless | Clear and Colorless | Clear and Colorless |
| Rate of Change between Before and After Crystallization[%] | | | | | | | | |
| 200 nm |  | Unmeasured | Unmeasured | Unmeasured | Unmeasured | Unmeasured | Unmeasured | Unmeasured |
| 250 nm |  | Unmeasured | Unmeasured | Unmeasured | Unmeasured | Unmeasured | Unmeasured | Unmeasured |
| 300 nm |  | Unmeasured | Unmeasured | Unmeasured | Unmeasured | Unmeasured | Unmeasured | Unmeasured |
| 325 nm |  | Unmeasured | Unmeasured | Unmeasured | Unmeasured | Unmeasured | Unmeasured | Unmeasured |
| 350 nm |  | Unmeasured | Unmeasured | Unmeasured | Unmeasured | Unmeasured | Unmeasured | Unmeasured |
| 380 nm |  | Unmeasured | Unmeasured | Unmeasured | Unmeasured | Unmeasured | Unmeasured | Unmeasured |
| 800 nm |  | Unmeasured | Unmeasured | Unmeasured | Unmeasured | Unmeasured | Unmeasured | Unmeasured |
| 1200 nm |  | Unmeasured | Unmeasured | Unmeasured | Unmeasured | Unmeasured | Unmeasured | Unmeasured |

TABLE 15

|  |  | No. 53 | No. 54 | No. 55 | No. 56 | No. 57 | No. 58 | No. 59 |
|---|---|---|---|---|---|---|---|---|
| Composition [% by weight] | $SiO_2$ | 65.20 | 65.0 | 65.3 | 64.6 | 65.8 | 65.1 | 64.8 |
|  | $Al_2O_3$ | 21.8 | 21.8 | 21.9 | 21.5 | 22.1 | 21.8 | 21.7 |
|  | $B_2O_3$ | 0.00 | 0.00 | 0.00 | 0.00 | 0.00 | 0.00 | 0.00 |
|  | $P_2O_5$ | 1.38 | 1.38 | 1.39 | 1.37 | 1.41 | 1.39 | 1.38 |
|  | $Li_2O$ | 3.66 | 3.65 | 3.66 | 3.63 | 3.70 | 3.66 | 3.64 |
|  | $Na_2O$ | 0.85 | 0.39 | 0.39 | 0.40 | 0.40 | 0.39 | 0.39 |
|  | $K_2O$ | 0.30 | 0.99 | 0.28 | 0.29 | 0.00 | 0.30 | 0.30 |
|  | MgO | 0.68 | 0.68 | 0.95 | 0.65 | 1.23 | 0.68 | 0.67 |
|  | CaO | 0.001 | 0.001 | 0.001 | 0.001 | 0.001 | 0.001 | 0.001 |
|  | SrO | 0.00 | 0.00 | 0.00 | 0.00 | 0.002 | 0.002 | 0.002 |
|  | BaO | 1.16 | 1.15 | 1.19 | 2.64 | 1.23 | 1.21 | 1.2300 |
|  | ZnO | 0.001 | 0.001 | 0.001 | 0.001 | 0.00 | 0.00 | 0.00 |
|  | $TiO_2$ | 0.0092 | 0.0113 | 0.0321 | 0.0140 | 0.0029 | 0.0201 | 0.0140 |
|  | $SnO_2$ | 1.36 | 1.39 | 1.36 | 1.37 | 1.27 | 1.85 | 2.24 |
|  | $ZrO_2$ | 3.70 | 3.64 | 3.71 | 3.64 | 2.98 | 3.68 | 3.71 |
|  | $Fe_2O_3$ | 0.0080 | 0.0075 | 0.0083 | 0.0081 | 0.0082 | 0.0078 | 0.0084 |
| Composition [ppm] | Pt | 0.41 | 0.01 | 0.20 | 0.11 | 0.05 | 0.09 | 0.07 |
|  | Rh | 0.00 | 0.01 | 0.02 | 0.02 | 0.02 | 0.02 | 0.02 |
|  | Pt + Rh | 0.41 | 0.02 | 0.22 | 0.13 | 0.07 | 0.11 | 0.09 |
| Sn/(P + B + Zr + Ti + Sn) |  | 0.211 | 0.216 | 0.210 | 0.214 | 0.224 | 0.267 | 0.305 |
| Al/(Zr + Sn) |  | 4.31 | 4.33 | 4.31 | 4.29 | 5.20 | 3.94 | 3.65 |
| (Mg + Zn)/Li |  | 0.186 | 0.187 | 0.260 | 0.179 | 0.332 | 0.186 | 0.184 |
| Sn/(Zr + Sn) |  | 0.27 | 0.28 | 0.27 | 0.27 | 0.30 | 0.33 | 0.38 |
| (Si + Al)/Li |  | 23.77 | 23.78 | 23.83 | 23.72 | 23.76 | 23.74 | 23.76 |
| (Si + Al)/Sn |  | 63.97 | 62.45 | 63.98 | 62.85 | 69.21 | 46.97 | 38.62 |
| (Li + Na + K)/Zr |  | 1.30 | 1.38 | 1.17 | 1.19 | 1.38 | 1.18 | 1.17 |
| Ti/Zr |  | 0.0025 | 0.0031 | 0.0086 | 0.0038 | 0.0010 | 0.0055 | 0.0038 |
| Ti/(Ti + Fe) |  | 0.535 | 0.601 | 0.795 | 0.633 | 0.261 | 0.720 | 0.625 |
| Na + K + Ca + Sr + Ba |  | 2.31 | 2.53 | 1.86 | 3.33 | 1.63 | 1.90 | 1.92 |
| (Mg + Ca + Sr + Ba)/Zr |  | 0.50 | 0.50 | 0.58 | 0.90 | 0.83 | 0.51 | 0.51 |
| (Mg + Ca + Sr + Ba)/(Li + Na + K) |  | 0.38 | 0.36 | 0.49 | 0.76 | 0.60 | 0.44 | 0.44 |
| Before Crystallization | | | | | | | | |
| Transmittance[%] 3 mm thick | 200 nm | Unmeasured | 69.1 | 73.0 | 72.4 | 78.3 | 65.1 | 59.6 |
|  | 250 nm | Unmeasured | 20.7 | 21.8 | 21.1 | 23.3 | 20.2 | 18.8 |
|  | 300 nm | Unmeasured | 27.9 | 32.3 | 27.9 | 30.6 | 22.8 | 17.7 |
|  | 325 nm | Unmeasured | 65.9 | 70.3 | 65.9 | 68.0 | 62.9 | 58.6 |
|  | 350 nm | Unmeasured | 83.9 | 85.6 | 84.0 | 84.8 | 83.2 | 82.0 |
|  | 380 nm | Unmeasured | 89.3 | 89.8 | 89.4 | 89.7 | 89.0 | 88.6 |

TABLE 15-continued

|  |  | No. 53 | No. 54 | No. 55 | No. 56 | No. 57 | No. 58 | No. 59 |
|---|---|---|---|---|---|---|---|---|
|  | 800 nm | Unmeasured | 91.4 | 91.6 | 91.5 | 91.5 | 91.4 | 91.3 |
|  | 1200 nm | Unmeasured | 91.2 | 91.6 | 91.4 | 91.8 | 91.7 | 91.7 |
| L* |  | Unmeasured | 96.6 | 96.6 | 96.6 | 96.6 | 96.5 | 96.5 |
| a* |  | Unmeasured | −0.1 | −0.1 | −0.1 | 0.0 | −0.1 | −0.1 |
| b* |  | Unmeasured | 0.4 | 0.3 | 0.4 | 0.3 | 0.4 | 0.5 |
| Low-Temperature Viscosity | Strain Point[° C.] | 674 | 674 | 678 | 680 | Unmeasured | Unmeasured | Unmeasured |
|  | Annealing Point[° C.] | 733 | 733 | 736 | 739 | Unmeasured | Unmeasured | Unmeasured |
|  | Glass Transition Point[° C.] | 733 | 730 | 732 | 733 | 724 | 726 | 728 |
| High-Temperature Viscosity | $10^4$[° C.] | 1346 | 1346 | 1341 | 1345 | 1343 | 1348 | 1345 |
|  | $10^3$[° C.] | 1526 | 1524 | 1518 | 1523 | 1523 | 1527 | 1524 |
|  | $10^{2.5}$[° C.] | 1641 | 1639 | 1630 | 1630 | 1636 | 1639 | 1638 |
|  | $10^2$[° C.] | 1778 | 1777 | 1762 | 1762 | 1768 | 1769 | 1773 |
| Liquidus Temperature[° C.] |  | Unmeasured | Unmeasured | 1493 | Unmeasured | Unmeasured | Unmeasured | Unmeasured |
| Liquidus Viscosity[—] |  | Unmeasured | Unmeasured | 3.1 | Unmeasured | Unmeasured | Unmeasured | Unmeasured |
| $\alpha[\times 10^{-7}/° C.]$ | 30-380° C. | 42.2 | 42.4 | 40.7 | 41.7 | 39.6 | 39.4 | 39.7 |
| Density[g/cm3] |  | 2.463 | 2.462 | 2.465 | 2.484 | 2.450 | 2.463 | 2.469 |

TABLE 16

|  |  | No. 53 | No. 54 | No. 55 | No. 56 | No. 57 | No. 58 | No. 59 |
|---|---|---|---|---|---|---|---|---|
| After Crystallization |
| Crystallization Conditions |  | 855° C.-3 h 920° C.-1 h | 855° C.-3 h 920° C.-1 h | 840° C.-3 h 920° C.-1 h | 840° C.-3 h 920° C.-1 h | 765° C.-3 h 890° C.-1 h | 810° C.-3 h 920° C.-1 h | 810° C.-3 h 920° C.-1 h |
| Transmittance[%] 3 mm thick | 200 nm | Unmeasured | Unmeasured | Unmeasured | Unmeasured | Unmeasured | 36.9 | 37.7 |
|  | 250 nm | Unmeasured | 20.1 | 14.5 | 16.1 | Unmeasured | 14.6 | 13.2 |
|  | 300 nm | Unmeasured | 18.1 | 17.7 | 17.9 | 20.4 | 14.4 | 11.2 |
|  | 325 nm | Unmeasured | 41.4 | 54.9 | 52.6 | 58.8 | 52.5 | 49.6 |
|  | 350 nm | Unmeasured | Unmeasured | Unmeasured | Unmeasured | 75.8 | 72.8 | 73.8 |
|  | 380 nm | Unmeasured | Unmeasured | Unmeasured | Unmeasured | 81.5 | 79.3 | 80.8 |
|  | 800 nm | Unmeasured | Unmeasured | Unmeasured | Unmeasured | 90.4 | 90.4 | 90.4 |
|  | 1200 nm | Unmeasured | Unmeasured | Unmeasured | Unmeasured | 90.9 | 90.9 | 91.1 |
| L* |  | Unmeasured | Unmeasured | Unmeasured | Unmeasured | 95.2 | 94.9 | 95.1 |
| a* |  | Unmeasured | Unmeasured | Unmeasured | Unmeasured | 0.1 | 0.1 | 0.1 |
| b* |  | Unmeasured | Unmeasured | Unmeasured | Unmeasured | 1.8 | 2.4 | 2.1 |
| Precipitated Crystals |  | β-Q | β-Q | β-Q | β-Q | β-Q | β-Q | β-Q |
| Average Crystallite Size[nm] |  | 47 | Unmeasured | Unmeasured | Unmeasured | Unmeasured | Unmeasured | Unmeasured |
| $\alpha[\times 10^{-7}/° C.]$ | 30-380° C. | 1.4 | 2.5 | 0.9 | 1.4 | 1.1 | −0.9 | −1.0 |
| $\alpha[\times 10^{-7}/° C.]$ | 30-750° C. | 3.4 | 4.7 | 2.5 | 3.2 | 1.9 | 0.6 | 0.5 |
| Density[g/cm3] |  | 2.525 | 2.519 | 2.539 | 2.549 | 2.534 | 2.542 | 2.548 |
| Young's Modulus [GPa] |  | Unmeasured | Unmeasured | Unmeasured | Unmeasured | Unmeasured | Unmeasured | Unmeasured |
| Modulus of Rigidity[GPa] |  | Unmeasured | Unmeasured | Unmeasured | Unmeasured | Unmeasured | Unmeasured | Unmeasured |
| Poisson's Ratio |  | Unmeasured | Unmeasured | Unmeasured | Unmeasured | Unmeasured | Unmeasured | Unmeasured |
| Appearance |  | Clear and Colorless | Clear and Colorless | Clear and Colorless | Clear and Colorless | Clear and Colorless | Clear and Colorless | Clear and Colorless |
| Rate of Change between Before and After Crystallization[%] |
|  | 200 nm | Unmeasured | Unmeasured | Unmeasured | Unmeasured | Unmeasured | 43.3 | 36.8 |
|  | 250 nm | Unmeasured | 2.7 | 33.6 | 23.9 | Unmeasured | 27.7 | 29.9 |
|  | 300 nm | Unmeasured | 35.0 | 45.2 | 35.9 | 33.4 | 36.8 | 36.6 |
|  | 325 nm | Unmeasured | 37.1 | 21.9 | 20.2 | 13.6 | 16.6 | 15.3 |
|  | 350 nm | Unmeasured | Unmeasured | Unmeasured | Unmeasured | 10.6 | 12.4 | 10.0 |
|  | 380 nm | Unmeasured | Unmeasured | Unmeasured | Unmeasured | 9.1 | 11.0 | 8.8 |
|  | 800 nm | Unmeasured | Unmeasured | Unmeasured | Unmeasured | 1.2 | 1.2 | 1.0 |
|  | 1200 nm | Unmeasured | Unmeasured | Unmeasured | Unmeasured | 1.0 | 0.9 | 0.6 |

TABLE 17

|  |  | No. 60 | No. 61 | No. 62 | No. 63 |
|---|---|---|---|---|---|
| Composition [% by weight] | $SiO_2$ | 65.20 | 64.9 | 64.5 | 64.6 |
|  | $Al_2O_3$ | 22.5 | 22.4 | 22.5 | 22.6 |
|  | $B_2O_3$ | 0.00 | 0.00 | 0.00 | 0.00 |
|  | $P_2O_5$ | 1.38 | 1.38 | 1.89 | 1.37 |
|  | $Li_2O$ | 3.66 | 3.81 | 3.66 | 3.63 |
|  | $Na_2O$ | 0.85 | 0.39 | 0.49 | 0.40 |
|  | $K_2O$ | 0.35 | 0.79 | 0.28 | 0.29 |
|  | MgO | 1.08 | 0.68 | 0.85 | 0.85 |
|  | CaO | 0.001 | 0.001 | 0.001 | 0.001 |
|  | SrO | 0.00 | 0.00 | 0.00 | 0.00 |
|  | BaO | 1.16 | 1.15 | 1.19 | 2.60 |

TABLE 17-continued

|  |  | No. 60 | No. 61 | No. 62 | No. 63 |
|---|---|---|---|---|---|
|  | ZnO | 0.001 | 0.82 | 0.50 | 0.001 |
|  | $TiO_2$ | 0.0092 | 0.0113 | 0.0321 | 0.0140 |
|  | $SnO_2$ | 1.13 | 1.11 | 1.52 | 1.10 |
|  | $ZrO_2$ | 2.58 | 2.55 | 2.49 | 2.57 |
|  | $Fe_2O_3$ | 0.0080 | 0.0075 | 0.0083 | 0.0081 |
| Composition | Pt | 0.09 | 0.01 | 0.07 | 0.05 |
| [ppm] | Rh | 0.02 | 0.01 | 0.02 | 0.02 |
|  | Pt + Rh | 0.11 | 0.02 | 0.09 | 0.07 |
| Sn/(P + B + Zr + Ti + Sn) |  | 0.222 | 0.220 | 0.256 | 0.218 |
| Al/(Zr + Sn) |  | 6.06 | 6.12 | 5.61 | 6.16 |
| (Mg + Zn)/Li |  | 0.295 | 0.394 | 0.369 | 0.234 |
| Sn/(Zr + Sn) |  | 0.30 | 0.30 | 0.38 | 0.30 |
| (Si + Al)/Li |  | 23.96 | 22.91 | 23.77 | 24.02 |
| (Si + Al)/Sn |  | 77.61 | 78.65 | 57.24 | 79.27 |
| (Li + Na + K)/Zr |  | 1.88 | 1.96 | 1.78 | 1.68 |
| Ti/Zr |  | 0.0036 | 0.0044 | 0.0129 | 0.0054 |
| Ti/(Ti + Fe) |  | 0.535 | 0.601 | 0.795 | 0.633 |
| Na + K + Ca + Sr + Ba |  | 2.36 | 2.33 | 1.96 | 3.29 |
| (Mg + Ca + Sr + Ba)/Zr |  | 0.87 | 0.72 | 0.82 | 1.34 |
| (Mg + Ca + Sr + Ba)/(Li + Na + K) |  | 0.46 | 0.37 | 0.46 | 0.80 |
| Before Crystallization |  |  |  |  |  |
| Transmittance[%] | 200 nm | Unmeasured | Unmeasured | Unmeasured | Unmeasured |
| 3 mm thick | 250 nm | Unmeasured | Unmeasured | Unmeasured | Unmeasured |
|  | 300 nm | Unmeasured | Unmeasured | Unmeasured | Unmeasured |
|  | 325 nm | Unmeasured | Unmeasured | Unmeasured | Unmeasured |
|  | 350 nm | Unmeasured | Unmeasured | Unmeasured | Unmeasured |
|  | 380 nm | Unmeasured | Unmeasured | Unmeasured | Unmeasured |
|  | 800 nm | Unmeasured | Unmeasured | Unmeasured | Unmeasured |
|  | 1200 nm | Unmeasured | Unmeasured | Unmeasured | Unmeasured |
| L* |  | Unmeasured | Unmeasured | Unmeasured | Unmeasured |
| a* |  | Unmeasured | Unmeasured | Unmeasured | Unmeasured |
| b* |  | Unmeasured | Unmeasured | Unmeasured | Unmeasured |
| Low- | Strain Point[° C.] | 671 | 673 | 672 | 678 |
| Temperature | Annealing Point[° C.] | 730 | 732 | 734 | 735 |
| Viscosity | Glass Transition Point[° C.] | Unmeasured | Unmeasured | Unmeasured | Unmeasured |
| High- | 10^4[° C.] | Unmeasured | Unmeasured | Unmeasured | Unmeasured |
| Temperature | 10^3[° C.] | Unmeasured | Unmeasured | Unmeasured | Unmeasured |
| Viscosity | 10^2.5[° C.] | Unmeasured | Unmeasured | Unmeasured | Unmeasured |
|  | 10^2[° C.] | Unmeasured | Unmeasured | Unmeasured | Unmeasured |
| Liquidus Temperature[° C.] |  | 1399 | 1390 | 1379 | 1402 |
| Liquidus Viscosity[—] |  | Unmeasured | Unmeasured | Unmeasured | Unmeasured |
| α[×10$^{-7}$/° C.] | 30-380° C. | 43.0 | 43.3 | 42.4 | 41.7 |
| Density[g/cm3] |  | Unmeasured | Unmeasured | Unmeasured | Unmeasured |

TABLE 18

|  |  | No. 60 | No. 61 | No. 62 | No. 63 |
|---|---|---|---|---|---|
| After Crystallization |  |  |  |  |  |
| Crystallization Conditions |  | 840° C.-5 h 920° C.-1 h | 855° C.-7 h 920° C.-1 h | 840° C.-3 h 920° C.-1.5 h | 840° C.-8 h 920° C.-1 h |
| Transmittance[%] | 200 nm | Unmeasured | Unmeasured | Unmeasured | Unmeasured |
| 3 mm thick | 250 nm | Unmeasured | Unmeasured | Unmeasured | Unmeasured |
|  | 300 nm | Unmeasured | Unmeasured | Unmeasured | Unmeasured |
|  | 325 nm | Unmeasured | Unmeasured | Unmeasured | Unmeasured |
|  | 350 nm | Unmeasured | Unmeasured | Unmeasured | Unmeasured |
|  | 380 nm | Unmeasured | Unmeasured | Unmeasured | Unmeasured |
|  | 800 nm | Unmeasured | Unmeasured | Unmeasured | Unmeasured |
|  | 1200 nm | Unmeasured | Unmeasured | Unmeasured | Unmeasured |
| L* |  | Unmeasured | Unmeasured | Unmeasured | Unmeasured |
| a* |  | Unmeasured | Unmeasured | Unmeasured | Unmeasured |
| b* |  | Unmeasured | Unmeasured | Unmeasured | Unmeasured |
| Precipitated Crystals |  | β-Q | β-Q | β-Q | β-Q |
| Average Crystallite Size[nm] |  | Unmeasured | Unmeasured | Unmeasured | Unmeasured |
| α[×10$^{-7}$/° C.] | 30-380° C. | Unmeasured | Unmeasured | Unmeasured | Unmeasured |
| α[×10$^{-7}$/° C.] | 30-750° C. | Unmeasured | Unmeasured | Unmeasured | Unmeasured |
| Density [g/cm3] |  | Unmeasured | Unmeasured | Unmeasured | Unmeasured |
| Young's Modulus[GPa] |  | Unmeasured | Unmeasured | Unmeasured | Unmeasured |
| Modulus of Rigidity[GPa] |  | Unmeasured | Unmeasured | Unmeasured | Unmeasured |
| Poisson's Ratio |  | Unmeasured | Unmeasured | Unmeasured | Unmeasured |
| Appearance |  | Clear and Colorless | Clear and Colorless | Clear and Colorless | Clear and Colorless |

TABLE 18-continued

|  | No. 60 | No. 61 | No. 62 | No. 63 |
|---|---|---|---|---|
| Rate of Change between Before and After Crystallization[%] | | | | |
| 200 nm | Unmeasured | Unmeasured | Unmeasured | Unmeasured |
| 250 nm | Unmeasured | Unmeasured | Unmeasured | Unmeasured |
| 300 nm | Unmeasured | Unmeasured | Unmeasured | Unmeasured |
| 325 nm | Unmeasured | Unmeasured | Unmeasured | Unmeasured |
| 350 nm | Unmeasured | Unmeasured | Unmeasured | Unmeasured |
| 380 nm | Unmeasured | Unmeasured | Unmeasured | Unmeasured |
| 800 nm | Unmeasured | Unmeasured | Unmeasured | Unmeasured |
| 1200 nm | Unmeasured | Unmeasured | Unmeasured | Unmeasured |

First, raw materials were formulated in the form of an oxide, a hydroxide, a carbonate, a nitrate or other forms so that each of glasses having respective compositions shown in the tables was obtained, thus obtaining a glass batch (where the compositions shown in the tables are analysis values of actually produced glasses). The obtained glass batch was put into a crucible containing platinum and rhodium, a rhodium-free strengthened-platinum crucible, a refractory crucible or a quartz crucible, melted therein at 1600° C. for 4 to 100 hours, then melted at an increased temperature of 1650 to 1680° C. for 0.5 to 20 hours, formed with a thickness of 5 mm by roll forming, and subjected to heat treatment at 700° C. for 30 minutes using a slow-cooling furnace, and then the slow-cooling furnace was cooled at a rate of 100° C./h to room temperature, thus obtaining a crystallizable glass. The melting was performed by the electric melting method widely used for the development of glass materials.

It has been confirmed that, with the use of a glass composition of Sample No. 29, the glass composition in contact with a liquid or solid can be melted by laser irradiation. Furthermore, it has also been confirmed that a glass composition in contact with a gas only by feeding the gas from around a glass sample to levitate the glass sample can be melted by laser. Moreover, it has been confirmed that after a glass composition is previously formed into a melt by an electric furnace or the like, the melt can be formed into a semispherical, spherical, fibrous, powdered or other shapes by pressing, redrawing, spraying or other processes. It has also been confirmed that, with the use of a glass composition of each of Samples Nos. 30 to 51, the glass composition can be melted in a continuous furnace where heating with a burner and ohmic heating are combined and the melt can be formed into a block, flaky, hollow or other shapes by a roll process, a film process, a lot process using dielectric heating or so on. It has also been confirmed that, with the use of a glass composition of Sample No. 17, the melt can be formed into a thin-plate-like, tubular or valve-like shape by an up-draw process, a down-draw process, a slit process, an overflow (fusion) process, a hand-blown process or so on. It has also been confirmed that, with the use of a glass composition of Sample No. 61, the glass melt can be solidified into a plate by flowing it onto a liquid having a larger specific gravity than Sample No. 61 and subsequently cooling it. The glasses produced by every method described above could be crystallized under the conditions shown in the tables.

The respective contents of Pt and Rh in the samples were analyzed with an ICP-MS instrument (Agilent 8800 manufactured by Agilent Technologies, Inc.). First, the produced glass sample was ground and wetted with pure water and, then, perchloric acid, nitric acid, sulfuric acid, hydrofluoric acid or the like was added to the glass sample to fuse the glass sample with the acid. Thereafter, the respective contents of Pt and Rh in the sample were measured with ICP-MS. Based on calibration curves made using prepared Pt and Rh solutions the concentrations of which had been known, the respective contents of Pt and Rh in each measurement sample were determined. The measurement modes were a He gas/HMI (low mode) for Pt and a HEHe gas/HMI (middle mode) for Rh. The mass numbers were 198 for Pt and 103 for Rh. The content of $Li_2O$ in the produced samples was analyzed with an atomic absorption spectrometer (contrAA 600 manufactured by Analytik Jena). The manner of the analysis for this component was fundamentally the same as the analysis for Pt and Rh, such as the flow of fusion of the glass sample and the use of the calibration curve. With respect to the other components, the content of the component was measured with ICP-MS or atomic absorption spectrometry, like Pt, Rh, and $Li_2O$, or otherwise a calibration curve was made with an XRF analyzer (ZSX Primus IV manufactured by Rigaku Corporation) using as a sample for determining the calibration curve a glass sample the concentration of which had been known by previously examining it with an ICP-MS or atomic absorption spectrometer and the actual content of the component was determined from an XRF analysis value of the measurement sample based on the calibration curve. In doing XRF analysis, the tube voltage, the tube current, the exposure time, and so on were adjusted according to the analytical component as needed.

Each of the crystallizable glasses shown in the tables was subjected to heat treatment at 750 to 900° C. for 0.75 to 60 hours to form crystal nuclei, then further subjected to heat treatment at 800 to 1000° C. for 0.25 to 3 hours, and thus crystallized. Thereafter, the glass was subjected to heat treatment at 700° C. for 30 minutes and then cooled to room temperature at 100° C./h. The obtained crystallized glasses were evaluated in terms of transmittance, diffuse transmittance, lightness, chromaticity, type of precipitated crystals, average crystallite size, coefficient of thermal expansion, density, Young's modulus, modulus of rigidity, Poisson's ratio, and appearance. Furthermore, as to the crystallizable glasses before crystallization, the transmittance, the lightness, the chromaticity, and so on were measured in the same manners as for the crystallized glasses. In addition, the crystallizable glasses were measured in terms of viscosity and liquidus temperature.

The transmittance, the lightness, and the chromaticity were evaluated by measuring a crystallized glass plate optically polished on both sides to have a thickness of 3 mm with a spectro-photometer. A spectro-photometer V-670 manufactured by JASCO Corporation was used for the measurement. The spectro-photometer V-670 was fitted with an integrating sphere unit "ISN-723" and, therefore, the measured transmittance corresponds to the total transmittance. Furthermore, the measurement wavelength range was 200 to 1500 nm, the scan speed was 200 nm/min, the sampling pitch was 1 nm, and the band width was 5 nm in a wavelength range of 200 to 800 nm and 20 nm in the other wavelength range. Prior to the measurement, a baseline correction (adjustment to 100%) and a dark measurement (adjustment to 0%) were performed. The dark measurement was conducted in a state where a barium sulfate plate attached to ISN-723 was removed. Using the measured transmittance, tristimulus values X, Y, and Z were calculated based on JIS Z 8781-4:2013 and its corresponding International Standard. The lightness and chromaticity were calculated from each stimulus value (light source C/10°). Furthermore, the measurement of the diffuse transmittance of each crystallized glass was performed by using the same type of instrument as above and placing the measurement sample in a state where the attached barium sulfate plate was removed.

The precipitated crystals were evaluated with an X-ray diffractometer (an automated multipurpose horizontal X-ray diffractometer SmartLab manufactured by Rigaku corporation). The scan mode was 2θ/θ measurement, the scan type was a continuous scan, the scattering and divergent slit width was 1°, the light-receiving slit width was 0.2°, the measurement range was 10 to 60°, the measurement step was 0.1°, and the scan speed was 5°/min. The type of major crystalline phase and the crystal grain size were evaluated using analysis software installed on the instrument package. β-quartz solid solution which is the type of precipitated crystals identified as a major crystalline phase is shown as "β-Q" in the tables. The average crystallite size of the major crystalline phase was calculated using a measured X-ray diffraction peak based on the Debeye-Sherrer method. In the measurement for calculating the average crystallite size, the scan speed was set at 1°/min.

The coefficient of thermal expansion was evaluated, using a crystallized glass sample processed with a length of 20 mm and a diameter of 3.8 mm, from its average coefficients of linear thermal expansion measured in a temperature range of 30 to 380° C. and a temperature range of 30 to 750° C. A dilatometer manufactured by NETZSCH was used for the measurement. Furthermore, each crystallizable glass before crystallization was evaluated in terms of glass transition point by measuring the thermal expansion curve in a temperature range of 30 to 750° C. with the same measurement instrument and calculating the inflection point of the curve.

The Young's modulus, the modulus of rigidity, and the Poisson's ratio were measured, using a plate-like sample (40 mm×20 mm×20 mm) surface-polished with a polishing solution containing 1200 mesh alumina powder dispersed therein, with a free resonance elastic modulus measurement device (JE-RT3 manufactured by Nihon Techno-Plus Corporation) in a room temperature environment.

The density was measured by the Archimedes's method.

The strain point and the annealing point were evaluated by the fiber elongation method. The fiber sample was made by hand-drawing from the crystallizable glass.

The high-temperature viscosity was evaluated by the platinum ball pulling-up method. In making the evaluation, a mass of glass sample was crushed to an appropriate size and loaded into an alumina-made crucible so as not to entrain air bubbles as much as possible. Subsequently, the alumina crucible was heated to turn the sample into a melt, the measured values of the glass viscosity at a plurality of temperatures were determined, the constant of the Vogel-Fulcher equation was calculated, a viscosity curve was created, and the temperature at each viscosity was calculated from the viscosity curve.

The liquidus temperature was evaluated in the following manner. First, glass powder sized between 300 micrometers and 500 micrometers was filled in a platinum boat with approximately 120×20×10 mm, the boat was put into an electric furnace, and the glass powder was melted at 1600° C. for 30 minutes in the furnace. Thereafter, the boat was moved into an electric furnace having a linear temperature gradient and placed therein for 20 hours to precipitate devitrification. The measurement sample was air cooled to room temperature, the devitrification precipitated at the interface between the platinum boat and the glass was observed, and the temperature at the portion where the devitrification was precipitated was calculated as a liquidus temperature from the temperature gradient graph of the electric furnace. Furthermore, the obtained liquidus temperature was interpolated into the high-temperature viscosity curve of the glass and the viscosity in the viscosity curve corresponding to the liquidus temperature was determined as a liquidus viscosity. The primary phases of the glasses shown in the tables were found to be mainly $ZrO_2$ from the results of X-ray diffraction, composition analysis, and so on (with a scanning electron microscope S-3400N Type II manufactured by Hitachi High-Tech Corporation and EMAX ENERGY EX-250X manufactured by Horiba, Ltd.).

The appearance was evaluated by visually confirming the color tone of each crystallized glass. The crystallized glass was visually observed in terms of appearance against both of a white background and a black background and, in each case, the observation was made under room light and in daylight (performed at 8:00, 12:00, and 16:00 on clear days and cloudy days of January, April, July, and October). The color tone was determined comprehensively from the results of all the visual observations.

As is obvious from Tables 1 to 12, each of the crystallized glasses of Samples Nos. 1 to 5 and 8 to 45, which are working examples, showed a clear and colorless appearance, a high transmittance, and a coefficient of thermal expansion of approximately zero. Furthermore, each of these crystallized glasses exhibited a small rate of transmittance change between before and after crystallization. In addition, their Young's moduli were 92 to 93 GPa, their moduli of rigidity were 37 to 38 GPa, and their Poisson's ratios were 0.22 to 0.23. In contrast, each of the crystallized glasses of Nos. 6 and 7, which are comparative examples, showed a yellowish appearance, a low transmittance in a short wavelength range, and a large rate of transmittance change between before and after crystallization.

FIG. 1 shows the transmittance curve before crystallization of Sample No. 29 and FIG. 2 shows the transmittance curve after crystallization of Sample No. 29. It is also obvious from FIGS. 1 and 2 that the rate of transmittance change between before and after crystallization was small.

As is obvious from Samples Nos. 31 to 36 in Table 10, there was a tendency for the crystallized glass to have a higher total transmittance and a lower diffuse transmittance as its contents of Pt and Rh decrease. This suggests that the presence of Pt and/or Rh in the sample facilitated the occurrence of light absorption over a wide wavelength range after crystallization and that Pt and/or Rh had an effect on crystal nucleation and crystal growth to cause segregation of a major crystalline phase, an increase in refractive index difference between the crystalline phase and the remaining glass phase, enlargement of the crystallite size or crystal grain (polycrystals formed of agglomerated crystallites), and so on in the interior of the crystallized glass, so that light became likely to scatter.

As is obvious from Tables 11 and 12, the $Li_2O$—$Al_2O_3$—$SiO_2$-based crystallized glass according to the present invention provides a high transmittance even when obtained by crystallization in a short time. Therefore, the glass according to the present invention can be crystallized at a process speed equivalent to those of the conventionally used $Li_2O$—$Al_2O_3$—$SiO_2$-based crystallized glasses. Hence, the $Li_2O$—$Al_2O_3$—$SiO_2$-based crystallized glass according to the present invention can be produced at low cost using existing facilities. Furthermore, the $Li_2O$—$Al_2O_3$—$SiO_2$-based crystal nucleation according to the present invention can be adjusted in coefficient of thermal expansion and so on by changing the crystal nucleation temperature, the crystal growth temperature, the holding time within each of the temperature ranges of them, and so on.

When Sample No. 41 free of Pt and Rh was subjected to crystal nucleation at 825° C. for 0.75 hours and subjected to crystal growth at 935° C. for 0.25 hours, it exhibited a rate of density change of approximately 3.4% between before and after crystallization. On the other hand, when Sample No. 40 having the same composition as Sample No. 41 except that it contains 0.01 ppm Pt and 0.03 ppm Rh was subjected to the above treatments under the same crystallization conditions, it exhibited a rate of density change of approximately 3.7% between before and after crystallization. This shows that Pt and Rh promoted the crystallization. As described previously, so long as the tinting is permitted, Pt and/or Rh may be used as a crystallization promotor.

When the crystallized glass of Sample No. 27 was immersed into a $KNO_3$ melt at 475° C. for 7 hours, a compressive stress layer (compressive stress: 110 MPa, compression depth: 10 micrometers) was formed on the sample surface.

INDUSTRIAL APPLICABILITY

The $Li_2O$—$Al_2O_3$—$SiO_2$-based crystallized glass according to the present invention is suitable for front windows of oil stoves, wood stoves and the like, substrates for high-technology products, such as color filter substrates and image sensor substrates, setters for firing electronic components, light diffuser plates, furnace core tubes for producing semiconductors, masks for producing semiconductors, optical lenses, dimension measurement members, communication members, construction members, chemical reaction containers, electromagnetic cooker top plates, heat-resistant plates and utensils, heat-resistant covers, fire door windows, members for astrometric telescopes, and members for space optics.

The invention claimed is:

1. A $Li_2O$—$Al_2O_3$—$SiO_2$-based crystallized glass containing, in terms of % by mass, 40 to 90% $SiO_2$, 5 to 30% $Al_2O_3$, 1 to 10% $Li_2O$, over 0 to 20% $SnO_2$, 1 to 20% $ZrO_2$, 0 to 10% MgO, 0 to 10% $P_2O_5$, 0 to 0.9% ZnO, and 0 to 0.95% $TiO_2$; wherein
a mass ratio of $(SiO_2+Al_2O_3)/SnO_2$ is 44 or more; and
a mass ratio of $(Li_2O+Na_2O+K_2O)/ZrO_2$ is 1.78 or less.

2. The $Li_2O$—$Al_2O_3$—$SiO_2$-based crystallized glass according to claim 1, further containing, in terms of % by mass, 0 to 10% $Na_2O$, 0 to 10% $K_2O$, 0 to 10% CaO, 0 to 10% SrO, 0 to 10% BaO, and 0 to 10% $B_2O_3$.

3. The $Li_2O$—$Al_2O_3$—$SiO_2$-based crystallized glass according to claim 1, further containing, in terms of % by mass, 0.1% or less $Fe_2O_3$.

4. The $Li_2O$—$Al_2O_3$—$SiO_2$-based crystallized glass according to claim 1, containing, in terms of % by mass, 7 ppm or less Pt.

5. The $Li_2O$—$Al_2O_3$—$SiO_2$-based crystallized glass according to claim 1, containing, in terms of % by mass, 7 ppm or less Rh.

6. The $Li_2O$—$Al_2O_3$—$SiO_2$-based crystallized glass according to claim 1, containing, in terms of % by mass, 8% or less $Na_2O+K_2O+CaO+SrO+BaO$.

7. The $Li_2O$—$Al_2O_3$—$SiO_2$-based crystallized glass according to claim 1, containing, in terms of % by mass, less than 0.05% $HfO_2+Ta_2O_5$.

8. The $Li_2O$—$Al_2O_3$—$SiO_2$-based crystallized glass according to claim 1, containing, in terms of % by mass, 9 ppm or less Pt+Rh.

9. The $Li_2O$—$Al_2O_3$—$SiO_2$-based crystallized glass according to claim 1, wherein a mass ratio of $SnO_2/(SnO_2+ZrO_2+P_2O_5+TiO_2+B_2O_3)$ is 0.06 or more.

10. The $Li_2O$—$Al_2O_3$—$SiO_2$-based crystallized glass according to claim 1, wherein a mass ratio of $Al_2O_3/(SnO_2+ZrO_2)$ is 7.1 or less.

11. The $Li_2O$—$Al_2O_3$—$SiO_2$-based crystallized glass according to claim 1, wherein a mass ratio of $SnO_2/(SnO_2+ZrO_2)$ is 0.01 to 0.99.

12. The $Li_2O$—$Al_2O_3$—$SiO_2$-based crystallized glass according to claim 1, wherein a mass ratio of $(SiO_2+Al_2O_3)/Li_2O$ is 20 or more.

13. The $Li_2O$—$Al_2O_3$—$SiO_2$-based crystallized glass according to claim 1, wherein a mass ratio of $(MgO+ZnO)/Li_2O$ is less than 0.395 or more than 0.754.

14. The $Li_2O$—$Al_2O_3$—$SiO_2$-based crystallized glass according to claim 1, wherein a mass ratio of $TiO_2/ZrO_2$ is 0.0001 to 0.5.

15. The $Li_2O$—$Al_2O_3$—$SiO_2$-based crystallized glass according to claim 1, wherein a mass ratio of $TiO_2/(TiO_2+Fe_2O_3)$ is 0.001 to 0.999.

16. The $Li_2O$—$Al_2O_3$—$SiO_2$-based crystallized glass according to claim 1, having a clear and colorless appearance.

17. The $Li_2O$—$Al_2O_3$—$SiO_2$-based crystallized glass according to claim 1, having a transmittance of 10% or more at a thickness of 3 mm and a wavelength of 300 nm.

18. The $Li_2O$—$Al_2O_3$—$SiO_2$-based crystallized glass according to claim 1, wherein a β-quartz solid solution is precipitated as a major crystalline phase.

19. The $Li_2O$—$Al_2O_3$—$SiO_2$-based crystallized glass according to claim 1, having a coefficient of thermal expansion of $30\times10^{-7}/°$ C. or less at 30 to 380° C.

20. The $Li_2O$—$Al_2O_3$—$SiO_2$-based crystallized glass according to claim 1, having a coefficient of thermal expansion of $30\times10^{-7}/°$ C. or less at 30 to 750° C.

* * * * *